(12) United States Patent
Lundy et al.

(10) Patent No.: US 9,752,383 B2
(45) Date of Patent: Sep. 5, 2017

(54) CONTROLLING MOTORIZED WINDOW TREATMENTS IN RESPONSE TO MULTIPLE SENSORS

(71) Applicant: Lutron Electronics Co., Inc., Coopersburg, PA (US)

(72) Inventors: Stephen Lundy, Coopersburg, PA (US);
Brent Protzman, Easton, PA (US);
Timothy Gill, Bethlehem, PA (US);
Michael J. Zizza, Bethlehem, PA (US)

(73) Assignee: LUTRON ELECTRONICS CO., INC., Coopersburg, PA (US)

( * ) Notice: Subject to any disclaimer, the term of this patent is extended or adjusted under 35 U.S.C. 154(b) by 30 days.

(21) Appl. No.: 14/748,128

(22) Filed: Jun. 23, 2015

(65) Prior Publication Data

US 2015/0368967 A1  Dec. 24, 2015

Related U.S. Application Data

(60) Provisional application No. 62/015,760, filed on Jun. 23, 2014.

(51) Int. Cl.
*E06B 9/24* (2006.01)
*E06B 9/68* (2006.01)
*E06B 9/32* (2006.01)

(52) U.S. Cl.
CPC .......... *E06B 9/68* (2013.01); *E06B 9/32* (2013.01); *E06B 2009/6818* (2013.01); *E06B 2009/6827* (2013.01); *Y10T 307/25* (2015.04)

(58) Field of Classification Search
CPC ...... E06B 9/68; E06B 9/32; E06B 2009/6818; E06B 2009/6827
See application file for complete search history.

(56) References Cited

U.S. PATENT DOCUMENTS 7,417,397 B2  8/2008  Berman et al.
7,537,040 B2  5/2009  Carmen, Jr. et al.
7,950,827 B2  5/2011  Veskovic
(Continued)

*Primary Examiner* — Katherine Mitchell
*Assistant Examiner* — Abe Massad
(74) *Attorney, Agent, or Firm* — Condo Roccia Koptiw LLP

(57) ABSTRACT

A motorized window treatment system controls a plurality of motorized window treatments to maximize daylight autonomy, while minimizing cognitive dissonance. The system may include motorized window treatments, window sensors, and a system controller. Each motorized window treatment may be operable to adjust a respective covering material to control the amount of light entering a space. Each sensor may be mounted adjacent to at least one of the motorized window treatments, and may be configured to measure an amount of daylight shining on the sensor. The system controller may receive sensor readings from the sensors and may control the motorized window treatments in response to the sensors to keep the covering materials aligned when the sensor readings are within a predetermined amount. The system controller may dynamically group and re-group the sensors into subgroups based upon the sensor readings and may control the motorized window treatments based upon the subgroups.

47 Claims, 27 Drawing Sheets

(56) References Cited

U.S. PATENT DOCUMENTS

| | | | |
|---|---|---|---|
| 7,963,675 B2* | 6/2011 | Veskovic | E06B 9/32 |
| | | | 160/5 |
| 7,977,904 B2* | 7/2011 | Berman | E06B 9/32 |
| | | | 160/5 |
| 8,125,172 B2 | 2/2012 | Berman et al. | |
| 8,228,163 B2 | 7/2012 | Cash et al. | |
| 8,248,014 B2 | 8/2012 | Berman et al. | |
| 8,288,981 B2 | 10/2012 | Zaharchuk et al. | |
| 8,417,388 B2 | 4/2013 | Altonen et al. | |
| 8,536,984 B2 | 9/2013 | Benetz et al. | |
| 2006/0176176 A1* | 8/2006 | Kang | H04L 45/00 |
| | | | 340/539.26 |
| 2006/0202851 A1 | 9/2006 | Cash et al. | |
| 2010/0141406 A1* | 6/2010 | Jo | G01D 21/00 |
| | | | 340/286.02 |
| 2014/0156079 A1 | 6/2014 | Courtney et al. | |
| 2014/0262057 A1 | 9/2014 | Chambers et al. | |
| 2014/0338844 A1* | 11/2014 | Diederiks | E06B 9/68 |
| | | | 160/5 |
| 2014/0345807 A1* | 11/2014 | Derk | E06B 9/68 |
| | | | 160/7 |
| 2015/0160626 A1* | 6/2015 | Cregg | G05B 15/02 |
| | | | 700/275 |
| 2015/0177709 A1 | 6/2015 | Gill | |
| 2016/0040478 A1* | 2/2016 | Lundy | G05B 11/01 |
| | | | 700/275 |
| 2016/0047163 A1* | 2/2016 | Blair | E06B 9/68 |
| | | | 307/117 |

* cited by examiner

CONTROLLING MOTORIZED WINDOW TREATMENTS IN RESPONSE TO MULTIPLE SENSORS

CROSS-REFERENCE TO RELATED APPLICATIONS

This application claims the benefit of U.S. Provisional Application No. 62/015,760, filed Jun. 23, 2014, which is incorporated by reference herein as if fully set forth.

BACKGROUND

Motorized window treatments, such as, for example, motorized roller shades and draperies, provide for control of the amount of sunlight entering a space. Some prior art motorized window treatments have been automatically controlled in response to various inputs, such as daylight sensors and timeclocks, to control the amount of daylight entering a space to adjust the total lighting level in the space to a desired level. For example, the load control system may attempt to maximize the amount of daylight entering the space in order to minimize the intensity of the electrical lighting in the space. In addition, some prior art load control systems additionally controlled the positions of the motorized window treatments to prevent sun glare in the space to increase occupant comfort, for example, as described in greater detail in commonly-assigned U.S. Pat. No. 7,950,827, issued May 31, 2011, entitled ELECTRICALLY CONTROLLABLE WINDOW TREATMENT SYSTEM TO CONTROL SUN GLARE IN A SPACE, the entire disclosure of which is hereby incorporated by reference.

While automated control of motorized window treatments are performed, the present systems for performing automated control of a motorized window treatment fail to consider the current status of other motorized window treatments in the building when performing control of the motorized window treatment. For example, the present systems fail to consider the status of other motorized window treatments to enable alignment of the position of the window treatments within the system. The present systems also fail to consider the amount of light being received at the other motorized window treatments when performing automated control of the system as a whole.

SUMMARY

As described herein, a load control system (e.g., a motorized window treatment system) may control a plurality of motorized window treatments to maximize daylight autonomy, while minimizing cognitive dissonance. The motorized window treatment system may comprise a plurality of motorized window treatments, a plurality of window sensors, and a system controller. Each of the motorized window treatments may be operable to adjust a respective covering material to control the amount of light entering a space. Each of the sensors may be mounted adjacent to at least one of the motorized window treatments, and may be configured to measure an amount of daylight shining on the respective sensor. The system controller may be configured to receive sensor readings from the sensors and to control the motorized window treatments in response to the sensors to keep the covering materials aligned while the sensor readings are within a predetermined amount of one another.

The system controller may dynamically group the window sensors together into sensor groups, or subgroups of a master group. The system controller may control the motorized window treatments based upon the sensor groups. The system controller may dynamically re-group the sensor groups when the system controller receives an updated sensor reading from a sensor in the sensor group. The updated sensor readings may be current sensor readings that indicate a change in the light level measured by a sensor.

The system controller may identify shade groups for each sensor group that may be controlled according to a group sensor value for the shade group. Each shade group may be located on a façade of a building, or a portion of the façade of the building. The shade group may include a sensor group (e.g., subgroups) and one or more shades for being controlled according to the sensor group. The shade group may be controlled according to a group sensor value that may be representative of the sensor readings of the sensors in the sensor group. The group sensor value may be the highest sensor reading for the sensors in the sensor group.

The system control of groups of motorized window treatments may allow for alignment of the shades in a shade group when the sensor values for the shades are within a predetermined amount of one another, while still allowing for independent control of the shades in certain instances. Other features will become apparent from the following description that refers to the accompanying drawings.

DETAILED DESCRIPTION

Figure 1:
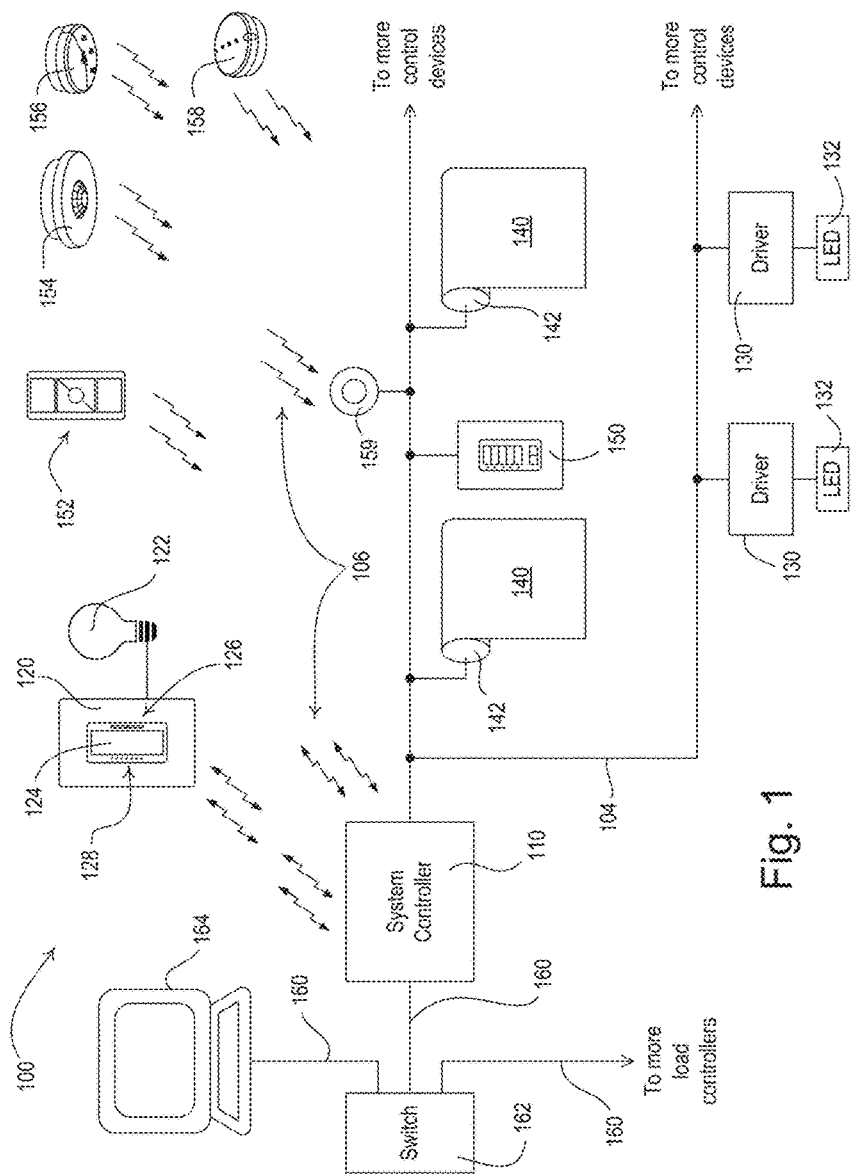
FIG. 1 is a simplified block diagram of a load control system having both load control devices and motorized window treatments.

FIG. 1 is a simple diagram of an example load control system 100 for controlling the amount of power delivered from an alternating-current (AC) power source (not shown) to one or more electrical loads. The load control system 100 may comprise a system controller 110 (e.g., a load controller or a central controller) operable to transmit and receive digital messages via both wired and wireless communication links. For example, the system controller 110 may be coupled to one or more wired control devices via a wired digital communication link 104. The system controller 110 may be configured to transmit and receive wireless signals, e.g., radio-frequency (RF) signals 106, to communicate with one or more wireless control devices. The load control system 100 may comprise a number of control-source devices (e.g., input devices operable to transmit digital messages in response to user inputs, occupancy/vacancy conditions, changes in measured light intensity, etc.) and a number of control-target devices (e.g., load control devices operable to receive digital messages and control respective electrical loads in response to the received digital messages). A single control device of the load control system 100 may operate as both a control-source and a control-target device. The system controller 110 may be configured to receive digital messages from the control-source devices and transmit digital messages to the control-target devices in response to the digital messages received from the control-source devices.

The load control system 100 may comprise a load control device, such as a dimmer switch 120, for controlling a lighting load 122. The dimmer switch 120 may be adapted to be wall-mounted in a standard electrical wallbox. The dimmer switch 120 may comprise a tabletop or plug-in load control device. The dimmer switch 120 may comprise a toggle actuator 124 (e.g., a button) and an intensity adjustment actuator 126 (e.g., a rocker switch). Successive actuations of the toggle actuator 124 may toggle, e.g., turn off and on, the lighting load 122. Actuations of an upper portion or a lower portion of the intensity adjustment actuator 126 may respectively increase or decrease the amount of power delivered to the lighting load 122 and thus increase or decrease the intensity of the lighting load from a minimum intensity (e.g., approximately 1%) to a maximum intensity (e.g., approximately 100%). The dimmer switch 120 may further comprise a plurality of visual indicators 128, e.g., light-emitting diodes (LEDs), which may be arranged in a linear array and may be illuminated to provide feedback of the intensity of the lighting load 122. Examples of wall-mounted dimmer switches are described in greater detail in U.S. Pat. No. 5,248,919, issued Sep. 28, 1993, entitled LIGHTING CONTROL DEVICE, and U.S. Patent Application Publication No. 2014/0132475, published May 15, 2014, entitled WIRELESS LOAD CONTROL DEVICE, the entire disclosures of which are hereby incorporated by reference.

The dimmer switch 120 may be configured to receive digital messages from the system controller 110 via the RF signals 106 and to control the lighting load 122 in response to the received digital messages. Examples of dimmer switches operable to transmit and receive digital messages is described in greater detail in U.S. Patent Application Publication No. 2009/0206983, published Aug. 20, 2009, entitled COMMUNICATION SYSTEM FOR A RADIO-FREQUENCY LOAD CONTROL SYSTEM, the entire disclosure of which is hereby incorporated by reference. Alternatively, the dimmer switch 120 may be coupled to the wired digital communication link 104.

The load control system 100 may further comprise one or more remotely-located load control devices, such as light-emitting diode (LED) drivers 130 for driving respective LED light sources 132 (e.g., LED light engines). The LED drivers 130 may be located remotely, for example, in the lighting fixtures of the respective LED light sources 132. The LED drivers 130 may be configured to receive digital messages from the system controller 110 via the digital communication link 104 and to control the respective LED light sources 132 in response to the received digital messages. The LED drivers 130 may be coupled to a separate digital communication link, such as an Ecosystem® or digital addressable lighting interface (DALI) communication link, and the load control system 100 may include a digital lighting controller coupled between the digital communication link 104 and the separate communication link. The LED drivers 132 may include internal RF communication circuits or be coupled to external RF communication circuits (e.g., mounted external to the lighting fixtures, such as to a ceiling) for transmitting and/or receiving the RF signals 106. The load control system 100 may comprise other types of remotely-located load control devices, such as, for example, electronic dimming ballasts for driving fluorescent lamps.

The load control system 100 may include a plurality of daylight control devices, e.g., motorized window treatments, such as motorized roller shades 140, to control the amount of daylight entering the building in which the load control system is installed. Each motorized roller shade 140 may comprise a covering material (e.g., a shade fabric) that may be wound around a roller tube for raising and lowering the shade fabric. Each motorized roller shade 140 may include an electronic drive unit (EDU) 142, which may be located inside the roller tube of the motorized roller shade. The electronic drive units 142 may be coupled to the digital communication link 104 for transmitting and receiving digital messages, and may be configured to adjust the position of a window treatment fabric in response to digital messages received from the system controller 110 via the digital communication link. Each electronic drive unit 142 could comprise an internal RF communication circuit or be coupled to an external RF communication circuit (e.g., located outside of the roller tube) for transmitting and/or receiving the RF signals 106. The load control system 100 may comprise other types of daylight control devices, such as, for example, a cellular shade, a drapery, a Roman shade, a Venetian blind, a Persian blind, a pleated blind, a tensioned roller shade systems, an electrochromic or smart window, or other suitable daylight control device.

The load control system 100 may comprise one or more input devices, e.g., such as a wired keypad device 150, a battery-powered remote control device 152, an occupancy sensor 154, and a daylight sensor 156. In addition, the load control system 100 may comprise one or more window sensors 158 (e.g., cloudy-day or shadow sensors). The wired keypad device 150 may be configured to transmit digital messages to the system controller 110 via the digital communication link 104 in response to an actuation of one or more buttons of the wired keypad device. The battery-powered remote control device 152, the occupancy sensor 154, the daylight sensor 156, and the window sensor 158 may be wireless control devices (e.g., RF transmitters) configured to transmit digital messages to the system controller 110 via the RF signals 106 (e.g., directly to the system controller 110). For example, the battery-powered remote control device 152 may be configured to transmit digital messages to the system controller 110 via the RF signals 106 in response to an actuation of one or more buttons of the battery-powered remote control device. The system controller 110 may be configured to transmit one or more digital messages to the load control devices (e.g., the dimmer switch 120, the LED drivers 130, and/or the motorized roller shades 140) in response to the digital messages received from the wired keypad device 150, the battery-powered remote control device 152, the occupancy sensor 154, the daylight sensor 156, and/or the window sensor 158.

The load control system 100 may further comprise a wireless adapter device 159 coupled to the digital communication link 104 and configured to receive the RF signals 106. The wireless adapter device 159 may be configured to transmit a digital message to the system controller 110 via the digital communication link 104 in response to a digital message received from one of the wireless control devices via the RF signals 106. For example, the wireless adapter device 159 may simply re-transmit the digital messages received from the wireless control devices on the digital communication link 104.

The occupancy sensor 154 may be configured to detect occupancy and vacancy conditions in the space in which the load control system 100 is installed. The occupancy sensor 154 may transmit digital messages to the system controller 110 via the RF signals 106 in response to detecting the occupancy or vacancy conditions. The system controller 110 may each be configured to turn one or more of the lighting load 122 and the LED light sources 132 on and off in response to receiving an occupied command and a vacant command, respectively. Alternatively, the occupancy sensor 154 may operate as a vacancy sensor, such that the lighting loads are only turned off in response to detecting a vacancy condition (e.g., not turned on in response to detecting an occupancy condition). Examples of RF load control systems having occupancy and vacancy sensors are described in greater detail in commonly-assigned U.S. Pat. No. 8,009,042, issued Aug. 30, 2011, entitled RADIO-FREQUENCY LIGHTING CONTROL SYSTEM WITH OCCUPANCY SENSING; U.S. Pat. No. 8,199,010, issued Jun. 12, 2012, entitled METHOD AND APPARATUS FOR CONFIGURING A WIRELESS SENSOR; and U.S. Pat. No. 8,228,184, issued Jul. 24, 2012, entitled BATTERY-POWERED OCCUPANCY SENSOR, the entire disclosures of which are hereby incorporated by reference.

The daylight sensor 156 may be configured to measure a total light intensity in the space in which the load control system 100 is installed. The daylight sensor 156 may transmit digital messages including the measured light intensity to the system controller 110 via the RF signals 106 for controlling the intensities of one or more of the lighting load 122 and the LED light sources 132 in response to the measured light intensity. Examples of RF load control systems having daylight sensors are described in greater detail in commonly-assigned U.S. Pat. No. 8,410,706, issued Apr. 2, 2013, entitled METHOD OF CALIBRATING A DAYLIGHT SENSOR; and U.S. Pat. No. 8,451,116, issued May 28, 2013, entitled WIRELESS BATTERY-POWERED DAYLIGHT SENSOR, the entire disclosures of which are hereby incorporated by reference.

In addition, the load control system 100 may comprise other types of input device, such as, for example, temperature sensors; humidity sensors; radiometers; pressure sensors; smoke detectors; carbon monoxide detectors; air-quality sensors; motion sensors; security sensors; proximity sensors; fixture sensors; partition sensors; keypads; kinetic or solar-powered remote controls; key fobs; cell phones; smart phones; tablets; personal digital assistants; personal computers; laptops; timeclocks; audio-visual controls; safety devices; power monitoring devices (such as power meters, energy meters, utility submeters, utility rate meters, etc.), central control transmitters; residential, commercial, or industrial controllers; or any combination of these input devices.

The system controller 110 may be configured to control the load control devices (e.g., the dimmer switch 120, the LED drivers 130, and/or the motorized roller shades 140) according to a timeclock schedule, which may be stored in a memory in the system controller 110. The timeclock schedule may include a number of timeclock events, each having an event time and a corresponding command or preset. The system controller 110 may be configured to keep track of the present time and day and to transmit the appropriate command or preset at the respective event time of each timeclock event.

The system controller 110 may be operable to be coupled to a network, such as a wireless or wired local area network (LAN) via a network communication bus 160 (e.g., an Ethernet communication link), e.g., for access to the Internet. The system controller 110 may be connected to a router 162 (or Ethernet switch) via the network communication bus 160 for allowing the system controller 110 to communicate with additional system controllers for controlling additional electrical loads. Alternatively, the system controller 110 may be wirelessly connected to the network, e.g., using Wi-Fi technology. The system controller 110 may also be configured to communication via the network with one or more network devices, such as, a smart phone (for example, an iPhone® smart phone, an Android® smart phone, or a Blackberry® smart phone), a personal computer 164, a laptop, a tablet device (for example, an iPad® hand-held computing device), a Wi-Fi or wireless-communication-capable television, or any other suitable Internet-Protocolenabled device. The network device may be operable to transmit digital messages to the system controller 110 in one or more Internet Protocol packets. Examples of load control systems operable to communicate with network devices on a network are described in greater detail in commonly-assigned U.S. Patent Application Publication No. 2013/0030589, published Jan. 31, 2013, entitled LOAD CONTROL DEVICE HAVING INTERNET CONNECTIVITY, the entire disclosure of which is hereby incorporated by reference.

The operation of the load control system 100 may be programmed and configured using the personal computer 164 or other network device. The personal computer 164 may execute a graphical user interface (GUI) configuration software for allowing a user to program how the load control system 100 will operate. The configuration software may generate a load control database that defines the operation and/or performance of the load control system 100. For example, the load control database may include information regarding the different load control devices of the load control system 100 (e.g., the dimmer switch 120, the LED drivers 130, and the motorized roller shades 140). The load control database may also include information regarding associations between the load control devices and the input devices (e.g., the wired keypad device 150, the battery-powered remote control device 152, the occupancy sensor 154, the daylight sensor 156, and/or the window sensor 158), and how the load control devices respond to inputs received from the input devices. Examples of configuration procedures for load control systems are described in greater detail in commonly-assigned U.S. Pat. No. 7,391,297, issued Jun. 24, 2008, entitled HANDHELD PROGRAMMER FOR A LIGHTING CONTROL SYSTEM; U.S. Patent Application Publication No. 2008/0092075, published Apr. 17, 2008, entitled METHOD OF BUILDING A DATABASE OF A LIGHTING CONTROL SYSTEM; and U.S. Patent Application Publication No. 2014/0265568, published Sep. 18, 2014, entitled COMMISSIONING LOAD CONTROL SYSTEMS, the entire disclosures of which are hereby incorporated by reference.

The system controller 110 may be configured to automatically control the motorized window treatments (e.g., the motorized roller shades 140) to save energy and/or improve the comfort of the occupants of the building in which the load control system 100 is installed. For example, the system controller 110 may be configured to automatically control the motorized roller shades 140 in response to the timeclock schedule, the daylight sensor 156, and/or the window sensor 158.

Figure 2:
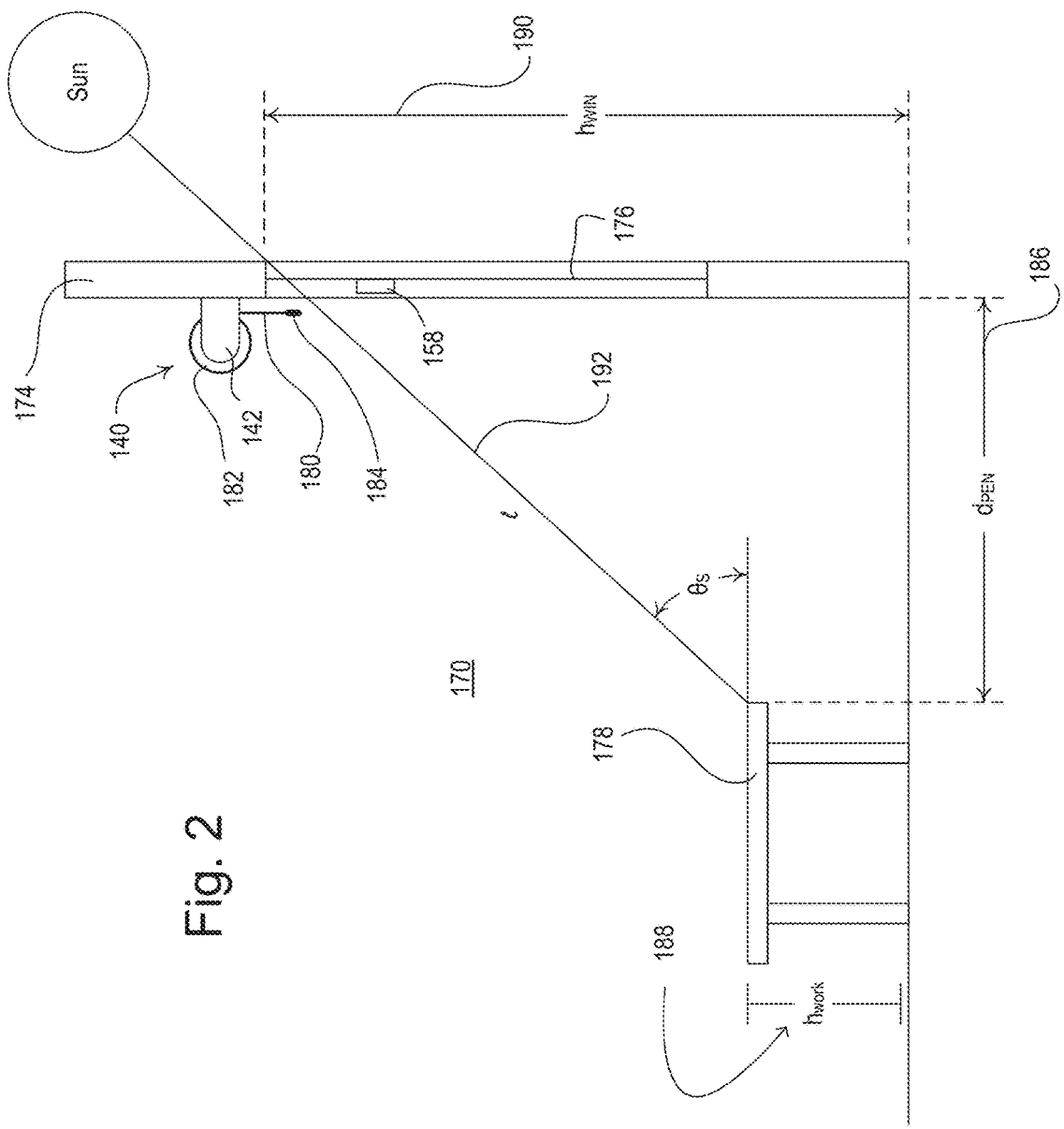
FIG. 2 is a simplified side view of an example of a space of a building having a window covered by the motorized roller shade of the load control system of FIG. 1.

The load control system 100 may operate in a sunlight penetration limiting mode to control the amount of sunlight entering a space of a building, such as the space 170 shown in FIG. 2, in which the load control system 100 is installed to control a sunlight penetration distance $d_{PEN}$ in the space. Specifically, the system controller 110 may be operable to transmit digital messages to the motorized roller shades 140 to limit the sunlight penetration distance $d_{PEN}$ in the space to a desired maximum sunlight penetration distance $d_{MAX}$. The system controller 110 may comprise an astronomical timeclock, such that the system controller 110 is able to determine the sunrise time and the sunset time for each day of the year for a specific location. The system controller 110 may transmit commands to the electronic drive units 142 to automatically control the motorized roller shades 140 in response to a timeclock schedule. Alternatively, the personal computer 164 may comprise the astronomical timeclock and may transmit the digital messages to the motorized roller shades 140 to control the sunlight penetration distance $d_{PEN}$ in the space in which the load control system 100 is installed. An example of a load control system for controlling one or more motorized window treatments according to a timeclock schedule to limit the sunlight penetration distance $d_{PEN}$ in a space is described in greater detail in commonly-assigned U.S. Pat. No. 8,288,981, issued Oct. 16, 2012, entitled METHOD OF AUTOMATICALLY CONTROLLING A MOTORIZED WINDOW TREATMENT WHILE MINIMIZING OCCUPANT DISTRACTIONS, the entire disclosure of which is hereby incorporated by reference.

The one or more window sensors 158 may be mounted to the inside surfaces of one or more windows in the space in which the load control system 100 is installed or to the exterior of the building. One or more window sensors 158 may be mounted adjacent to at least one of the motorized window treatments 140. Each window sensor 158 may be battery-powered and/or may be operable to transmit the RF signals 106 to the wireless adapter device 159. The window sensor 158 may receive a sensor reading by measuring an amount of daylight (e.g., daylight intensity level) shining on the window sensor 158. The window sensor may transmit digital messages via the RF signals 106 that include the sensor reading, for example, when the magnitude of the light intensity changes by a predetermined amount (e.g., approximately 20%).

The wireless adapter device 159 may be operable to transmit digital messages to the system controller 110 via the digital communication link 104 in response to the RF signals 106 from the window sensors 158. In response to the digital messages received from the window sensors 158 via the wireless adapter device 159, the system controller 110 may be configured to enable and disable the sunlight penetration limiting mode as will be described in greater detail herein. The window sensors 158 may be located at different windows around the building (as well as a plurality of sensor receiver modules), such that the load control system 100 may enable the sunlight penetration limiting mode in some areas of the building and not in others. Examples of window sensors are described in greater detail in commonly assigned U.S. Patent Application Publication No. 2014/0156079, published Jun. 5, 2014, entitled METHOD OF CONTROLLING A MOTORIZED WINDOW TREATMENT, the entire disclosure of which is hereby incorporated by reference.

The load controls system 100 may include pairs of window sensors 158. The pairs of window sensors 158 may be located on opposite sides of a mullion of a window of the building or at opposite sides of a window. Each one of the two sensors of the paired window sensors 158 may look similar to the daylight sensor 156 shown in FIG. 1, and may have a lens that is directed outside the window. The system controller 110 may be responsive to the measured light intensities of both of the sensors of each pair of sensors as if the pair of sensors was a single window sensor 158. For example, the system controller 110 may add the measured light intensities of both of the sensors of each pair of window sensors 158 and may enable and disable the sunlight penetration limiting mode in response to the sum of the measured light intensities of both of the sensors of each pair of window sensors 158.

FIG. 2 is a simplified side view of an example of the space 170 illustrating the sunlight penetration distance $d_{PEN}$ 186, which is controlled by the motorized roller shades 140. As shown in FIG. 2, the building includes a façade 174 (e.g., one side of a four-sided rectangular building) having a window 176 for allowing sunlight to enter the space 170.

The space 170 may include a work surface, e.g., a table 178, which has a height $h_{WORK}$ 188. The window sensor 158 may be mounted adjacent to the motorized roller shades 140. The window sensor 158 may be mounted to the window 176. The window sensor 158 may be mounted to the inside surface or the exterior surface of the window 176. The window sensor 158 may be mounted to interior or exterior mullions. The motorized roller shade 140 may be mounted above the window 176. The motorized roller shade 140 may include a roller tube 182 around which a shade fabric 180 may be wrapped. The shade fabric 180 may have a hembar 184 at the lower edge of the shade fabric. The electronic drive unit 142 may rotate the roller tube 182 to move the shade fabric 180 between a fully-open position $P_{FO}$ (in which the window 176 is not covered) and a fully-closed position $P_{FC}$ (in which the window 176 is fully covered). The electronic drive unit 142 may control the position of the shade fabric 180 to one of a plurality of preset positions between the fully-open position $P_{FO}$ and the fully-closed position $P_{FC}$.

The sunlight penetration distance $d_{PEN}$ 186 may be the distance into the space 170 from the window 176 inside the façade 174 at which direct sunlight shines into the room. The sunlight penetration distance $d_{PEN}$ 186 may be a function of a height $h_{WIN}$ 190 of the window 176 and an angle $\phi_F$ of the façade 174 with respect to true north, as well as a solar elevation angle $\theta_S$ and a solar azimuth angle $\phi_S$, which define the position of the sun in the sky. The solar elevation angle $\theta_S$ and the solar azimuth angle $\phi_S$ are functions of the present date and time, as well as the position (e.g., the longitude and latitude) of the building in which the space 170 is located. The solar elevation angle $\theta_S$ may be the angle between a line directed towards the sun and a line directed towards the horizon at the position of the building. The solar elevation angle $\theta_S$ may also, or alternatively, be the angle of incidence of the sun's rays on a horizontal surface. The solar azimuth angle $\phi_S$ is the angle formed by the line from the observer to true north and the line from the observer to the sun projected on the ground. When the solar elevation angle $\theta_S$ is small (e.g., around sunrise and sunset), small changes in the position of the sun may result in relatively large changes in the magnitude of the sunlight penetration distance $d_{PEN}$ 186.

Figure 3A:
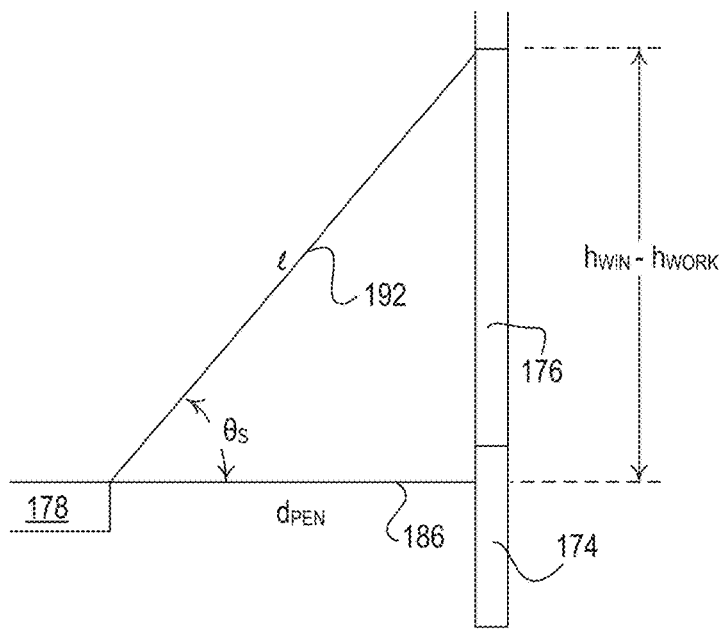
FIG. 3A is a side view of the window of FIG. 2 illustrating a sunlight penetration depth.

The sunlight penetration distance $d_{PEN}$ 186 of direct sunlight onto the table 178 of the space 170 (which is measured normal to the surface of the window 176) may be determined by considering a triangle formed by the length l 192 of the deepest penetrating ray of light (which is parallel to the path of the ray), the difference between the height $h_{WIN}$ 190 of the window 176 and the height $h_{WORK}$ 188 of the table 178, and distance between the table 178 and the wall of the façade 174 (e.g., the sunlight penetration distance $d_{PEN}$ 186) as shown in the side view of the window 176 in FIG. 3A, e.g., $$\tan(\theta_S) = (h_{WIN} - h_{WORK})/l,  \quad\text{(Equation 1)}$$

where $\theta_S$ is the solar elevation angle of the sun at a given date and time for a given location (e.g., longitude and latitude) of the building.

Figure 3B:
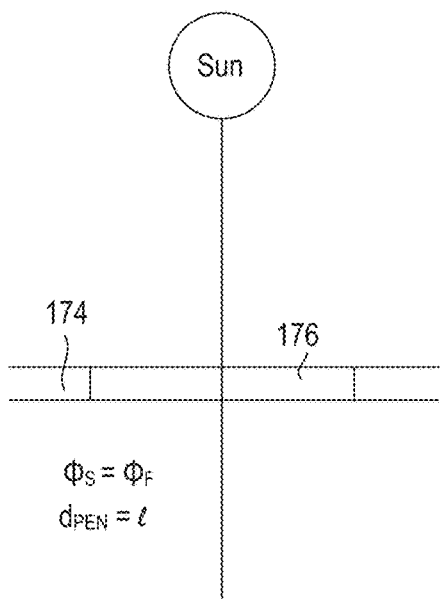
FIG. 3B is a top view of the window of FIG. 2 when the sun is directly incident upon the window.
Figure 3C:
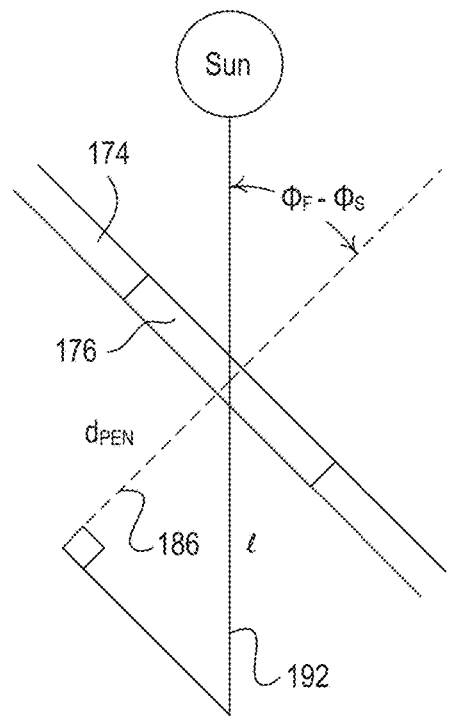
FIG. 3C is a top view of the window of FIG. 2 when the sun is not directly incident upon the window.

If the sun is directly incident upon the window 176, a solar azimuth angle $\phi_S$ and the façade angle $\phi_F$ (e.g., angle of the façade with respect to true north) may be equal as shown by the top view of the window 176 shown in FIG. 3B. Accordingly, the sunlight penetration distance $d_{PEN}$ 186 may equal the length l 192 of the deepest penetrating ray of light. If the façade angle $\phi_F$ is not equal to the solar azimuth angle $\phi_S$, the sunlight penetration distance $d_{PEN}$ 192 may be a function of the cosine of the difference between the façade angle $\phi_F$ and the solar azimuth angle $\phi_S$, e.g., $$d_{PEN} = l \cdot \cos(|\phi_F - \phi_S|), \quad\text{(Equation 2)}$$

as shown by the top view of the window 176 in FIG. 3C.

Referring again to FIG. 2, as previously mentioned, the solar elevation angle $\theta_S$ and the solar azimuth angle $\phi_S$ may define the position of the sun in the sky and may be functions of the position (e.g., the longitude and latitude) of the building in which the space 170 is located at the present date and time. The following equations may be used to approximate the solar elevation angle $\theta_S$ and the solar azimuth angle $\phi_S$. The equation of time may define the difference in a time as given by a sundial and a time as given by a clock. This difference may be due to the obliquity of the Earth's axis of rotation. The equation of time may be approximated by $$E = 9.87 \cdot \sin(2B) - 7.53 \cdot \cos(B) - 1.5 \cdot \sin(B), \quad\text{(Equation 3)}$$

where $B = [360° \cdot (N_{DAY} - 81)]/364$, and $N_{DAY}$ is the present day-number for the year (e.g., $N_{DAY}$ equals one for January 1, $N_{DAY}$ equals two for January 2, and so on).

The solar declination $\delta$ may be the angle of incidence of the rays of the sun on the equatorial plane of the Earth. If the eccentricity of Earth's orbit around the sun is ignored and the orbit is assumed to be circular, the solar declination is given by:

$$\delta = 23.45° \cdot \sin[360°/365 \cdot (N_{DAY} + 284)]. \quad\text{(Equation 4)}$$

The solar hour angle H is the angle between the meridian plane and the plane formed by the Earth's axis and current location of the sun, i.e., $$H(t) = \{\tfrac{1}{4} \cdot [t + E - (4 \cdot \lambda) + (60 \cdot t_{TZ})]\} - 180°, \quad\text{(Equation 5)}$$

where t is the present local time of the day, $\lambda$ is the local longitude, and $t_{TZ}$ is the time zone difference (in unit of hours) between the local time t and Greenwich Mean Time (GMT). For example, the time zone difference $t_{TZ}$ for the Eastern Standard Time (EST) zone is −5. The time zone difference $t_{TZ}$ may be determined from the local longitude $\lambda$ and latitude $\phi$ of the building. For a given solar hour angle H, the local time can be determined by solving Equation 5 for the time t, which may be expressed in an equation, e.g., $$t = 720 + 4 \cdot (H + \lambda) - (60 \cdot t_{TZ}) - E. \quad\text{(Equation 6)}$$

When the solar hour angle H equals zero, the sun is at the highest point in the sky, which may be referred to as "solar noon" time $t_{SN}$, which may be expressed in an equation, e.g., $$t_{SN} = 720 + (4 \cdot \lambda) - (60 \cdot t_{TZ}) - E. \quad\text{(Equation 7)}$$

A negative solar hour angle H may indicate that the sun is east of the meridian plane (e.g., morning), while a positive solar hour angle H may indicate that the sun is west of the meridian plane (e.g., afternoon or evening).

The solar elevation angle $\theta_S$ as a function of the present local time t may be calculated using the equation:

$$\theta_S(t) = \sin^{-1}[\cos(H(t)) \cdot \cos(\delta) \cdot \cos(\phi) + \sin(\delta) \cdot \sin(\phi)], \quad\text{(Equation 8)}$$

wherein $\phi$ is the local latitude where the building is located. The solar azimuth angle $\phi_S$ as a function of the present local time t may be calculated using the equation:

$$\phi_S(t) = 180° \cdot C(t) \cdot \cos^{-1}[X(t)/\cos(\theta_S(t))], \quad\text{(Equation 9)}$$

where $$X(t) = [\cos(H(t)) \cdot \cos(\delta) \cdot \sin(\phi) - \sin(\delta) \cdot \cos(\phi)], \quad\text{(Equation 10)}$$

and C(t) equals negative one if the present local time t is less than or equal to the solar noon time $t_{SN}$ or one if the present local time t is greater than the solar noon time $t_{SN}$. The solar azimuth angle $\phi_S$ may also, or alternatively, be expressed in terms independent of the solar elevation angle $\theta_S$, e.g., $$\phi_S(t) = \tan^{-1}[-\sin(H(t)) \cdot \cos(\delta)/Y(t)], \quad\text{(Equation 11)}$$

where $$Y(t) = [\sin(\delta) \cdot \cos(\phi) - \cos(\delta) \cdot \sin(\phi) \cdot \cos(H(t))]. \quad\text{(Equation 12)}$$

Thus, the solar elevation angle $\theta_S$ and the solar azimuth angle $\phi_S$ may be functions of the local longitude $\lambda$ and latitude $\phi$ and the present local time t and date (e.g., the present day-number $N_{DAY}$). Using Equations 1 and 2, the sunlight penetration distance may be expressed in terms of the height $h_{WIN}$ 190 of the window 176, the height $h_{WORK}$ 188 of the table 178, the solar elevation angle $\theta_S$, and the solar azimuth angle $\phi_S$.

As previously mentioned, the system controller 110 may operate in the sunlight penetration limiting mode to control the motorized roller shades 140 to limit the sunlight penetration distance $d_{PEN}$ 186 to be less than a desired maximum sunlight penetration distance $d_{MAX}$. For example, the sunlight penetration distance $d_{PEN}$ 186 may be limited such that the sunlight does not shine directly on the table 178 to prevent sun glare on the table. The desired maximum sunlight penetration distance $d_{MAX}$ may be entered using the GUI software of the personal computer 164 and may be stored in memory in the system controller 110. The user may use the GUI software of the personal computer 164 to enter the present date and time, the present timezone, the local longitude $\lambda$ and latitude $\phi$ of the building, the façade angle $\phi_F$ for each façade 174 of the building, the height $h_{WIN}$ 190 of the windows 176 in spaces 170 of the building, and the heights $h_{WORK}$ 188 of the workspaces (e.g., tables 178) in the spaces of the building. These operational characteristics (or a subset of these operational characteristics) may be transmitted and stored in the memory of the system controller 110. The motorized roller shades 140 may be controlled such that distractions to an occupant of the space 170 (e.g., due to movements of the motorized roller shades) are minimized.

The system controllers 110 of the load control system 100 may generate a timeclock schedule defining the desired operation of the motorized roller shades 140 for each of the façades 174 of the building to limit the sunlight penetration distance $d_{PEN}$ 186 in the space 170. For example, the system controller 110 may generate once each day at midnight another timeclock schedule for limiting the sunlight penetration distance $d_{PEN}$ 186 in the space 170 for the next day. The system controllers 110 are operable to calculate optimal shade positions of the motorized roller shades 140 in response to the desired maximum sunlight penetration distance $d_{MAX}$ at a plurality of times for the next day. The system controllers 110 are operable to use the calculated optimal shade positions as well as a user-selected minimum time period $T_{MIN}$ between shade movements and/or a minimum number $N_{MIN}$ of shade movements per day to generate the timeclock schedule for the next day. Examples of methods of controlling motorized window treatments to minimize sunlight penetration depth using timeclock schedules are described in greater detail in previously-referenced U.S. Pat. No. 8,288,981.

When the system controller 110 controls the motorized roller shades 140 to the fully-open positions $P_{FO}$ (e.g., when there is no direct sunlight incident on the façade 174), the amount of daylight entering the space 170 may be unacceptable to a user of the space 170. The system controller 110 may be operable to set the open-limit positions of the motorized roller shades 140 of one or more of the spaces 170 or façades 174 of the building to a visor position $P_{VISOR}$, which may be lower than or equal to the fully-open position $P_{FO}$. The position of the visor position $P_{VISOR}$ may be entered using the GUI software of the personal computer 164. The visor position $P_{VISOR}$ may be enabled and disabled for each of the spaces 170 or façades 174 of the building using the GUI software of the personal computer 164. Since two adjacent windows 176 of the building may have different heights, the visor positions $P_{VISOR}$ of the two windows may be programmed using the GUI software, such that the hembars 184 of the shade fabrics 182 covering the adjacent window are aligned when the motorized roller shades 140 are controlled to the visor positions $P_{VISOR}$.

In response to the RF signals 106 received from the window sensors 158, the system controllers 110 may be operable to disable the sunlight penetration limiting mode (e.g., to stop controlling the motorized roller shades 140 to limit the sunlight penetration distance $d_{PEN}$ 186) in the spaces in which the respective window sensors 158 are located. If the total light levels measured by one or more of the window sensors 158 are below a dark-override threshold $L_{TH\text{-}DK}$ (e.g., approximately 300 foot candles (FC)) the system controllers 110 may be operable to determine that cloudy conditions exist outside the building or a shadow is present on one or more of the façades 174. As a result, the system controllers 110 may determine a dark condition exists and operate in a dark override mode to control one or more of the motorized roller shades 140 to a dark override position $P_{DK}$ (e.g., the fully-open position $P_{FO}$) in order to maximize the amount of natural light entering the space 170 and to improve occupant comfort by providing a better view out of the window 176. The system controller 110 may make sure that the total light levels measured by the window sensors 158 remain below the dark-override threshold $L_{TH\text{-}DK}$ for the length of a dark-override timeout period $T_{DK\text{-}OV}$ (e.g., approximately 30 minutes), before beginning to operate in the dark override mode.

If the total light levels measured by one or more of the window sensors 158 are greater than or equal to the dark-override threshold $L_{TH\text{-}DK}$, the system controllers 110 may be operable to determine that sunny conditions exist on one or more of the façades 174, and to enable the sunlight penetration limiting mode to control the motorized roller shades 140 to limit the sunlight penetration distance $d_{PEN}$ 186 in one or more of the spaces 170 (e.g., to prevent sun glare on the table 178 in the space 170). Examples of load control systems having cloudy-day (i.e., dark-override) thresholds are described in greater detail in commonly-assigned U.S. Patent Application Publication No. 2004/0156079, published Jun. 5, 2014, entitled METHOD OF CONTROLLING A MOTORIZED WINDOW TREATMENT, the entire disclosure of which is hereby incorporated by reference.

The system controllers 110 in spaces, such as space 170, may be operable to determine that sunny conditions exist on one or more of the façades 174 and to operate in a bright override mode. For example, if the total light levels measured by one or more of the window sensors 158 are above a bright-override threshold $L_{TH\text{-}BR}$ (e.g., approximately 5,000 FC), the system controllers 110 may recognize a bright condition and may be operable to operate in the bright override mode to immediately control one or more of the motorized roller shades 140 to the fully-closed positions $P_{FC}$ in order to prevent the natural light from entering the space 170 and/or to improve occupant comfort by eliminating a potential glare source. If the total light levels measured by one or more of the window sensors 158 are less than or equal to the bright-override threshold $L_{TH\text{-}BR}$, the system controllers 110 may be operable to enable the sunlight penetration limiting mode to control the motorized roller shades 140 to limit the sunlight penetration distance $d_{PEN}$ 186 in one or more of the spaces. Examples of load control systems having bright-override thresholds are described in greater detail in commonly-assigned U.S. Provisional patent application Ser.

No. 14/459,896, filed Aug. 14, 2014, entitled WINDOW TREATMENT CONTROL USING BRIGHT OVERRIDE, the entire disclosure of which is hereby incorporated by reference.

Figure 4:
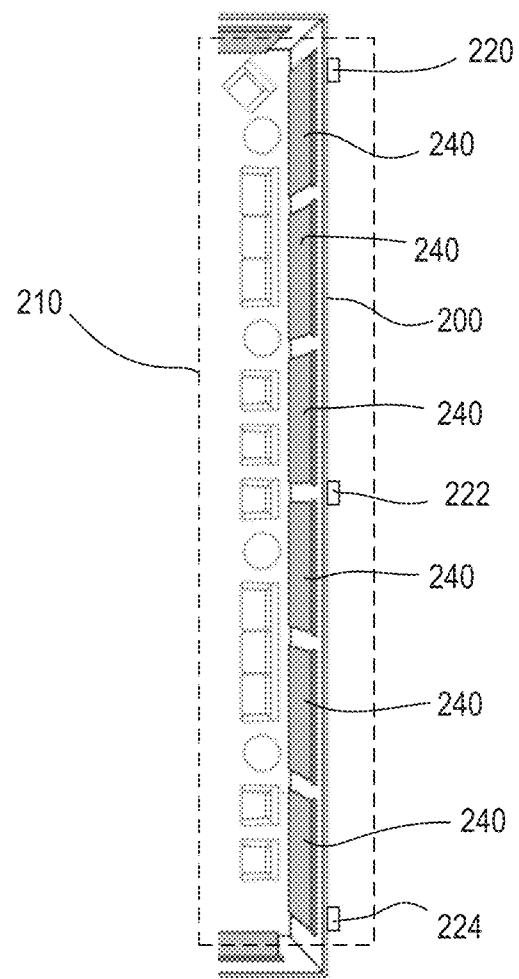
FIG. 4 is a top view of a façade of a building illustrating the control of each of the motorized window treatments along the façade as a single group.

The system controller may maintain the horizontally alignment of the bottom edges of the window treatment fabric (e.g., the hembars 184) of the motorized window treatments on a single façade of a building in order to provide an attractive aesthetic appearance of the window treatment fabric of the motorized window treatments. As shown in FIG. 4, a system controller (e.g., the system controller 110 of the load control system 100 shown in FIG. 1) may control a plurality of motorized window treatments 240 (e.g., the motorized roller shades 140) located along a single façade 200 of a building together as a single shade group 210. The motorized window treatments 240 may be configured to operate in the single shade group 210 using the GUI configuration software running on the personal computer 164, shown in FIG. 1. Since the sun may be shining on or a shadow may be present on a portion of the façade 200, multiple window sensors 220, 222, 224 may be located at various locations along the façade. When the system controller is determining whether or not to lower the shades due to a bright condition (e.g., to enter the bright override mode), the system controller may compare the highest light reading from the window sensors 220, 222, 224 in the single shade group 210 to the bright-override threshold $L_{TH-BR}$ to determine whether or not to close the motorized window treatments 240. When the system controller is determining whether or not to raise the shades due to a dark condition (e.g., to enter the dark override mode), the system controller may determine if the light readings of the window sensors 220, 222, 224 in the single shade group 210 are below the dark-override threshold $L_{TH-DK}$ for the length of the dark-override timeout period $T_{DK-OV}$ before the controlling the motorized window treatments to the dark override position $P_{DK}$.

The system controller may control the plurality of motorized window treatments 240 located in a same space type of a building together as a single shade group 210. For example, may maintain the horizontally alignment of the bottom edges of the window treatment fabric (e.g., the hembars 184) of the motorized window treatments within a same space type or space types of a building. The space type may indicate the general use of an area, such as that a space is a functional area, a transition area, and/or a social area. The space type may also, or alternatively, indicate individual rooms, such as an office, a kitchen, a living room, a bedroom and/or the like. Examples of the functional area may include an office area, a conference room, a classroom, a patient room, a fitness center, and/or other functional spaces. Transitional areas may include corridors, vestibules, stairwells, and/or other transitional spaces that may be passed through by a user for a short time. Social areas may include lobbies, atriums, cafeterias, and/or other social gathering areas.

The motorized window treatments 240 located in the same space type may be grouped together and controlled according to one or more sensor readings that may be representative of the motorized window treatments 240 in the space type. For example, the system controller may receive sensor readings from one or more sensors in a sensor group for the space type. The group may be controlled according to a sensor reading that is representative of the entire sensor group. For example, the representative sensor reading may include the sensor reading having the highest light level in the sensor group.

Figure 5A:
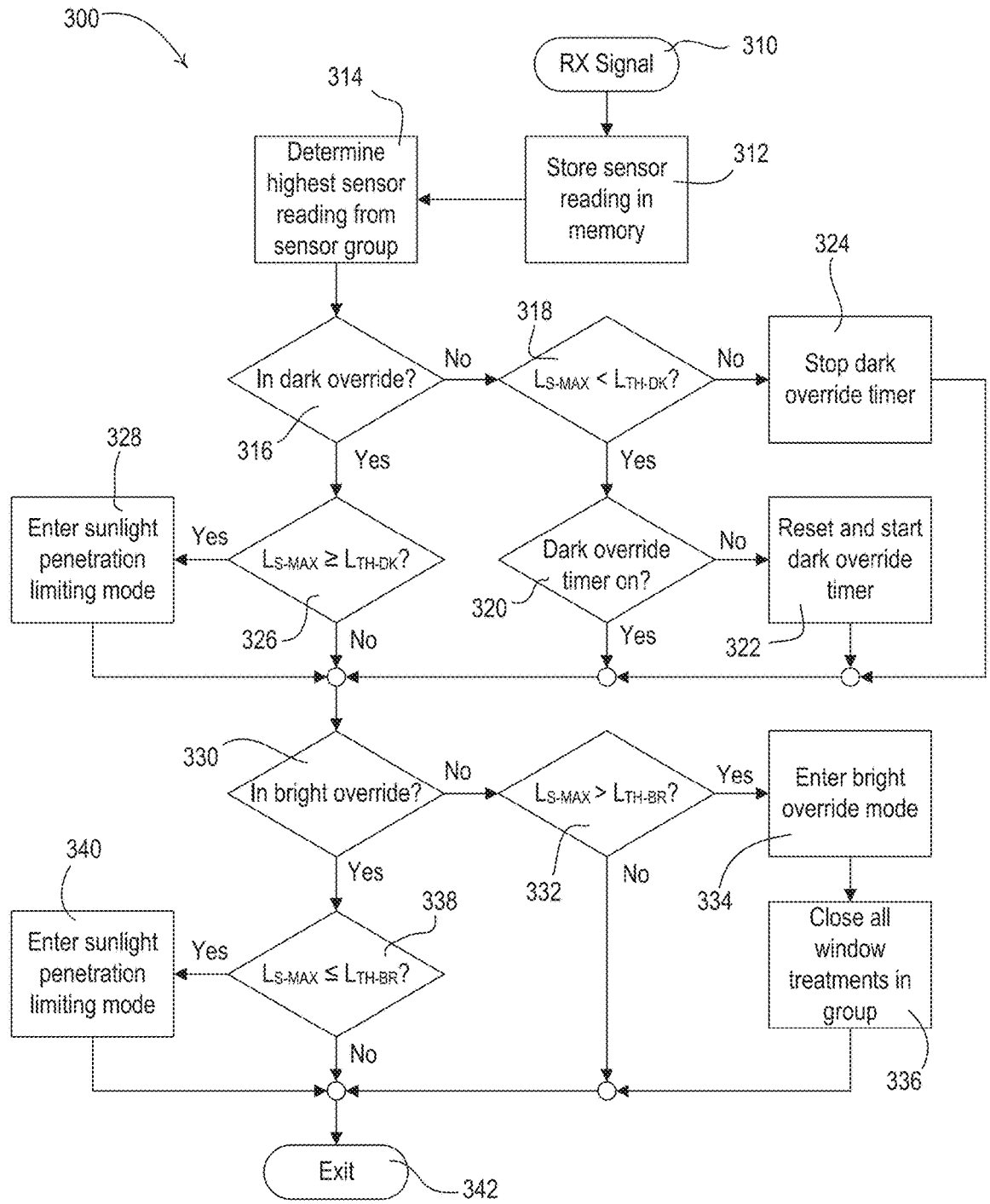
FIG. 5A is a simplified flowchart of an example control procedure for controlling a plurality of motorized roller treatments to maintain horizontal alignment of the hembars of the motorized window treatments.
Figure 5B:
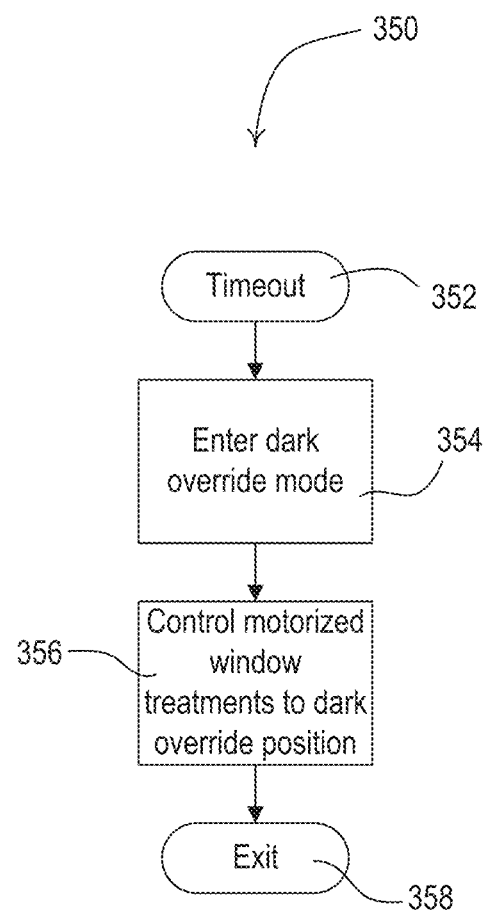
FIG. 5B is a simplified flowchart of an example dark override timer timeout procedure.

FIGS. 5A and 5B are simplified flowcharts of example procedures that may be executed by a system controller (e.g., the system controller 110 of the load control system 100 shown in FIG. 1) for controlling a plurality of motorized window treatments (e.g., the motorized roller shades 140 or the motorized window treatments 240) in response to a plurality of window sensors (e.g., the window sensors 220, 222, 224 shown in FIG. 4) to maintain the horizontal alignment of the hembars of the motorized window treatments. FIG. 5A is a simplified flowchart of an example control procedure 300, which may be executed by the system controller in response to receiving a digital message including a sensor reading from one of the window sensors at 310. The system controller may execute the control procedure 300 for each façade (e.g., the single façade 200 shown in FIG. 4) and/or each shade group of motorized roller shades (e.g., the single shade group 210 shown in FIG. 4) of the building. After receiving the digital message including the sensor reading at 310, the system controller may store the sensor reading received in the digital messages in memory at 312. The system controller may store one or more sensor readings received from each of the window sensors in memory at 312. The system controller may determine the highest $L_{S-MAX}$ of the sensor readings of each of the window sensors from the shade group at 314. The shade group may include a group of sensors and one or more corresponding shades that may be controlled according to the sensors in the sensor group. The system controller may control the shade group based on the sensor reading determined at 314. Though the procedure 300 may control the shade group according to the highest sensor reading from the sensor group, the procedure 300 may be similarly implemented using another group sensor value that may be representative of the present sensor readings of the window sensors in each sensor group.

If the system controller is not presently operating in the dark override mode at 316 (e.g., the system controller is operating in the sunlight penetration limiting mode or the bright override mode), the system controller determines whether to begin to operate in the dark override mode. Specifically, the system controller may determine if the highest sensor reading $L_{S-MAX}$ (as determined at 314) is less than a dark override threshold $L_{TH-DK}$ (e.g., if the most recent sensor readings of the window sensors from the shade group are less than the dark override threshold $L_{TH-DK}$) at 318. The system controller may use a dark override timer to determine when to enter the dark override mode. If the highest sensor reading $L_{S-MAX}$ is less than the dark override threshold $L_{TH-DK}$ at 318 and the dark override timer is not running at 320, the system controller may reset the dark override timer and may start the dark override timer at 322. The system controller may start the dark override timer by decreasing the timer in value with respect to time. When the dark override timer expires, the system controller may enter the dark override mode as discussed in greater detail herein. If the highest sensor reading $L_{S-MAX}$ is not less than the dark override threshold $L_{TH-DK}$ at 318, the system controller may stop the dark override timer at 324. If the system controller is presently operating in the dark override mode at 316 and the highest sensor reading $L_{S-MAX}$ is greater than or equal to the dark override threshold $L_{TH-DK}$ at 326, the system controller may enter the sunlight penetration limiting mode at 328.

The system controller may evaluate the bright override mode at 330. If the system controller is not presently operating in the bright override mode at 330 (e.g., the system controller is operating in the sunlight penetration limiting mode or the dark override mode), the system controller may determine whether to begin to operate in the bright override mode. Specifically, if the highest sensor reading $L_{S\text{-}MAX}$ is greater than a bright override threshold $L_{TH\text{-}BR}$ at 332, the system controller may enter the bright override mode at 334 and may close the motorized window treatments in the shade group at 336, before the control procedure 300 exits at 342. If the highest sensor reading $L_{S\text{-}MAX}$ of the shade group is not greater than the bright override threshold $L_{TH\text{-}BR}$ at 332, the system controller may exit the control procedure 300 (e.g., without entering the bright override mode and/or adjusting the motorized window treatments) at 342. If the system controller is presently operating in the bright override mode at 330 and the highest sensor reading $L_{S\text{-}MAX}$ is less than or equal to the bright override threshold $L_{TH\text{-}BR}$ at 338, the system controller may enter the sunlight penetration limiting mode at 340. The control procedure 300 may exit at 342.

FIG. 5B is a simplified flowchart of an example dark override timer timeout procedure 350, which may be executed by the system controller in response to the dark override timer reaching zero at 352. For example, the system controller may make sure that the total light levels measured by the window sensors remain below the dark-override threshold $L_{TH\text{-}DK}$ for the length of a dark-override timeout period $T_{DK\text{-}OV}$ (e.g., approximately 30 minutes), before beginning to operate in the dark override mode at 354. When the dark override timeout period expires at 352, the system controller may enter the dark override mode at 354 and may control the window treatments (e.g., the window treatments in a single shade group) to the dark override position $P_{DK}$ at 356, before the dark override timeout procedure 350 exits at 358.

Figure 6:
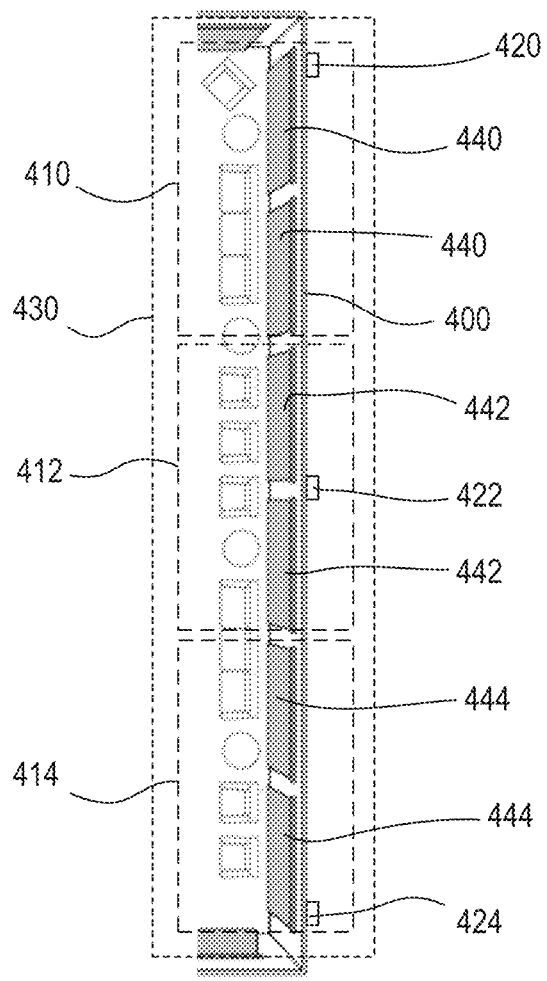
FIG. 6 is a top view of a façade of a building illustrating the control of each of the motorized window treatments along the façade as multiple groups.

A system controller may control the motorized window treatments on a single façade to maintain the horizontal alignment of the bottom edges when possible, and also control the motorized window treatments to different positions to prevent glare conditions on one portion of the façade while providing a view on another portion of the façade. To provide this level of control, as shown in FIG. 6, a system controller (e.g., the system controller 110 of the load control system 100 shown in FIG. 1) may control a plurality of motorized window treatments 440, 442, 444 (e.g., the motorized roller shades 140) located along a single façade 400 of a building in multiple shade groups 410, 412, 414. Each shade group 410, 412, 414 may include at least one respective window sensor 420, 422, 424. The window sensors 420, 422, 424 may be located adjacent the motorized roller shades 440, 442, 444 of the respective shade groups 410, 412, 414. The shade groups 410, 412, 414 may be a part of a master group 430. The master group 430 may include the sensors programmed to the same façade that may be divided up into subgroups. The multiple shade groups 410, 412, 414 and the master group 430 may be configured using the GUI configuration software running on the personal computer 164 shown in FIG. 1. The building may also include other shade groups and master groups on other façades of the building.

The system controller may operate to keep the motorized window treatments 440, 442, 444 of the master group 430 aligned when the sensor readings of the window sensors 420, 422, 424 are within a predefined range of one another (e.g., within 40% of each other), and may allow the motorized window treatments 440, 442, 444 of the various shade groups 410, 412, 414 to move independently when the sensor readings are outside of the predefined range from one another (e.g., outside of 40% of each other). The shade groups 410, 412, 414 may be subgroups that may be controlled according to the sensor reading of the respective window sensors 420, 422, 424 in each shade group 410, 412, 414.

The shade groups 410, 412, 414 may be defined by the system controller and the system controller may control the motorized window treatments 440, 442, 444 of the multiple shade groups 410, 412, 414 according to the defined shade groups 410, 412, 414. Each of the shade groups 410, 412, 414 in the master group 430 may be limited to including a single window sensor 420, 422, 424 or may include multiple window sensors. The system controller may receive sensor readings from the multiple window sensors in a single shade group 410, 412, 414 and may choose a group sensor value that is representative of the sensor readings of the window sensors in each group to control the shade group. For example, the system controller may choose the highest sensor reading in a sensor group as the group sensor value to be representative of the sensor readings of that shade group 410, 412, 414.

The group sensor value for each shade group 410, 412, 414 may be used to control the shade group. Each of the shade groups 410, 412, 414 in the master group 430 may have the same operational settings (e.g., the same values of the bright override threshold $L_{TH\text{-}BR}$, the dark override threshold $L_{TH\text{-}DR}$, and/or the dark-override timeout period $T_{DK\text{-}OV}$). The master group 430 may include shade groups 410, 412, 414 having motorized window treatments oriented in the same direction (e.g., along a single linear façade). The shade groups having motorized window treatments oriented in a different direction (e.g., along another linear façade) may be a part of another master group. Multiple master groups may be located on the same façade. Each of the individual shade groups 410, 412, 414 may be limited to being part of a single master group 430 (e.g., master groups may not overlap other master groups). Each of the individual shade groups 410, 412, 414 may be controlled by automated control of the motorized window treatments 440, 442, 444 or a manual override of the motorized window treatments 440, 442, 444. One of the shade groups 410, 412, 414 in the master group 430 may be manually overridden without affecting the automated control of motorized window treatments 440, 442, 444 in one or more of the other shade groups 410, 412, 414 of the master group 430.

When the system controller is determining whether or not to lower the shades due to a bright condition (e.g., to enter the bright override mode), the system controller may control the motorized window treatments 440, 442, 444 in response to receiving a sensor reading from any of the window sensors 420, 422, 424 of the master group 430 that rises above the bright override threshold $L_{TH\text{-}BR}$. The sensor reading that is used by the system controller to control the motorized window treatment may be the first sensor reading of a group of sensors that rise above the bright override threshold $L_{TH\text{-}BR}$ to provide responsive control of the motorized window treatments 440, 442, 444. Specifically, in response to receiving a sensor reading that rises above the bright override threshold $L_{TH\text{-}BR}$, the system controller may close the motorized window treatments 440, 442, 444 of each of the shade groups 410, 412, 414 having window sensors 420, 422, 424 reporting sensor readings within a predetermined amount $\Delta_L$ of the sensor reading that rose above the bright override threshold $L_{TH\text{-}BR}$. The predetermined amount $\Delta_L$ may be sized to minimize and/or eliminate cognitive dissonance in the movements of the motorized window treatments 440, 442, 444. The predetermined amount $\Delta_L$ may be in the range of, for example, approximately 20% to approximately 50%. For example, the predetermined amount $\Delta_L$ may be approximately 40%, which may be approximately twice the amount by which the light intensity measured by each window sensor 420, 422, 424 may change before the window sensor transmits another digital message including the measured light intensity.

One or more of the shade groups 410, 412, 414 may operate independent of the other shade groups. In an example, each of the shade groups 410, 412, 414 may be in the dark override mode and the bright override threshold $L_{TH-BR}$ may be 5,000 foot-candles (FC). If the sensor reading of window sensor 420 increased to 5,001 FC, the most recent sensor reading of the window sensor 422 was 5,025 FC, and the most recent sensor reading of the window sensor 424 was 178 FC, the motorized window treatments 440, 442 of the shade groups 410, 412 may close (e.g., in the bright override mode), and the motorized window treatments 444 of the shade group 414 may remain in the dark override mode.

When the system controller is determining whether or not to raise the shades due to a dark condition (e.g., to enter the dark override mode), the system controller may monitor the sensor readings of each of the window sensors 420, 422, 424, and may use a separate dark override timer for each of the shade groups 410, 412, 414 to determine when to open the motorized window treatments 440, 442, 444 of the respective shade groups 410, 412, 414. The system controller may raise the motorized window treatments 440, 442, 444 to the dark override position $P_{DK}$ (e.g., into the dark override mode) when the most recent sensor readings of each of the window sensors 420, 422, 424 of the master group 430 are below the dark override threshold $L_{TH-DK}$, or when at least one of the sensor readings is below the dark override threshold $L_{TH-DK}$ and one or more of the other sensor readings are more than the predetermined amount $\Delta_L$ from the at least one sensor reading below the dark override threshold $L_{TH-DK}$ (e.g., greater than 40% higher). The dark override timer of one of the shade groups 410, 412, 414 may be stopped if the sensor reading of the window sensor 420, 422, 424 of another shade group is above the dark override threshold $L_{TH-DK}$, and falls within the predetermined amount $\Delta_L$ (e.g., 40%) of the sensor reading of the window sensor 420, 422, 424 of the shade group that is below the dark override threshold $L_{TH-DK}$.

Each of the shade groups 410, 412, 414 may operate in accordance with the other shade groups. In an example, each of the shade groups 410, 412, 414 may be in the sunlight penetration limiting mode and the dark override threshold $L_{TH-DK}$ may be 300 FC. If the sensor reading of window sensor 420 decreased to 290 FC, the most recent sensor reading of the window sensor 422 was 320 FC, and the most recent sensor reading of the window sensor 424 was 307 FC, the system controller may not start the dark override timer for the shade group 410. The shade group 410 may be "locked" in the sunlight penetration limiting mode by the window sensors 422, 424 of the other shade groups 412, 414.

In another example, each of the shade groups 410, 412, 414 may be in the sunlight penetration limiting mode and the dark override threshold $L_{TH-DK}$ may be 300 FC. If the sensor reading of window sensor 420 decreased to 183 FC, the sensor reading of the window sensor 422 decreased to 192 FC, and the most recent sensor reading of the window sensor 424 was 301 FC, the system controller may start the dark override timers for the first and second shade groups 410, 412 since the sensor readings of the window sensors 420, 422 are below the dark override threshold $L_{TH-DK}$, but the sensor reading of the third window sensor 424 is more than the predetermined amount $\Delta_L$ (e.g., 40%) higher than the sensor readings of the window sensors 420, 422. If there are no additional light level changes for the duration of the dark-override timeout period $T_{DK-OV}$, the system controller may control the shade groups 410, 412 into the dark override mode, such that the motorized window treatments 440, 442 of the shade groups 410, 412 may move to dark override position $P_{DK}$, while the motorized window treatments 444 of the shade group 414 may stay at the same positions.

In another example, each of the shade groups 410, 412, 414 may be in the sunlight penetration limiting mode, the dark override threshold $L_{TH-DK}$ may be 300 FC, and the dark-override timeout period $T_{DK-OV}$ may be 30 minutes. If the sensor reading of window sensor 420 decreased to 290 FC, the sensor reading of window sensor 422 decreased to 285 FC, and the sensor reading of third window sensor 424 decreased to 292 FC at approximately the same time (e.g., simultaneously), the system controller may start the dark override timers for each of the shade groups 410, 412, 414, as each of the shade groups are below the dark override threshold $L_{TH-DK}$. If the sensor reading of the window sensor 422 increases to 306 before the expiration of the dark override timers, the dark override timers for each of the shade groups 410, 412, 414 of the master group 430 may be stopped before entering the dark override mode.

Figure 7:
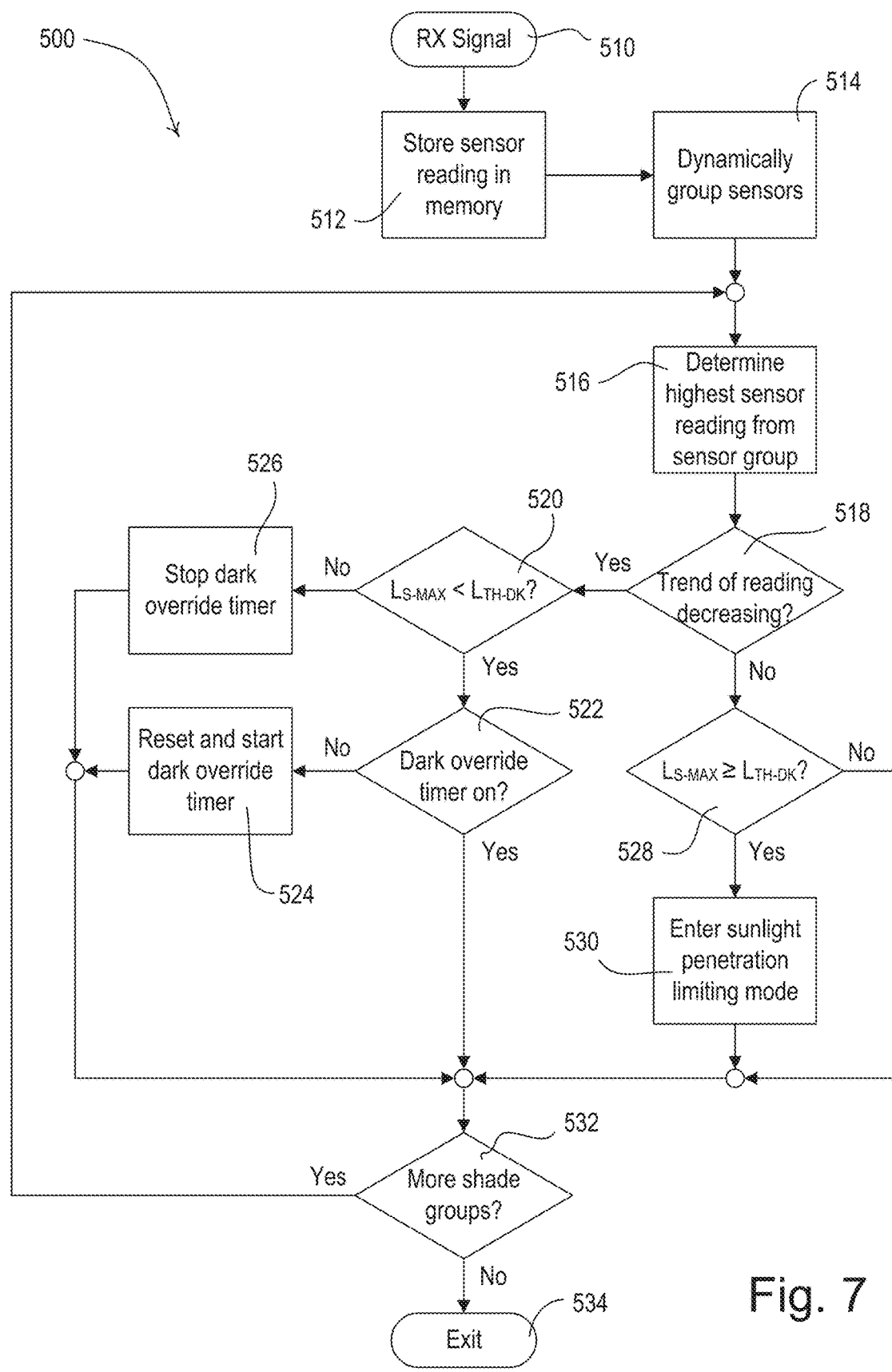
FIG. 7 is a simplified flowchart of an example control procedure for controlling a plurality of motorized roller treatments to maintain the horizontal alignment of the hembars of the motorized window treatments when sensor readings for the motorized window treatments are within a predetermined amount.

FIG. 7 is a simplified flowchart of an example control procedure 500 that may be executed by a system controller (e.g., the system controller 110 of the load control system 100 shown in FIG. 1) for controlling a plurality of motorized window treatments (e.g., the motorized roller shades 140 or the motorized window treatments 440) in response to a plurality of window sensors (e.g., the window sensors 420, 422, 424 shown in FIG. 6). The control procedure 500 may be executed by the system controller in response to receiving a digital message including a sensor reading from one of the window sensors at 510. The system controller may execute the control procedure 500 for each façade (e.g., the single façade 400 shown in FIG. 6) and/or each shade group of motorized roller shades (e.g., each of the shade groups 410, 412, 414 shown in FIG. 6) of the building. After receiving the digital message including the sensor reading at 510, the system controller may store the sensor reading received in the digital messages in memory at 512. The system controller may store at least the two recent different sensor readings (e.g., the last two different sensor readings) received from each of the window sensors in memory, such that the system controller may determine a present trend of the sensor readings of a window sensor. For example, the system controller may determine from at least the two recent different transmitted sensor readings (e.g., the last two different sensor readings) whether the sensor readings are increasing or decreasing. The different sensor readings may be consecutive sensor readings or may be spaced apart a number of sensor readings.

The system controller may dynamically group the window sensors into one or more sensor groups (e.g., subgroups) at 514. The grouping at 514 may be a dynamic regrouping of the window sensors, where the window sensors were previously assigned a group, or the grouping at 514 may be an initial grouping by the system controller. The system controller may group window sensors into groups where the sensor readings are within the predetermined amount $\Delta_L$ (e.g., 40%) of each other at 514. For example, the system controller may determine the highest sensor reading of the window sensors in the master group and may include each window sensor within the predetermined amount $\Delta_L$ of the highest sensor reading in a first group. The system controller may determine the highest sensor reading of the remaining window sensors for creating a next group of sensors (e.g., a highest sensor reading outside of the previously created group). The system controller may include the window sensors within the predetermined amount $\Delta_L$ of this highest sensor reading outside of the previously created group into a second group. The system controller may continue this process until each of the window sensors in a master group are included in a subgroup. The system controller may determine which motorized window treatments to control together based upon the window sensors in each sensor group and the relationship between the shade groups and the window sensors.

The system controller may step through the shade subgroups and analyze sensor readings of the sensor subgroup in which a shade group is included to determine how to control the motorized window treatments. At 516, the system controller may determine the group sensor value that may be representative of the sensor readings of the window sensors the subgroup to control the shade group. The group sensor value may be the highest one of the last sensor readings from the sensor group in which a selected one of the shade groups is included, but another representative group sensor value may also be selected. Referring to the shade groups of FIG. 4 as an example, the system controller may determine the highest one $L_{S-MAX}$ of the most recent sensor readings from the sensor group in which the shade group 410 is included. Referring again to FIG. 5, the system controller may compare the most recent sensor readings from the sensor group with at least one of the previously different sensor reading for the group to determine whether the trend for the sensor readings is increasing or decreasing at 518.

If the trend of the sensor readings of the window sensor from which the digital message was received is determined to be decreasing at 518, the system controller may determine if it should begin to operate in the dark override mode. For example, if the highest sensor reading $L_{S-MAX}$ (as determined at 516) is less than the dark override threshold $L_{TH-DK}$ at 520 and the dark override timer for the present shade group is not running at 522, the system controller may reset the dark override timer for the present shade group and may start the dark override timer, for example, decreasing in value with respect to time, at 524. When the dark override timer expires, the system controller may enter the dark override mode for the shade group (e.g., with a similar procedure as the dark override timer timeout procedure 350 shown in FIG. 5B). For example, the system controller may enter the dark override mode when the dark override timer expires and the highest sensor reading $L_{S-MAX}$ remains less than the dark override threshold $L_{TH-DK}$ for the duration of the dark override timer. If the highest sensor reading $L_{S-MAX}$ is not less than the dark override threshold $L_{TH-DK}$ at 520, the system controller may stop the dark override timer for the present shade group at 526 when the dark override timer is running. If the highest sensor reading $L_{S-MAX}$ (as determined at 516) is less than the dark override threshold $L_{TH-DK}$ at 520 and the dark override timer for the present shade group is running at 522, the system controller may allow the dark override timer to continue to run for the shade group. The system controller may determine whether there are more shade groups to analyze at 532. If there are more shade groups to analyze at 532, the control procedure 500 may return to 516 to determine the group sensor value (e.g., highest one $L_{S-MAX}$ of the last sensor readings from the sensor group in which the next shade group is included) and to control the shade group according to the group sensor value. The system controller may determine there are other shade groups to analyze when another shade group has a sensor reading that has changed. Otherwise, the control procedure 500 may exit at 534.

If the trend of the sensor readings of the window sensor from which the digital message was received is determined to be increasing at 518, the system controller may determine whether to enter the sunlight penetration limiting mode for the sensor group. If the system controller determines that the highest sensor reading $L_{S-MAX}$ for the sensor group is greater than or equal to the dark override threshold $L_{TH-DK}$ at 528, the system controller may enter the sunlight penetration limiting mode at 530. If the system controller determines that the highest sensor reading $L_{S-MAX}$ for the sensor group is less than the dark override threshold $L_{TH-DK}$ at 528, the system controller may continue to 532. If there are more shade groups to analyze at 532, the control procedure 500 may return to 516. Otherwise, the control procedure 500 may exit at 534. The control procedure 500 may also include steps for controlling one or more of the shade groups into the bright override mode (e.g., as in the control procedure 300 of FIG. 5A).

Figure 8:
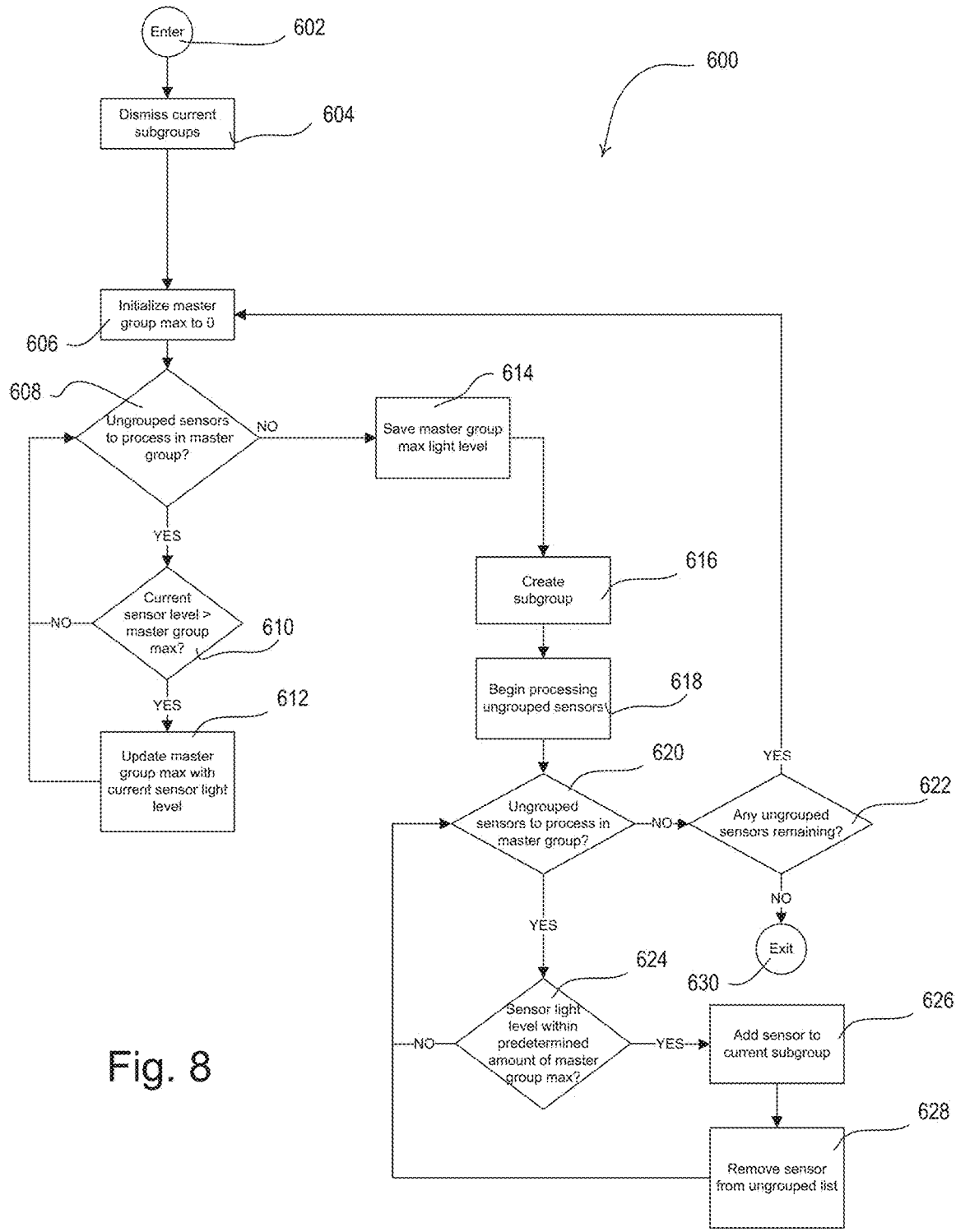
FIG. 8 is a simplified flowchart of an example procedure for determining real time sensor grouping.

FIG. 8 shows a simplified flowchart of an example procedure 600 that may be executed by a system controller (e.g., the system controller 110 of the load control system 100 shown in FIG. 1) for performing dynamic window sensor grouping (e.g., the dynamic grouping of the window at 514 shown in FIG. 7). As shown in FIG. 8, the system controller may enter the procedure 600 at 602. At 604, the system controller may dismiss the current subgroups. For example, the system controller may delete or ignore the previously stored subgroups to create another set of subgroups from the master group.

To create subgroups, the system controller may determine the subgroups based on the master group maximum sensor light level identified in the sensor reading for the sensors in the master group. For example, the system controller may initialize a master group maximum sensor light level to zero at 606. The master group maximum sensor light level may be a maximum sensor light level against which the sensor light level of the sensors in the master group may be measured to determine the maximum value. The master group may include the sensors programmed to the same façade that may be divided up into subgroups. The system controller may determine whether there are ungrouped sensors to be processed in the master group at 608 for determining the maximum sensor light level of the sensors in the master group. The ungrouped sensors in the master group may each be processed to determine the maximum sensor light level for the sensors in the master group. For example, if there are ungrouped sensors in the master group that have not been processed to determine if their sensor light level is greater than the current master group maximum sensor light level, the system controller may proceed to 610 to compare the current sensor light level with the master group maximum sensor light level. If the current sensor light level is not greater than the master group maximum sensor light level, the procedure 600 may return to 608. If the current sensor light level is greater than the master group maximum sensor light level, the master group maximum sensor light level may be updated with the current sensor light level at 612.

When the system controller determines that there are no more ungrouped sensors to process for determining the master group maximum sensor light level, the procedure 600 may save the master group maximum sensor light level at 614. The system controller may use the master group maximum sensor light level to create subgroups within the master group. For example, at 616, the system controller may create a subgroup. The subgroup may be created by generating a name or other identifier of the subgroup. The system controller may begin processing the ungrouped sensors (e.g., sensors without a subgroup) in the master group at 618. To process the ungrouped sensors in the master group, the system controller may identify the sensor light levels for the ungrouped sensors. At 620, the system controller may determine whether there are ungrouped sensors to process in the master group. If the system controller determines that there are ungrouped sensors in the master group, the system controller may select a sensor light level of an ungrouped sensor (e.g., that has not already been analyzed to determine whether the sensor light level is within the predetermined amount of the master group maximum sensor light level) and may analyze the sensor light level to determine whether the sensor light level is within the predetermined amount of the master group maximum sensor light level at 624. If the sensor light level is not within the predetermined amount of the master group maximum sensor light level, the sensor light level may be flagged as already being analyzed and the procedure 600 may return to 620. If the sensor light level is determined to be within the predetermined amount of the master group maximum sensor light level at 624, the sensor from which the sensor light level is received may be added to the sensor subgroup with the sensor having the sensor light level that is set as the master group maximum sensor light level. The sensor that is added to the subgroup at 626 may be removed from the ungrouped list at 628. The procedure 600 may return to 620 to continue to analyze sensors that have not been flagged or added to a subgroup.

If there are no more ungrouped sensors to process in the master group at 620 (e.g., the sensors in the master group are flagged or added to a subgroup), the system controller may determine whether there are any ungrouped sensors remaining. If the sensors in the master group are each added to a subgroup, then the procedure 600 may end at 630. If there are ungrouped sensors remaining at 622, the system controller may return to 606 to initialize the master group maximum sensor light level to zero and continue the procedure 600 with the ungrouped sensors that remain in the master group.

Figure 9A:
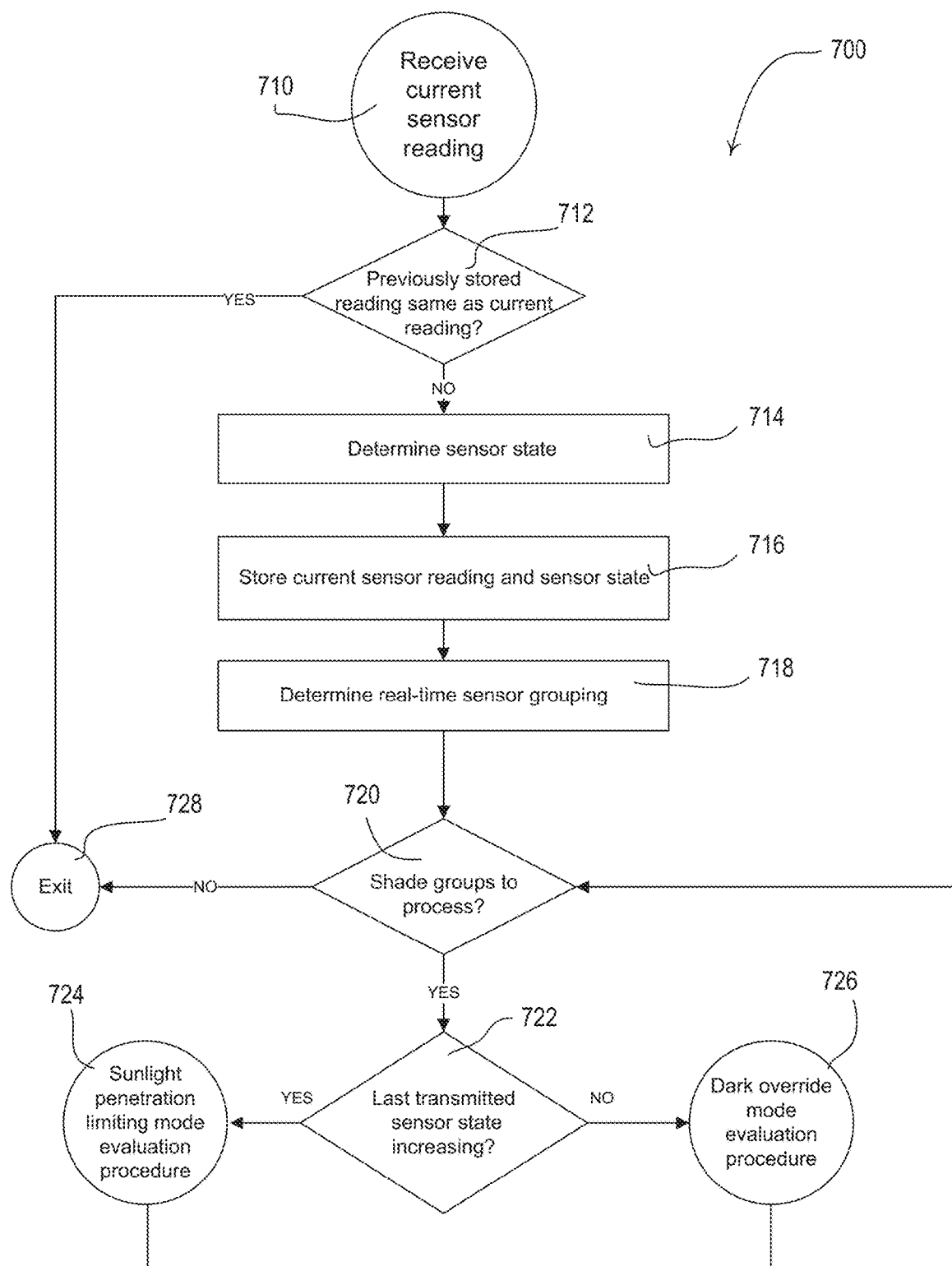
FIG. 9A is a simplified flowchart of another example control procedure for controlling a plurality of motorized roller treatments to maintain the horizontal alignment of the hembars of the motorized window treatments when sensor readings for the motorized window treatments are within a predetermined amount.
Figure 9B:
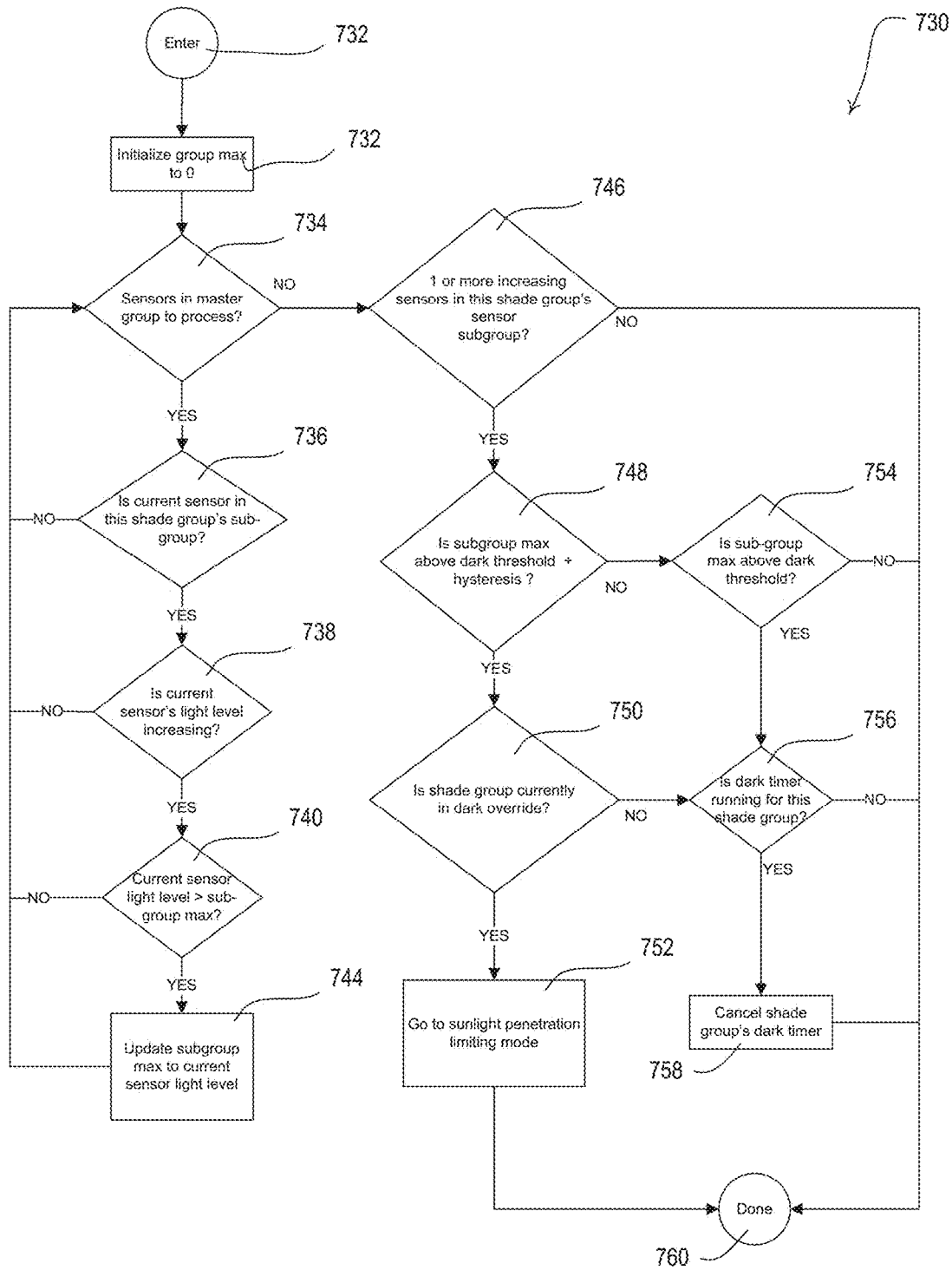
FIG. 9B is a simplified flowchart of an example sunlight penetration limiting mode evaluation procedure.
Figure 9C:
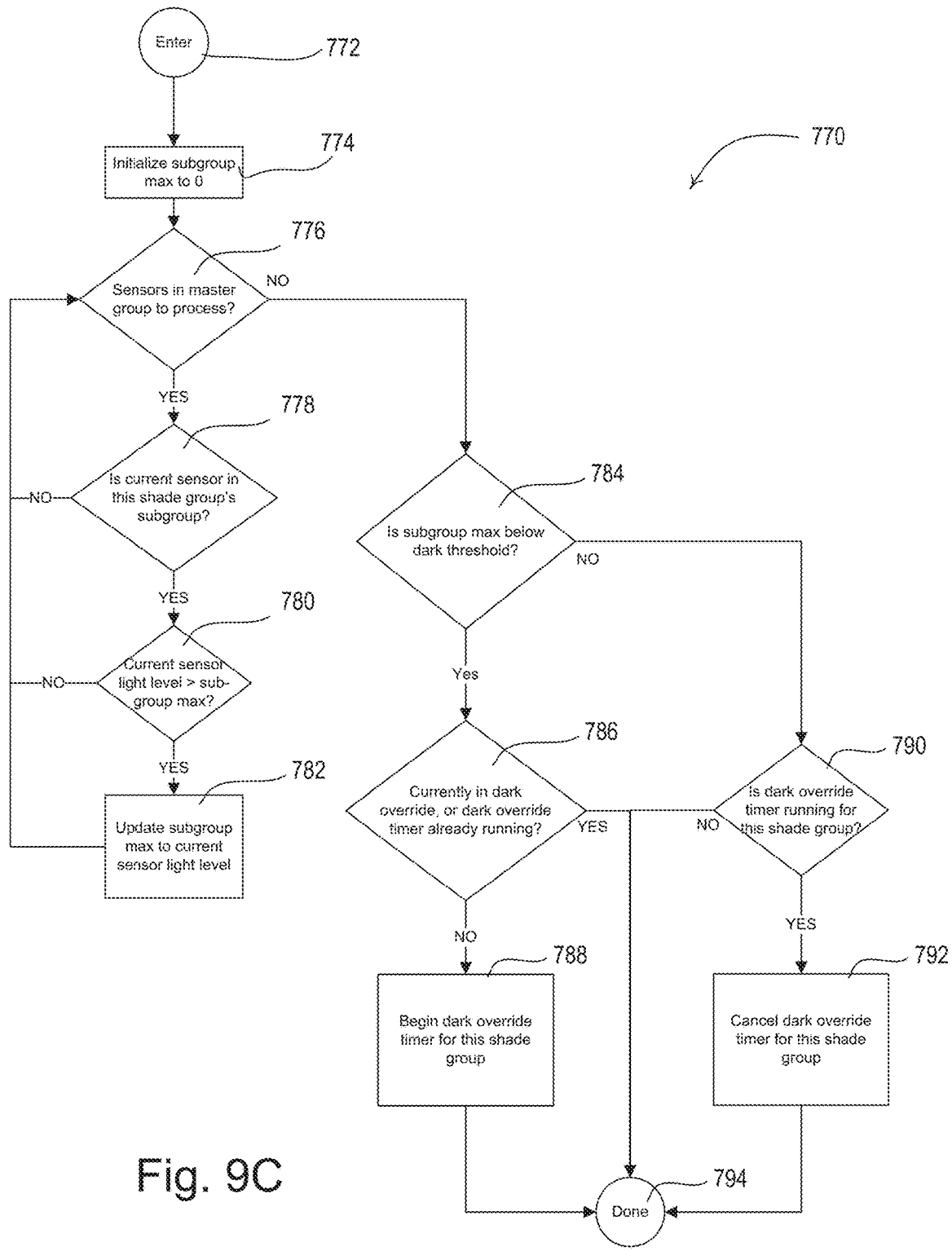
FIG. 9C is a simplified flowchart of an example dark override mode evaluation procedure.

FIGS. 9A-9C show a simplified flowchart of an example procedure 700 that may be executed by a system controller (e.g., the system controller 110 of the load control system 100 shown in FIG. 1) for controlling a plurality of motorized window treatments (e.g., the motorized roller shades 140 or the motorized window treatments 440) in response to a plurality of window sensors (e.g., the window sensors 420, 422, 424 shown in FIG. 6). The system controller may execute one or more portions of the procedure 700 to determine a sensor state and/or control one or more shade groups according to the sensor state. The control procedure 700 may be executed by the system controller in response to receiving a digital message including a sensor reading from one or more of the window sensors at 710. If the current sensor reading is the same as the previously stored sensor reading from that sensor at 712, the control procedure 700 may exit at 728. If the current sensor reading is different from the previously stored sensor reading from that sensor at 712, the system controller may determine the sensor state for the sensor at 714. For example, the system controller may determine the trend of the sensor readings (e.g., whether the sensor readings are increasing or decreasing) for the sensor. The system controller may store in memory the current sensor reading, along with the previous sensor reading, and the sensor state (e.g., the trend of the sensor readings) for each sensor at 716. The sensor readings may be received at 710 and the sensor state may be determined at 714 and/or stored at 716 for each sensor in a master group that has a change in the sensor readings determined at 712.

At 718, the system controller may determine real-time sensor grouping (e.g., as in 514 of the control procedure 500 shown in FIG. 7 and/or the control procedure 600 shown in FIG. 8) for the master group. For example, the system controller may group window sensors into sensor groups (e.g., subgroups) where the sensor readings are within a predetermined amount $\Delta_L$ (e.g., 40%) of each other. The system controller may determine whether there are more shade groups to process at 720 for controlling according to the dark override mode at 726 or the sunlight penetration limiting mode at 724. The system controller may re-evaluate the operational mode for each shade group on each façade that results from the real-time sensor grouping at 718 in case the sensor reading from 710 causes a change in the operational mode (e.g., a sensor that was holding a sensor group in an operational mode may have left the sensor group at 718). In this case, the system controller may iterate through each shade group at 720 until each of the shade groups have been re-evaluated. In another example, the system controller may determine at 720 to evaluate the shade groups from the sensor group from which the window sensor that transmitted the digital message was received at 710 and may update its operational mode without determining to process the other shade groups at 720. If there are no shade groups to process at 720, the control procedure 700 may exit at 728.

If there are shade groups to process at 720, the system controller may determine whether to perform a sunlight penetration limiting mode evaluation procedure at 724 or a dark override mode evaluation procedure at 726. For example, if there are more shade groups to process at 720, the system controller may retrieve the previously transmitted sensor state for the shade group and may compare the current sensor state to the previously transmitted sensor state. If the current sensor state for the shade group being processed is determined to be increasing at 722, the system controller may execute a sunlight penetration limiting mode evaluation procedure for the shade group at 724 (e.g., as shown in FIG. 9B). The system controller may execute a sunlight penetration limiting mode evaluation procedure at 724 and may return to 720 to determine if there are more shade groups to process. If the current sensor state for the shade group is determined to be decreasing at 722, the system controller may execute a dark override mode evaluation procedure for the shade group at 726 (e.g., as shown in FIG. 9C). The system controller may execute a dark override mode evaluation procedure at 726 and may return to 720 to determine if there are more shade groups to process.

FIG. 9B shows a simplified flowchart of an example procedure 730 that may be executed by a system controller (e.g., the system controller 110 of the load control system 100 shown in FIG. 1) for evaluating the sunlight penetration limiting mode. As shown in FIG. 9B, the procedure 730 may be entered at 732. The system controller may identify the sensors in each subgroup of the master group that have lighting levels that are increasing and may determine the subgroup maximum sensor light level. For example, the system controller may initialize the subgroup maximum sensor light level to zero at 732. The subgroup maximum sensor light level may be the group sensor value that is representative of the sensor readings for the subgroup. At 734, the system controller may determine whether there are sensors to process in the master group for updating the group sensor value for a subgroup. The system controller may process each of the sensors in the subgroup to determine whether to update the group sensor value for a subgroup. If the system controller determines that there are more sensors to process at 734, the system controller may determine whether the current sensor of the master group is in an identified shade group's sensor subgroup at 736 for being processed. The system controller may determine, at 738, whether the current sensor has an increasing light level. If the system controller determines that the current sensor is in an identified shade group's sensor subgroup at 736 for being processed and the current sensor's light level is increasing at 738, the system controller may determine whether the current sensor light level is greater than the subgroup maximum sensor light level at 740. If the current sensor's light level is determined to be greater than the subgroup maximum sensor light level at 740, the system controller may update the subgroup maximum sensor light level for the subgroup to the current sensor's light level at 744.

The system controller may return to 734 to determine whether there are other sensors in the master group to process for updating a subgroup maximum sensor light level for an identified subgroup. If the system controller determines that the current sensor being processed is not in the identified shade group's sensor subgroup at 736, the current sensor light level is not increasing at 738, and/or the current sensor light level is not greater than the subgroup maximum sensor light level, the system controller may return to 734 to determine whether there are other sensors in the master group to process. The system controller may determine that the current sensor's light level is increasing at 738 to prevent sensors that have light levels that may be decreasing, but are above the brightness threshold, from causing the sensor groups that were previously in dark override mode to exit dark override mode.

The system controller may determine at 734 that there are no more sensors in the master group to process for determining whether to update the subgroup maximum sensor light level and may proceed to use the subgroup maximum sensor light level to control the shade group. For example, the system controller may determine how to control the shade levels of a shade group based on the subgroup maximum sensor light level. At 746, the system controller may determine whether there are one or more sensors in the identified shade group's sensor subgroup have an increasing light level. If one or more of the sensors in the identified sensor subgroup are determined not to have an increasing light level at 746, the procedure 730 may finish at 760.

If one or more of the sensors in the identified sensor subgroup are determined to have an increasing light level at 746, the system controller may determine if the subgroup maximum sensor light level is greater than a dark override threshold, plus a dark override hysteresis value, at 748. The dark override hysteresis value may indicate a threshold amount that the intensity the daylight may rise above the dark override threshold before the automated control of the motorized window treatment may return to the automated control state or otherwise leave the dark override state. The dark override hysteresis may be set to zero or a null value if the dark override hysteresis is not implemented. If the system controller determines, at 748, that the subgroup maximum sensor light level is greater than a dark override threshold, plus a dark override hysteresis value, the system controller may determine whether the shade group for the current sensor is in dark override at 750. If the shade group for the current sensor is in dark override, the system controller may enter the sunlight penetration mode at 752. If the system controller determines, at 748, that the subgroup maximum sensor light level is not greater than a dark override threshold, plus a dark override hysteresis value, the system controller may determine whether the subgroup maximum sensor light level is above the dark override threshold at 754. If the system controller determines, at 754, that the subgroup maximum sensor light level is above the dark override threshold, the system controller may determine that the dark override timer running for the shade group at 756 and may cancel the shade group's dark override timer at 758. The system controller may return to 746 to evaluate other shade groups. If the system controller determines that the subgroup maximum sensor light level is not above the dark override threshold at 754 or that the dark override timer is not running for the shade group at 756, the system controller may return to 746 to evaluate other shade groups.

The procedure 730 may be run for each sensor subgroup. The system controller may perform the procedure 730 for each sensor subgroup that has a sensor that has a sensor reading that has changed, or that has changed by a predefined threshold.

FIG. 9C shows a simplified flowchart of an example procedure 770 that may be executed by a system controller (e.g., the system controller 110 of the load control system 100 shown in FIG. 1) for evaluating the dark override mode. As shown in FIG. 9C, the procedure 770 may be entered at 772. The system controller may determine the subgroup maximum sensor light level for each subgroup of sensors for shade groups. For example, the system controller may initialize the subgroup maximum sensor light level to zero at 774. The subgroup maximum sensor light level may be the subgroup sensor value that is representative of the sensor readings for the subgroup, but another subgroup sensor value may be similarly used. At 776, the system controller may determine whether there are sensors to process in the master group. Each sensor in the master group may be processed when a sensor subgroup changes, for example. If the system controller determines that there are sensors to process at 776, the system controller may determine whether the current sensor of the master group is in an identified shade group's sensor subgroup at 778 for being processed. If the system controller determines that the current sensor is in an identified shade group's sensor subgroup at 778 for being processed, the system controller may determine whether the current sensor light level is greater than the subgroup maximum sensor light level at 780. If the current sensor's light level is determined to be greater than the subgroup maximum sensor light level at 780, the system controller may update the subgroup maximum sensor light level for the subgroup to the current sensor's light level at 782.

The system controller may return to 776 to determine whether there are other sensors in the master group to process. Additionally, if the system controller determines that the current sensor is not in the identified shade group's sensor subgroup at 778 and/or the current sensor light level is not greater than the subgroup maximum sensor light level at 780, the system controller may return to 774 to determine whether there are other sensors in the master group to process.

The system controller may determine at 734 that there are no more sensors in the master group to process for determining whether to update the subgroup maximum sensor light level and may proceed to use the subgroup maximum sensor light level to determine how the subgroup maximum sensor light level affects a shade group. For example, the system controller may determine how to control the shade levels of a shade group based on the subgroup maximum sensor light level. At 784, the system controller may determine whether each subgroup maximum sensor light level is below the dark threshold. If a subgroup maximum sensor light level is below the dark threshold, the system controller may determine, at 786, whether each shade group controlled by the subgroup maximum sensor light level is in a dark override mode or has a dark override timer currently running. If the shade group controlled by the subgroup maximum sensor light level is not in a dark override mode and does not have a dark override timer currently running, the system controller may begin a dark override timer for the shade group at 788 and the procedure 770 may end for that shade group at 794. If the system controller determines, at 786, that each shade group controlled by the subgroup maximum sensor light level is in a dark override mode or has a dark override timer currently running, the procedure 770 may end at 794.

If, at 784, the system controller determines a subgroup maximum sensor light level is not below the dark threshold, the system controller may determine whether the dark override timer is running for each shade group controlled according to the subgroup maximum sensor light level at 790. If not, the system controller may end the procedure 770 at 794. If the system controller determines that the dark override timer is running for a shade group controlled according to the subgroup maximum sensor light level at 790, the system controller may cancel the dark override timer for the shade group at 792 and may end at 794.

FIGS. 10A-10E illustrate an example motorized window treatment system 800 for controlling a plurality of motorized window treatments (e.g., the motorized window treatments 440, 442, 444 arranged along the single façade 400 as shown in FIG. 6) at different periods of time in order to maintain the horizontal alignment of the hembars of the motorized window treatments. The hembars may be aligned when the sensor readings for each subgroup are within a predetermined amount of one another.

Figure 10A:
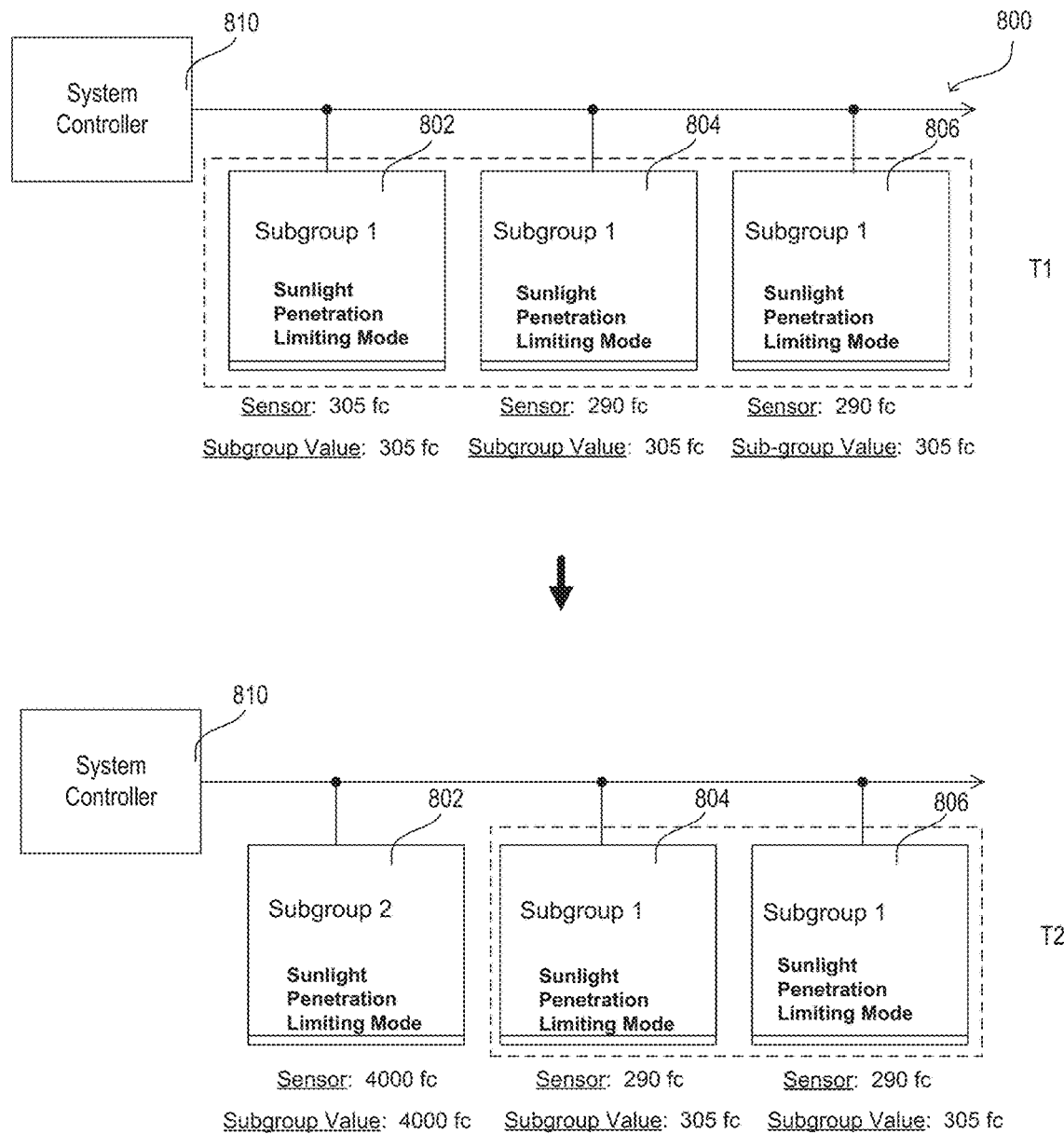
FIGS. 10A-10G show an example system for controlling a plurality of motorized window treatments at different instants in time in order to maintain the horizontal alignment of the hembars of the motorized window treatments when sensor readings for the motorized window treatments are within a predetermined amount.

As shown in FIG. 10A, the motorized window treatment system 800 may include shade groups 802, 804, 806. The shade groups 802, 804, 806 may each include one or more motorized window treatments for controlling one or more respective shades. The motorized window treatments of the shade groups 802, 804, 806 may be controlled by one or more system controllers, such as system controller 810. The system controller 810 may receive sensor readings from respective window sensors for each of the shade groups 802, 804, 806 that indicate a sensed light level for controlling each of the shade groups 802, 804, 806. The respective window sensors for each of the shade groups 802, 804, 806 may include one or more window sensors. The system controller may identify a subgroup sensor value to be representative of the sensor readings of each of the shade groups 802, 804, 806 within the same subgroup. For example, the subgroup sensor value may be the subgroup maximum sensor light level for the subgroup at a given time. The subgroup sensor value may be the group sensor value for an identified subgroup of a master group.

As shown in FIG. 10A, the system controller 810 may receive a sensor reading for shade groups 802, 804, 806 at a time T1 that may identify a sensed light level of 305 FC, 290FC, and 290 FC for each of the respective shade groups 802, 804, 806. The system controller 810 may control the shade groups 802, 804, 806 according to a dark override threshold $L_{TH-DK}$ of 300 FC. The system controller 810 may include each of the shade groups 802, 804, 806 in the same subgroup, as the sensor readings for each shade group 802, 804, 806 may be within a predefined range of one another, which may be forty percent for example. The system controller 810 may control the shade groups 802, 804, 806 according to the same subgroup sensor value. The subgroup sensor value may be the sensor reading (e.g., daylight level) of shade group 802, which may be the sensor light level of 305 FC. As the subgroup sensor value is above the dark override threshold $L_{TH-DK}$ of 300 FC, each of the shade groups 802, 804, 806 in the subgroup may be controlled according to the sunlight penetration limiting mode. The shade groups 804, 806 may be controlled according to the sunlight penetration limiting mode even though the sensor reading for the shade groups 804, 806 may indicate a sensed light level of 290 FC, which may be below the dark override threshold $L_{TH-DK}$ of 300 FC.

The system controller 810 may receive an updated sensor reading for shade group 802 at time T2. The updated sensor reading for shade group 802 may be 4000 FC. As the updated sensor reading for shade group 802 may be outside of the predefined range of the sensor readings for the other shade groups 804, 806 (e.g., forty percent), the shade group 802 may be included in another subgroup and may be controlled according to the other subgroup. Though the shade group 802 may exit the subgroup of shade groups 804, 806, the sensor reading of shade group 802 at time T1 (e.g., 305 FC) may continue to be the subgroup sensor value according to which the shade groups 804, 806 are controlled. For example, even though shade groups 804, 806 may have a sensor light level that is below the dark override threshold $L_{TH-DK}$ of 300 FC, the system controller 810 may refrain from starting the dark override timer as the shade groups 804, 806 may be controlled according to the subgroup sensor value of 305 FC. This subgroup sensor value may continue to control the shade groups 804, 806 that remain in the subgroup, as the sensor light level for the shade groups 804, 806 remain unchanged. Changing the subgroup sensor value for the shade groups 804, 806 that remain in the subgroup when the sensed light level for the shade groups 804, 806 remains unchanged may be distracting or confusing to occupants. The system controller 810 may reconfigure the subgroup sensor value for the shade groups 804, 806 that remain in the subgroup upon receiving an updated sensor reading for at least one of the shade groups 804, 806.

Figure 10B:
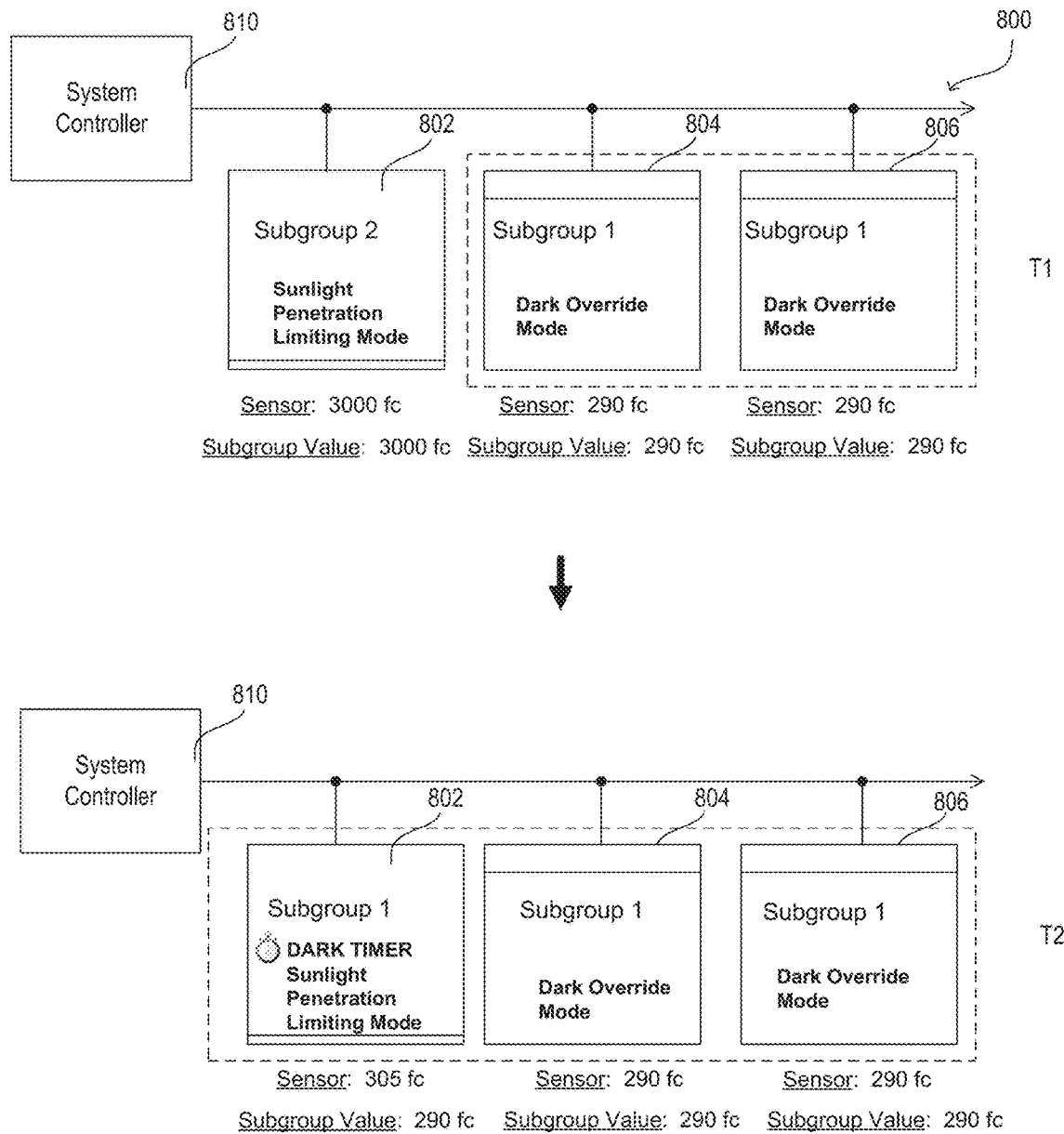

FIG. 10B shows an example of how the system controller 810 may control a subgroup when the shade group 802 enters the subgroup. As shown in FIG. 10B, the shade group 802 may be included in a different subgroup than shade groups 804, 806 at time T1. The shade group 802 may be in a different subgroup because the sensor reading for shade group 802 may indicate a light level (e.g., 3000 FC) that is outside of the predefined range (e.g., forty percent) of the light levels for the sensor readings of the subgroup in which the shade groups 804, 806 are controlled.

The subgroup sensor value according to which the shade groups 804, 806 may be controlled may be 290 FC, which may be below the dark override threshold $L_{TH-DK}$ of 300 FC. As the subgroup sensor value according to which the shade groups 804, 806 are controlled is below the dark override threshold $L_{TH-DK}$, the shade groups 804, 806 may be in the dark override mode at time T1. The shade group 802 may be in the sunlight penetration limiting mode at time T1, as the subgroup sensor value according to which the shade group 802 may be controlled may be 3000 FC, which may be above the dark override threshold $L_{TH-DK}$ of 300 FC and a dark override hysteresis.

At time T2, the system controller 810 may receive an updated sensor reading from the sensor for the shade group 802. The updated sensor reading from the sensor for the shade group 802 may indicate a light level (e.g., 305 FC) that is within the predefined range (e.g., forty percent) of the light levels for the subgroup in which the shade groups 804, 806 are controlled and the system controller 810 may include the shade group 802 in the same subgroup as the shade groups 804, 806. When the shade group 802 joins the subgroup of the shade groups 804, 806, the subgroup may continue to be controlled according to the same subgroup sensor value (e.g., 290 FC). The system controller 810 may update the subgroup sensor value using the sensor light levels of the shade groups 802, 804, 806 when an updated sensor light level of one of the shade groups 804, 806 that were members of the subgroup at time T1 is received at the system controller 810.

The system controller 810 may start the dark override timer for the shade group 802 when the shade group joins the subgroup of the shade groups 804, 806 for putting the shade group 802 in the dark override mode, even though the sensor reading for the shade group 802 may be above the dark override threshold $L_{TH-DK}$ and the dark override hysteresis. The system controller 810 may control the shade group 802 according to the existing subgroup sensor value (e.g., 290 FC) when the shade group 802 joins the subgroup of the shade groups 804, 806, because the sensor light level for the shade groups 804, 806 have gone unchanged. Since the sensor light level for the shade group 802 has changed and is closer to the existing subgroup sensor value (e.g., 290 FC) according to which the shade groups 804, 806 are being controlled, the system controller 810 may control the shade group 802 according to the existing subgroup configuration.

Figure 10C:
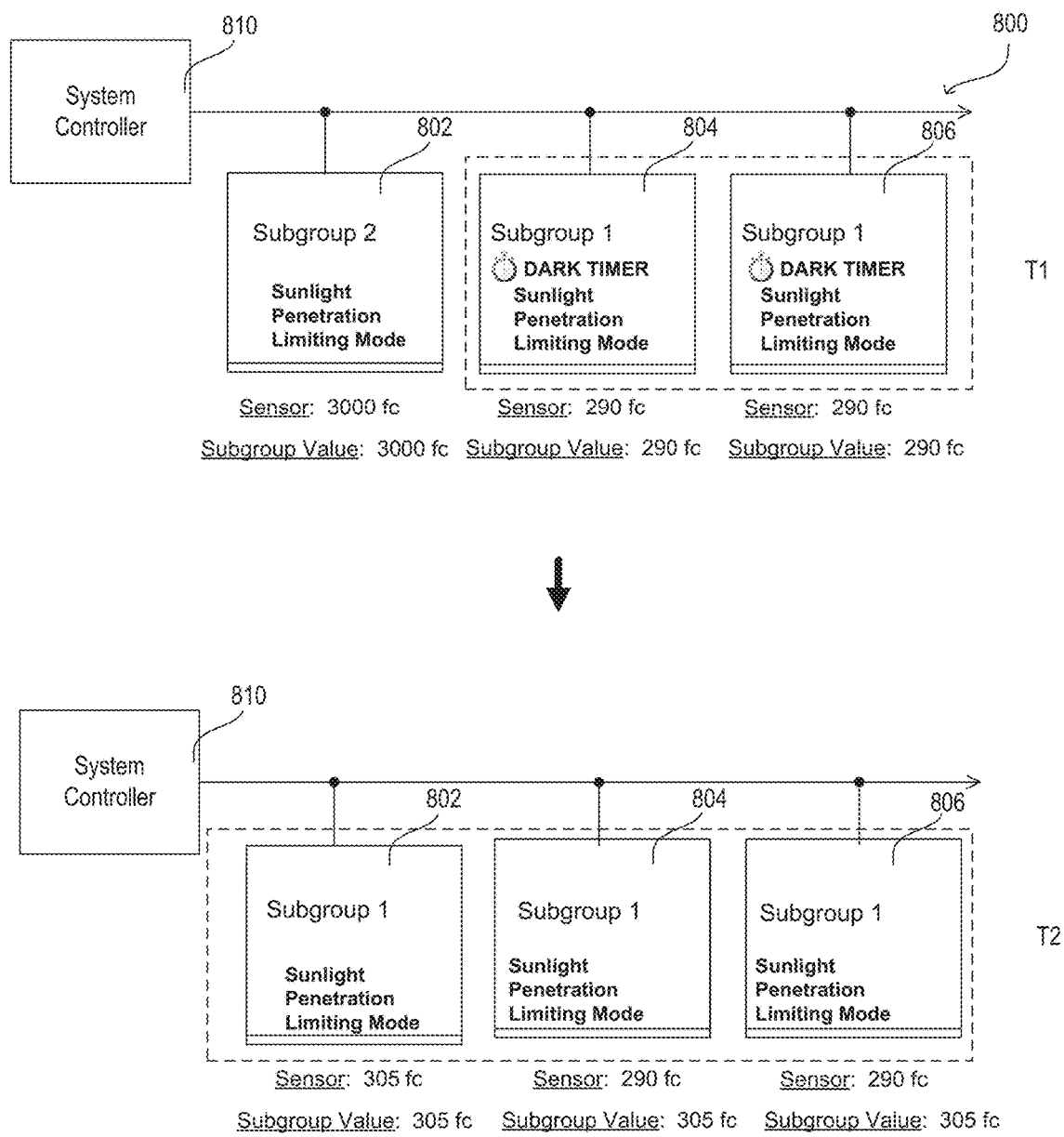

FIG. 10C shows another example of how the system controller 810 may control a subgroup when the shade group 802 enters the subgroup. As shown in FIG. 10C, the shade group 802 may be included in a different subgroup than shade groups 804, 806 at time T1. The shade group 802 may be in a different subgroup because the sensor reading for shade group 802 may indicate a light level (e.g., 3000 FC) that is outside of the predefined range (e.g., forty percent) of the light levels for the subgroup in which the shade groups 804, 806 are controlled.

The subgroup sensor value according to which the shade groups 804, 806 may be controlled may be 290 FC, which may be below the dark override threshold $L_{TH-DK}$ of 300 FC. As the subgroup sensor value according to which the shade groups 804, 806 are controlled is below the dark override threshold $L_{TH-DK}$, the system controller 810 may start a dark override timer for shade groups 804, 806 at time T1, while the shade groups 804, 806 may be in the sunlight penetration limiting mode. The shade group 802 may be in the sunlight penetration limiting mode at time T1, as the subgroup sensor value according to which the shade group 802 may be controlled may be 3000 FC, which may be above the dark override threshold $L_{TH-DK}$ of 300 FC and a dark override hysteresis.

At time T2, the system controller 810 may receive an updated sensor reading from the sensor for the shade group 802. The updated sensor reading from the sensor for the shade group 802 may indicate a light level (e.g., 305 FC) that is within the predefined range (e.g., forty percent) of the light levels for the subgroup in which the shade groups 804, 806 are controlled and the system controller 810 may include the shade group 802 in the same subgroup as the shade groups 804, 806. When the shade group 802 joins the subgroup of the shade groups 804, 806, the system controller 810 may identify that a dark override timer has been started for the shade groups 804, 806, but the shade groups 804, 806 have not yet entered the dark override mode at time T2. Because the shade groups 804, 806 have not yet entered the dark override mode at time T2 and the dark override timer is counting, the system controller 810 may update the subgroup sensor value for the subgroup. The subgroup sensor value may be updated at time T2 to the sensor light level for shade group 802 (e.g., 305 FC). The subgroup sensor value for the subgroup of shade groups 802, 804, 806 may be updated to above the dark override threshold $L_{TH-DK}$ and the dark override hysteresis, which may cause the system controller 810 to cancel the dark override timer for shade groups 804, 806. The shade groups 802, 804, 806 may continue to operate in the sunlight penetration limiting mode at time T2.

Figure 10D:
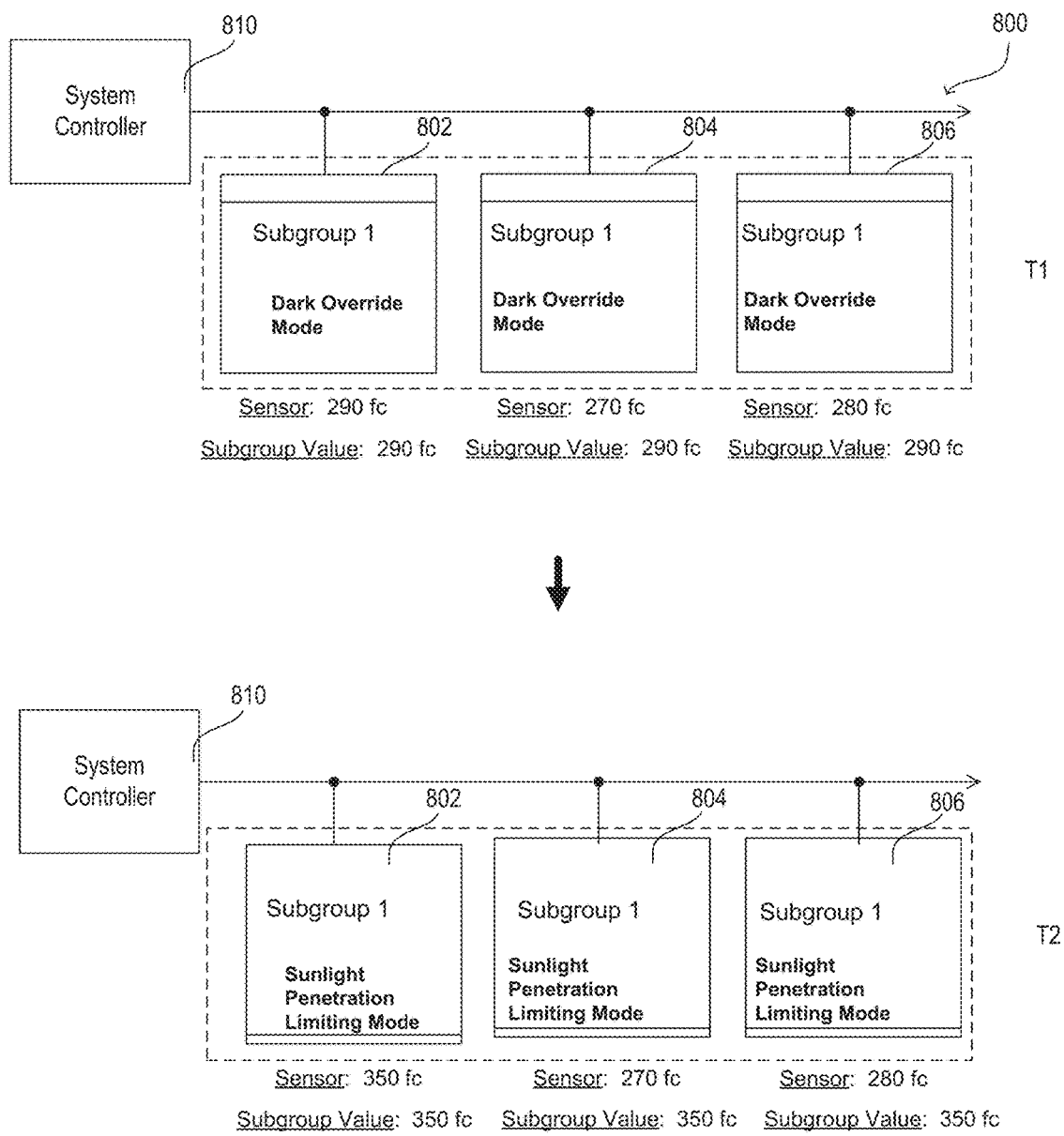

FIG. 10D shows an example of how the system controller 810 may control a subgroup according to an increased subgroup sensor value. As shown in FIG. 10D, the shade groups 802, 804, 806 may be included in the same subgroup at time T1. The shade groups 802, 804, 806 may be in the same subgroup because the sensor reading for the shade groups 802, 804, 806 may indicate light levels that are within the same predefined range (e.g., forty percent). The system controller 810 may control the shade groups 802, 804, 806 according to the dark override mode at time T1. The system controller 810 may identify the subgroup sensor value (e.g., 290 FC) for the subgroup at time T1 based on the maximum sensor reading for the shade groups 802, 804, 806. As the subgroup sensor value (e.g., 290 FC) may be below the dark override threshold $L_{TH-DK}$ (e.g., 300 FC), the shade groups 802, 804, 806 may be controlled according to the dark override mode at time T1.

At time T2, the system controller 810 may receive an updated sensor reading from the sensor for the shade group 802. The updated sensor reading from the sensor for the shade group 802 may indicate a light level (e.g., 350 FC) that remains within the predefined range (e.g., forty percent) of the light levels for the subgroup in which the shade groups 804, 806 are controlled, so the shade groups 802, 804, 806 may remain within the same subgroup. The system controller 810 may update the subgroup sensor value (e.g., 350 FC) to the sensor reading from the sensor for the shade group 802 and may control the shade groups 802, 804, 806 according to the updated subgroup sensor value (e.g., 350 FC). The updated subgroup sensor value (e.g., 350 FC) may be increased at time T2 to a light level that is above the dark override threshold $L_{TH-DK}$ and the dark override hysteresis and may cause the system controller 810 to control the shade groups 802, 804, 806 in the subgroup to be controlled according to the sunlight penetration limiting mode.

Figure 10E:
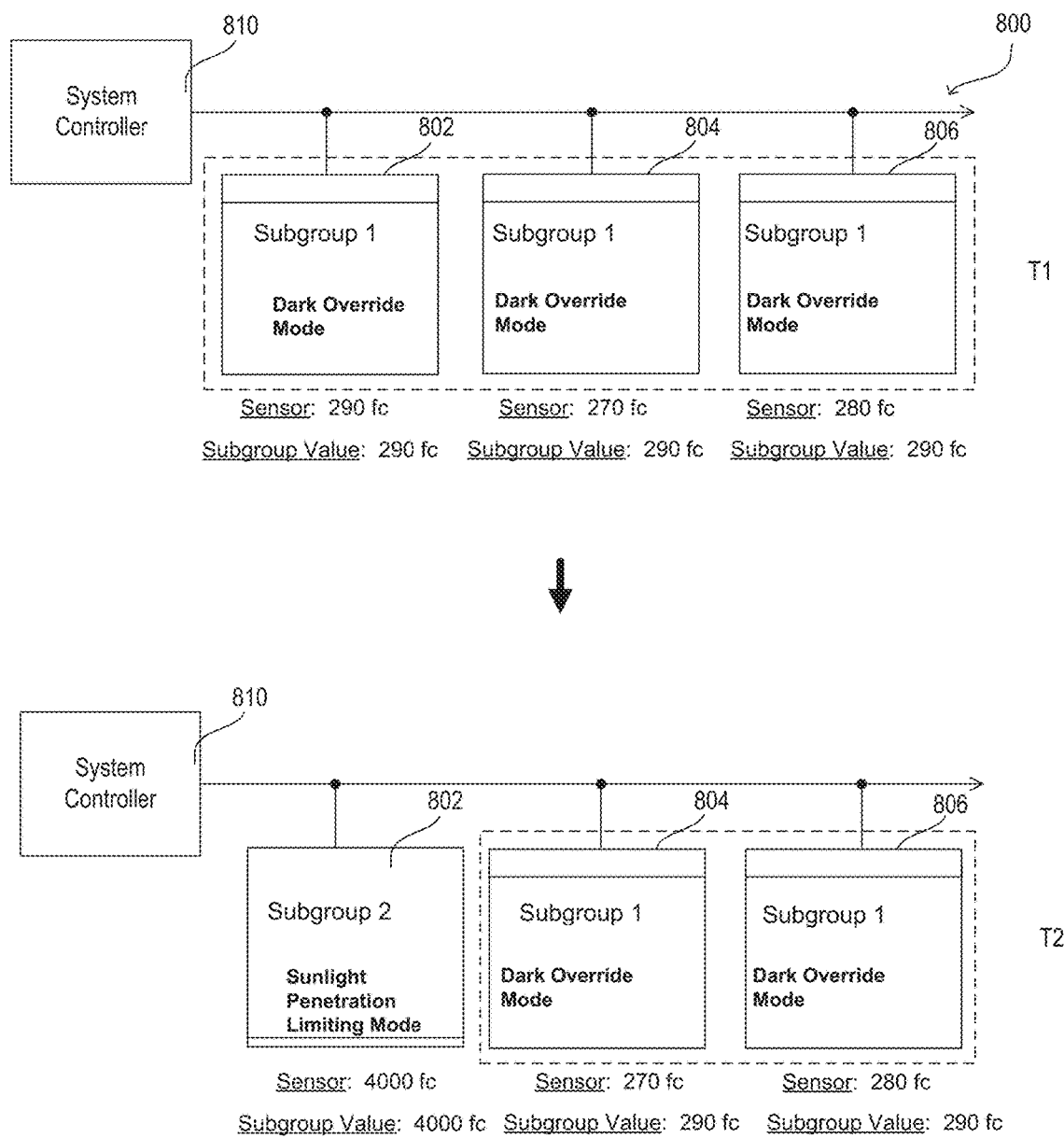

FIG. 10E shows an example of how the system controller 810 may control subgroups when the shade group 802 leaves a subgroup and enters another subgroup. As shown in FIG. 10E, the shade groups 802, 804, 806 may be included in the same subgroup at time T1. The shade groups 802, 804, 806 may be in the same subgroup because the sensor reading for the shade groups 802, 804, 806 may indicate light levels that are within the same predefined range (e.g., forty percent). The system controller 810 may control the shade groups 802, 804, 806 according to the dark override mode at time T1. The system controller 810 may identify the subgroup sensor value (e.g., 290 FC) for the subgroup at T1 based on the maximum sensor reading for the shade groups 802, 804, 806. As the subgroup sensor value (e.g., 290 FC) may be below the dark override threshold $L_{TH-DK}$ (e.g., 300 FC), the shade groups 802, 804, 806 may be controlled according to the dark override mode at time T1.

At time T2, the system controller 810 may receive an updated sensor reading from the sensor for the shade group 802. The updated sensor reading from the sensor for the shade group 802 may indicate a light level (e.g., 4000 FC) that is outside of the predefined range (e.g., forty percent) of the light levels for the subgroup in which the shade groups 804, 806 are controlled, so the shade group 802 may be removed from the subgroup in which the shade groups 804, 806 are controlled. The shade group 802 may enter another subgroup that includes the light level of the shade group 802 (e.g., 4000 FC) as the subgroup sensor value. As the subgroup sensor value for the shade group 802 is above the dark override threshold $L_{TH-DK}$ and the dark override hysteresis, the shade group 802 may enter the sunlight penetration limiting mode at time T2. The shade group 802 leaving the subgroup according to which the system controller 810 controls the shade groups 804, 806 may not affect the subgroup. For example, the subgroup according within the shade groups 804, 806 are being controlled may remain in the dark override mode at time T2 and/or maintain control according to the subgroup sensor value (e.g., 290) according to which the subgroup was controlled at time T1. The subgroup sensor value (e.g., 290) for the subgroup according within the shade groups 804, 806 are being controlled a time T2 may be updated when the sensor reading for shade group 804 and/or shade group 806 are updated.

Figure 10F:
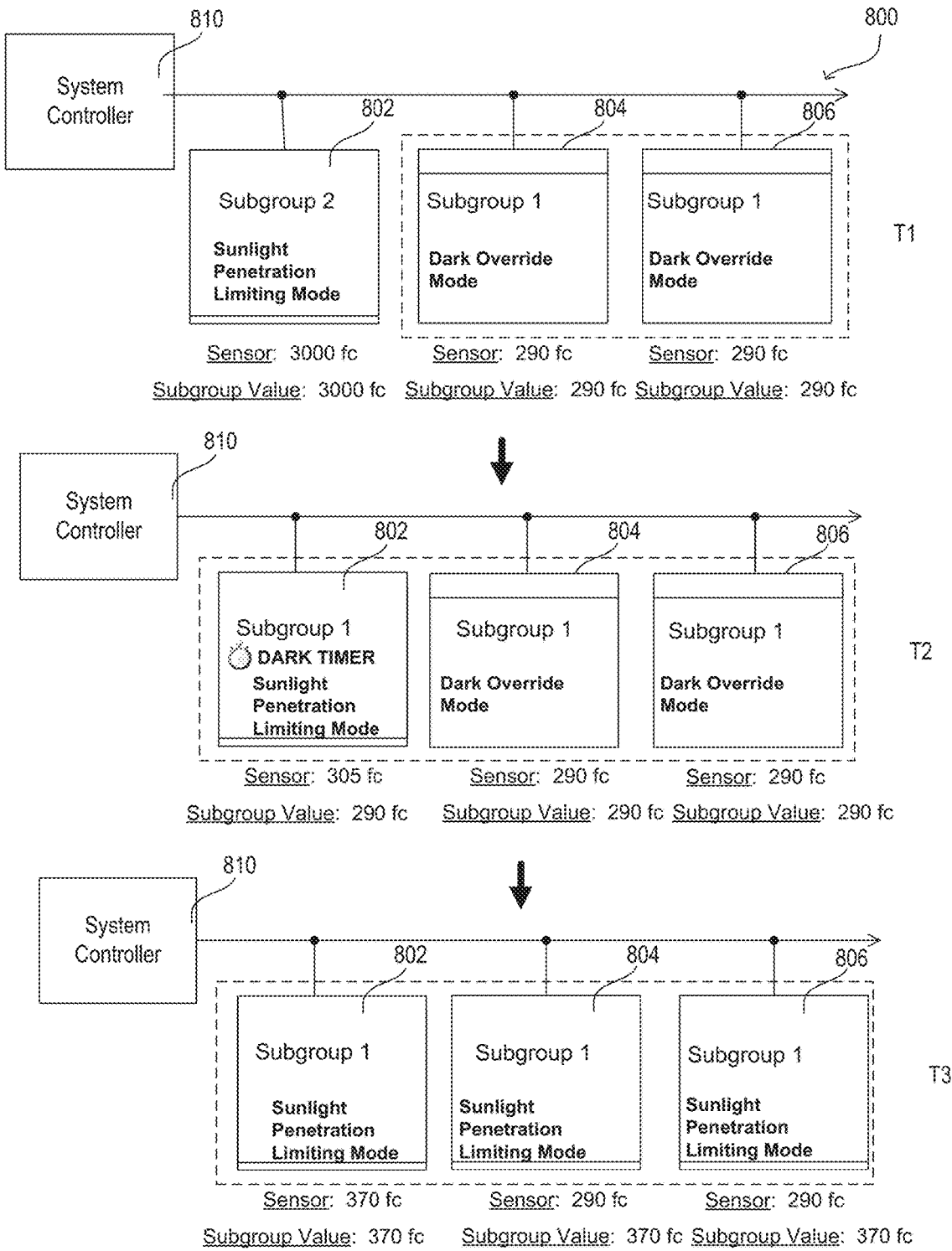

FIG. 10F shows another example of how the system controller 810 may control a subgroup when the shade group 802 enters the subgroup. As shown in FIG. 10F, the shade group 802 may be included in a different subgroup than shade groups 804, 806 at time T1. The shade group 802 may be in a different subgroup because the sensor reading for shade group 802 may indicate a light level (e.g., 3000 FC) that is outside of the predefined range (e.g., forty percent) of the light levels for the subgroup in which the shade groups 804, 806 are controlled.

The subgroup sensor value according to which the shade groups 804, 806 may be controlled may be 290 FC, which may be below the dark override threshold $L_{TH-DK}$ of 300 FC. As the subgroup sensor value according to which the shade groups 804, 806 are controlled is below the dark override threshold $L_{TH-DK}$, the shade groups 804, 806 may be in the dark override mode at time T1. The shade group 802 may be in the sunlight penetration limiting mode at time T1, as the subgroup sensor value according to which the shade group 802 may be controlled may be 3000 FC, which may be above the dark override threshold $L_{TH-DK}$ of 300 FC and a dark override hysteresis.

At time T2, the system controller 810 may receive an updated sensor reading from the sensor for the shade group 802. The updated sensor reading from the sensor for the shade group 802 may indicate a light level (e.g., 305 FC) that is within the predefined range (e.g., forty percent) of the light levels for the subgroup in which the shade groups 804, 806 are controlled and the system controller 810 may include the shade group 802 in the same subgroup as the shade groups 804, 806. When the shade group 802 joins the subgroup of the shade groups 804, 806, the subgroup may continue to be controlled according to the same subgroup sensor value (e.g., 290 FC) as the subgroup was controlled at time T1. The system controller 810 may start the dark override timer for the shade group 802 when the shade group joins the subgroup of the shade groups 804, 806 for putting the shade group 802 in the dark override mode, even though the sensor reading for the shade group 802 may be above the dark override threshold $L_{TH-DK}$ and the dark override hysteresis. The system controller 810 may control the shade group 802 according to the existing subgroup sensor value (e.g., 290 FC) when the shade group 802 joins the subgroup of the shade groups 804, 806, because the sensor light level for the shade groups 804, 806 have gone unchanged. Since the sensor light level for the shade group 802 has changed and is closer to the existing subgroup sensor value (e.g., 290 FC) according to which the shade groups 804, 806 are being controlled, the system controller 810 may control the shade group 802 according to the existing subgroup configuration.

At time T3, the system controller 810 may receive an updated sensor reading from the sensor for the shade group 802. The updated sensor reading from the sensor for the shade group 802 may indicate a light level (e.g., 370 FC) that is within the predefined range (e.g., forty percent) of the light levels for the subgroup in which the shade groups 804, 806 are controlled and the system controller 810 may keep the shade group 802 in the same subgroup as the shade groups 804, 806. As the shade group 802 entered the subgroup based on a previous sensor reading at time T2, the updated sensor reading for the shade group 802 may be used to evaluate whether to change the subgroup sensor value at time T3. The updated sensor reading (e.g., 370 FC) for the shade group 802 may be the maximum light level for the shade groups 802, 804, 806 at time T3 and may be set as the subgroup sensor value. As the updated sensor reading for the shade group 802 is increasing at time T3 to a light level above the dark override threshold $L_{TH-DK}$ and the dark override hysteresis, the shade groups 804, 806 in the subgroup may enter the sunlight penetration limiting mode at time T3. The dark override timer for shade group 802 may be stopped at time T3 when the sensor light level for shade group 802 is set as the subgroup sensor value according to which the subgroup may be controlled.

Figure 10G:
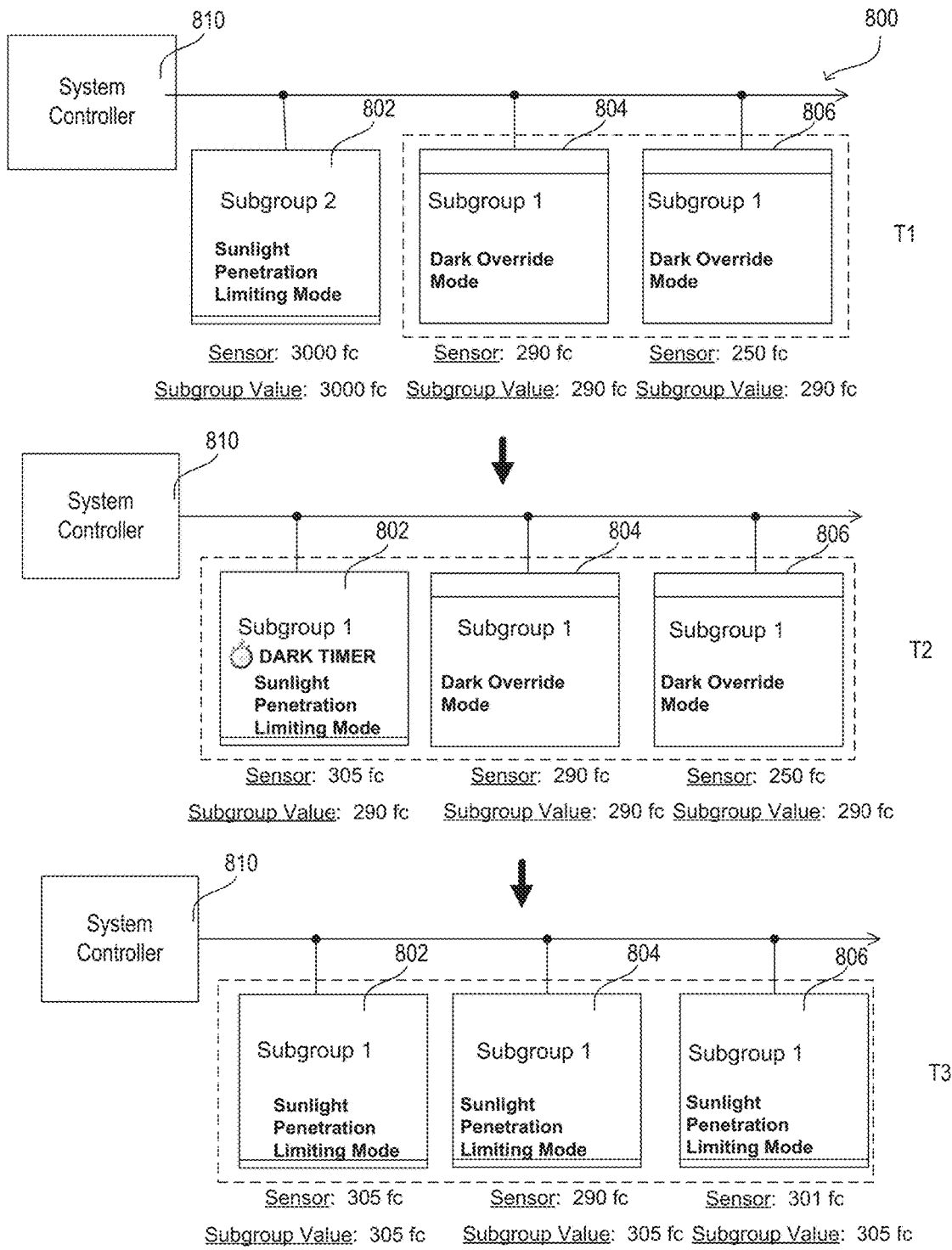

FIG. 10G shows another example of how the system controller 810 may control a subgroup when the shade group 802 enters the subgroup. As shown in FIG. 10G, the shade group 802 may be included in a different subgroup than shade groups 804, 806 at time T1. The shade group 802 may be in a different subgroup because the sensor reading for shade group 802 may indicate a light level (e.g., 3000 FC) that is outside of the predefined range (e.g., forty percent) of the light levels for the subgroup in which the shade groups 804, 806 are controlled.

The subgroup sensor value according to which the shade groups 804, 806 may be controlled may be 290 FC, which may be below the dark override threshold $L_{TH-DK}$ of 300 FC. As the subgroup sensor value according to which the shade groups 804, 806 are controlled is below the dark override threshold $L_{TH-DK}$, the shade groups 804, 806 may be in the dark override mode at time T1. The shade group 802 may be in the sunlight penetration limiting mode at time T1, as the subgroup sensor value according to which the shade group 802 may be controlled may be 3000 FC, which may be above the dark override threshold $L_{TH-DK}$ of 300 FC and a dark override hysteresis.

At time T2, the system controller 810 may receive an updated sensor reading from the sensor for the shade group 802. The updated sensor reading from the sensor for the shade group 802 may indicate a light level (e.g., 305 FC) that is within the predefined range (e.g., forty percent) of the light levels for the subgroup in which the shade groups 804, 806 are controlled and the system controller 810 may include the shade group 802 in the same subgroup as the shade groups 804, 806. When the shade group 802 joins the subgroup of the shade groups 804, 806, the subgroup may continue to be controlled according to the same subgroup sensor value (e.g., 290 FC) as the subgroup was controlled at time T1. The system controller 810 may start the dark override timer for the shade group 802 when the shade group 802 joins the subgroup of the shade groups 804, 806 for putting the shade group 802 in the dark override mode, even though the sensor reading for the shade group 802 may be above the dark override threshold $L_{TH-DK}$ and the dark override hysteresis. The system controller 810 may control the shade group 802 according to the existing subgroup sensor value (e.g., 290 FC) when the shade group 802 joins the subgroup of the shade groups 804, 806, because the sensor light level for the shade groups 804, 806 have gone unchanged. Since the sensor light level for the shade group 802 has changed and is closer to the existing subgroup sensor value (e.g., 290 FC) according to which the shade groups 804, 806 are being controlled, the system controller 810 may control the shade group 802 according to the existing subgroup configuration.

At time T3, the system controller 810 may receive an updated sensor reading from the sensor for the shade group 806. The updated sensor reading from the sensor for the shade group 806 may indicate a light level (e.g., 301 FC) that is within the predefined range (e.g., forty percent) of the light levels for the subgroup in which the shade groups 802, 804 are controlled and the system controller 810 may keep the shade group 806 in the same subgroup as the shade groups 802, 804. The updated sensor reading for the shade group 806 may trigger an evaluation of whether to change the subgroup sensor value at time T3. The updated sensor reading (e.g., 301 FC) for the shade group 806 may be identified as increasing at time T3 from time T2, but the maximum light level for the shade groups 802, 804, 806 at time T3 may be the light level indicated by the sensor reading for shade group 802 (e.g., 305 FC), so the system controller may set the light level indicated by the sensor for shade group 802 (e.g., 305 FC) as the subgroup sensor value. As the updated sensor reading for the shade group 802 increases the subgroup sensor value at time T3 to a light level above the dark override threshold $L_{TH-DK}$ and the dark override hysteresis, the shade groups 804, 806 in the subgroup may enter the sunlight penetration limiting mode at time T3. The dark override timer for shade group 802 may be stopped at time T3 when the sensor light level for shade group 802 is set as the subgroup maximum sensor light level according to which the subgroup may be controlled.

The examples shown in FIGS. 10A-10G may be performed by the system controller 810 (e.g., the system controller 110 shown in FIG. 1). A network device, such as the personal computer 164 shown in FIG. 1, may be used to display subgroups, shade groups, sensor reading values for each shade group, and/or the subgroup maximum sensor light levels for each subgroup. Though the examples shown in FIGS. 10A-10G show the system controller may adjust shade groups between different modes of operation, such as the dark override mode (e.g., a lowest mode) and the sunlight penetration limiting mode (e.g., a middle mode), the system controller may similarly adjust the control of the shade groups according to other modes of operation, such as the bright override mode (e.g., a highest mode) for example. The sensor reading values for each sensor may represent the most recent sensor readings by the window sensors at the indicated instant in time.

Figure 11A:
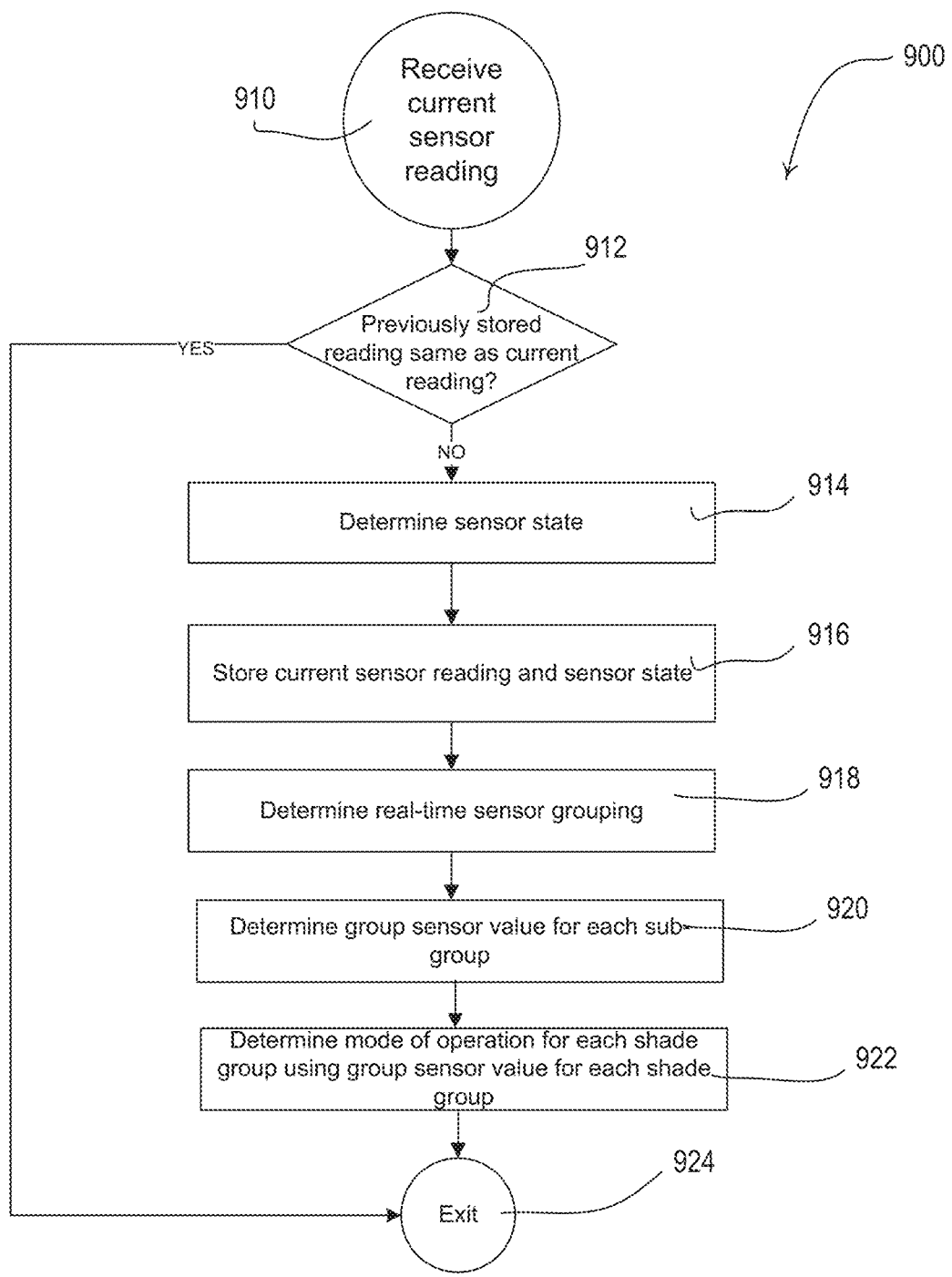
FIG. 11A is a simplified flowchart of another example control procedure for controlling a plurality of motorized roller treatments to maintain the horizontal alignment of the hembars of the motorized window treatments when sensor readings for the motorized window treatments are within a predetermined amount.
Figure 11B:
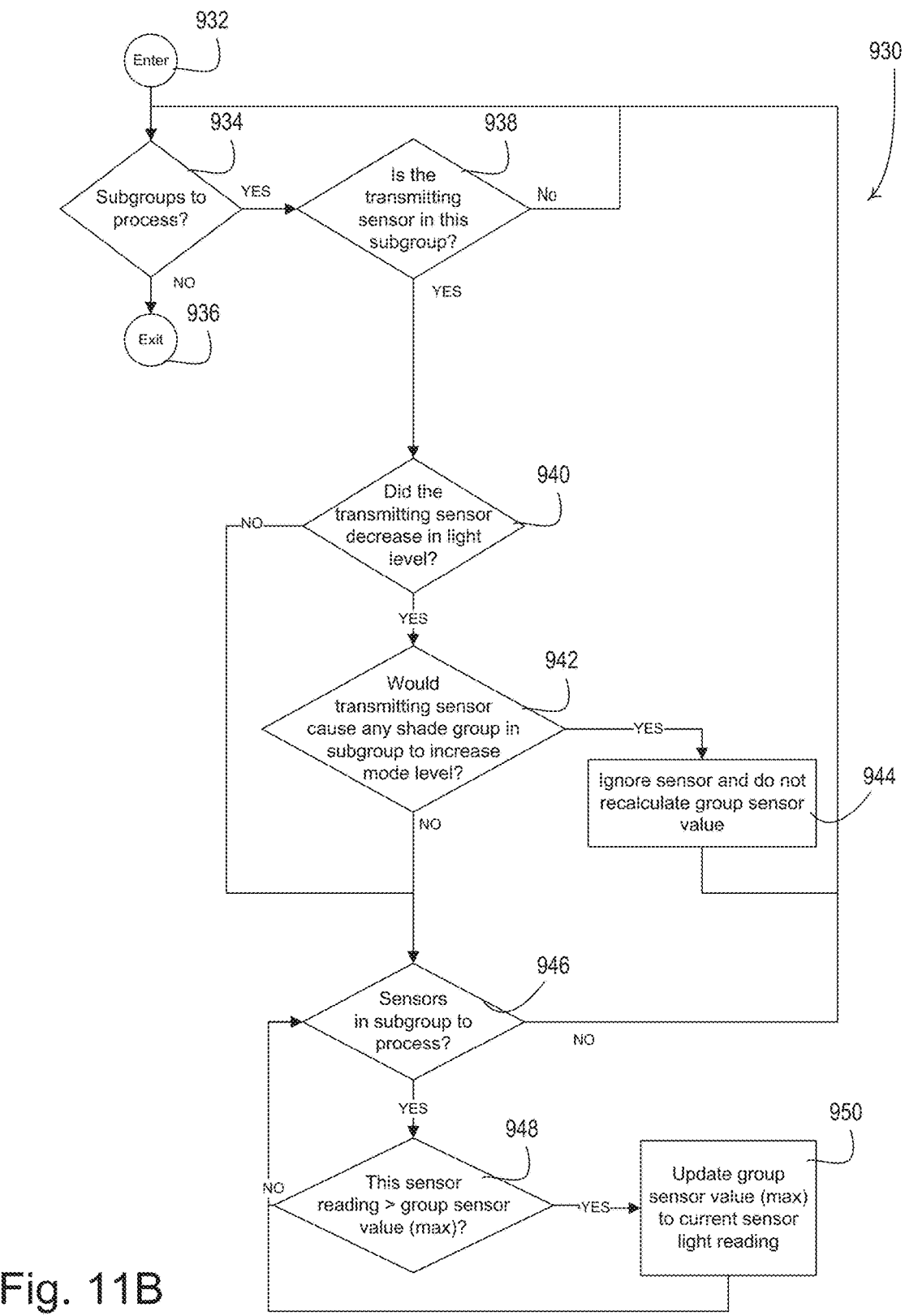
FIG. 11B is a simplified flowchart of an example procedure for determining a group sensor value.

FIGS. 11A & 11B are simplified flowchart of additional example procedures that may be executed by a system controller (e.g., the system controller 110 of the load control system 100 shown in FIG. 1) for controlling a plurality of motorized window treatments (e.g., the motorized roller shades 140 or the motorized window treatments 440, 442, 444 shown in FIG. 6) in response to a plurality of window sensors (e.g., the window sensors 420, 422, 424 shown in FIG. 6). FIG. 11A is a simplified flowchart of an example control procedure 900, which may be executed by the system controller in response to receiving a digital message including a current sensor reading from one of the window sensors. During the control procedure 900, the system controller may generate sensor groupings and adjust shade groups (e.g., subgroups) between the different modes of operation, such as the dark override mode (e.g., a lowest mode), the sunlight penetration limiting mode (e.g., a middle mode), and/or the bright override mode (e.g., a highest mode).

The control procedure 900 may be executed by the system controller in response to receiving a digital message including a sensor reading from one of the window sensors at 910. If the current sensor reading is the same as the previously stored sensor reading from that sensor at 912, the control procedure 900 may exit at 924. If the current sensor reading is different from the previously stored sensor reading from that sensor at 912, the system controller may determine the sensor state at 914. For example, the system controller may determine the trend of the sensor readings (e.g., whether the sensor readings are increasing or decreasing) for the sensor. The system controller may store in memory the current sensor reading, along with the previous sensor reading, and the sensor state (e.g., the trend of the sensor readings) at 916. The sensor reading, the previous sensor reading, and the sensor state may be stored for each sensor that is identified as having an updated sensor reading at 912.

At 918, the system controller may determine real-time sensor grouping (e.g., as in 514 of the control procedure 500 shown in FIG. 7 and/or the control procedure 600 shown in FIG. 8). For example, the system controller may group window sensors into sensor groups (e.g., subgroups) where the sensor readings are within a predetermined amount $\Delta_L$ (e.g., 40%) of each other. The sensor grouping may be triggered by the updated sensor reading being received. The system controller may determine, at 920 a group sensor value for the sensor groups determined at 918 (e.g., as shown in FIG. 11B). The group sensor value may be the subgroup sensor value for each subgroup of a master group, for example. At 922, the system controller may determine the mode of operation for each shade group using the group sensor value for each shade group determined at 920. For example, the system controller may adjust shade groups between different modes of operation, such as the dark override mode (e.g., a lowest mode), the sunlight penetration limiting mode (e.g., a middle mode), and/or the bright override mode (e.g., a highest mode) based on the group sensor value. The procedure 900 may exit at 924.

FIG. 11B shows a flowchart of an example procedure 930 for determining a sensor subgroup from which a current sensor reading is received and whether a group sensor value for a sensor subgroup should be updated based on the sensor reading. The procedure 930 may be entered at 932. For example, the procedure 930 may be entered by the system controller to re-calculate a group sensor value for a sensor subgroup in which a window sensor transmits a digital message that is received by the system controller that includes a current daylight value. The procedure 930 may be used to update the group sensor value for a created subgroup that includes the sensor that transmitted the digital message that includes the current daylight value. At 934, the system controller may determine whether there are subgroups to process. The system controller may determine that there are subgroups to process at 934 when the system controller has received a current sensor value for a subgroup that is different from the previously stored sensor value for the subgroup. If there are no subgroups for the system controller to process at 934, the procedure 930 may exit at 936.

If the system controller determines that there are subgroups for being processed at 934, the system controller may determine, at 938, whether the transmitting sensor from which the digital message is received is in the subgroup determined for being processed at 934. For example, the system controller may determine the subgroup that includes the sensor from which the current light level is received. If the system controller determines, at 938, that the transmitting sensor from which the digital message is received is not in the subgroup determined for being processed at 934, the procedure 900 may return to 934 for determining whether to process other subgroups to identify the sensor from which the current light level is received. The system controller may continue to iterate through the subgroups at 938 to determine the subgroup that the transmitting sensor from which the current light level is received.

If the system controller determines, at 938, that the transmitting sensor from which the digital message is received is in the subgroup determined for being processed at 934, the system controller may determine whether the current sensor reading from the transmitting sensor decreased in light level since the previously stored sensor reading at 940. If the system controller determines that the current sensor reading from the transmitting sensor decreased in light level, the system controller may determine, at 942, whether the current sensor reading from the transmitting sensor would cause any shade group in the subgroup to increase to a higher mode operation level (e.g., to the sunlight penetration limiting mode and/or the bright override mode). The system controller may not re-calculate the group sensor value if the received sensor reading is decreasing and the received sensor reading would cause any shade group in the present sensor group to increase the level of a mode of operation at 942 (e.g., from the dark override mode to the sunlight penetration limiting mode or from the sunlight penetration limiting mode to the bright override mode). For example, the system controller may ignore the sensor reading and may not re-calculate the group sensor value at 944. Accordingly, the system controller may not control the motorized window treatments if a shade group joined a sensor group (e.g., subgroup) by decreasing in the light level. The procedure 930 may return to 934 to determine whether to process more subgroups.

The system controller may re-calculate the group sensor value if the received sensor reading is increasing at 940, or the system controller determines that the received sensor reading is decreasing at 940 and the received sensor reading would not cause any shade group in the present sensor group to increase the level of a mode of operation at 942 (e.g., from the dark override mode to the sunlight penetration limiting mode or from the sunlight penetration limiting mode to the bright override mode). The system controller may determine, at 946, whether there are sensor light values in the subgroup for being processed to re-calculate the group sensor value. If the system controller determines that there are not sensor light values in the subgroup for being processed at 946, the procedure 930 may return to 934. If the system controller determines that there are sensor light values in the subgroup for being processed at 946, the system controller may determine whether the sensor light level is greater than the current group sensor value at 948. The group sensor value may be the subgroup sensor value. If the system controller determines that the sensor light value is not greater than the current group sensor value at 948, the procedure 900 may return to 946. If the system controller determines that the sensor light value is greater than the current group sensor value at 948, the group sensor value may be updated to the current sensor lighting level at 950 before returning to 946.

Figure 12A:
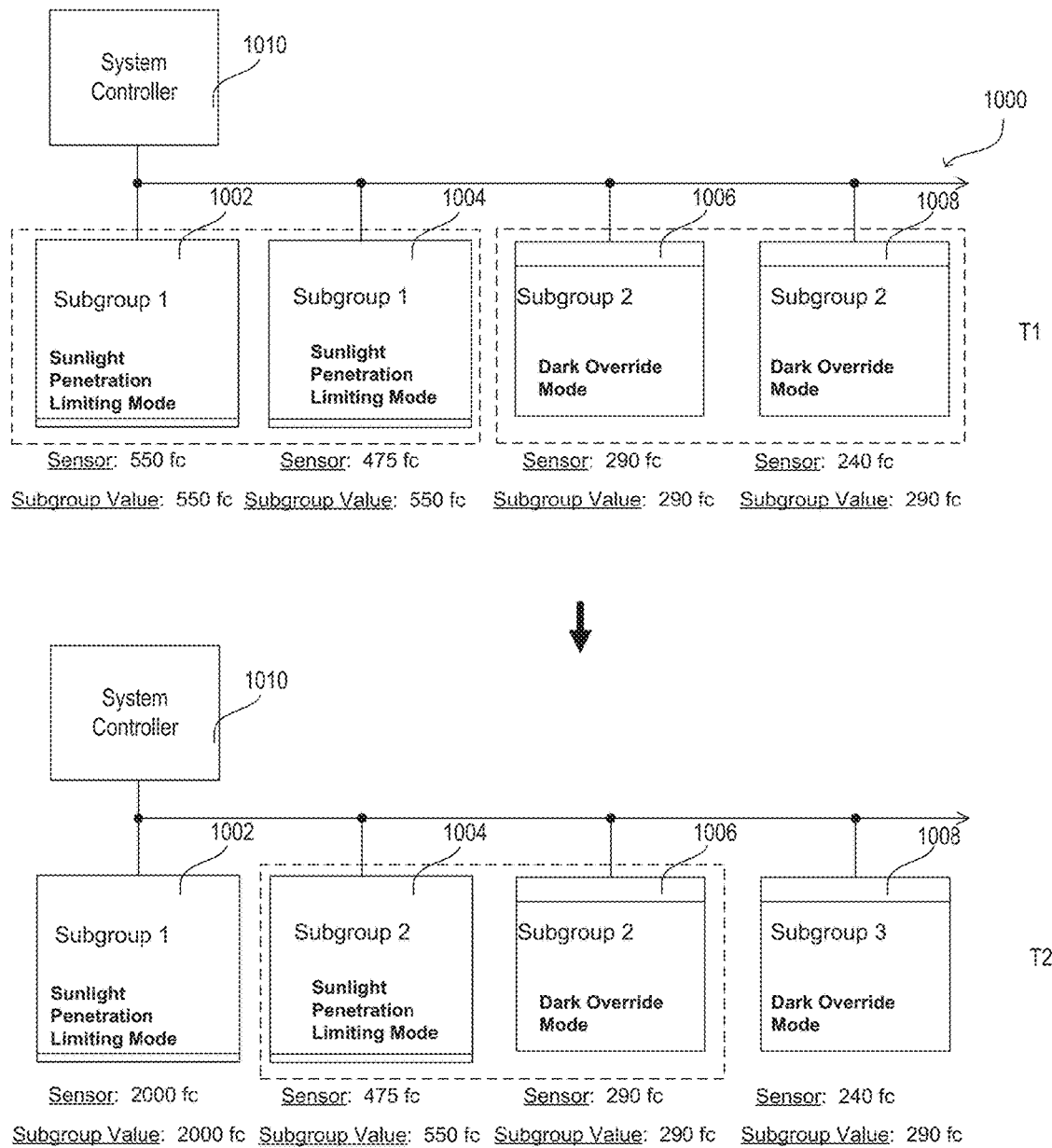
FIGS. 12A and 12B show an additional example system for controlling a plurality of motorized window treatments at different instants in time in order to maintain the horizontal alignment of the hembars of the motorized window treatments when sensor readings for the motorized window treatments are within a predetermined amount.
Figure 12B:
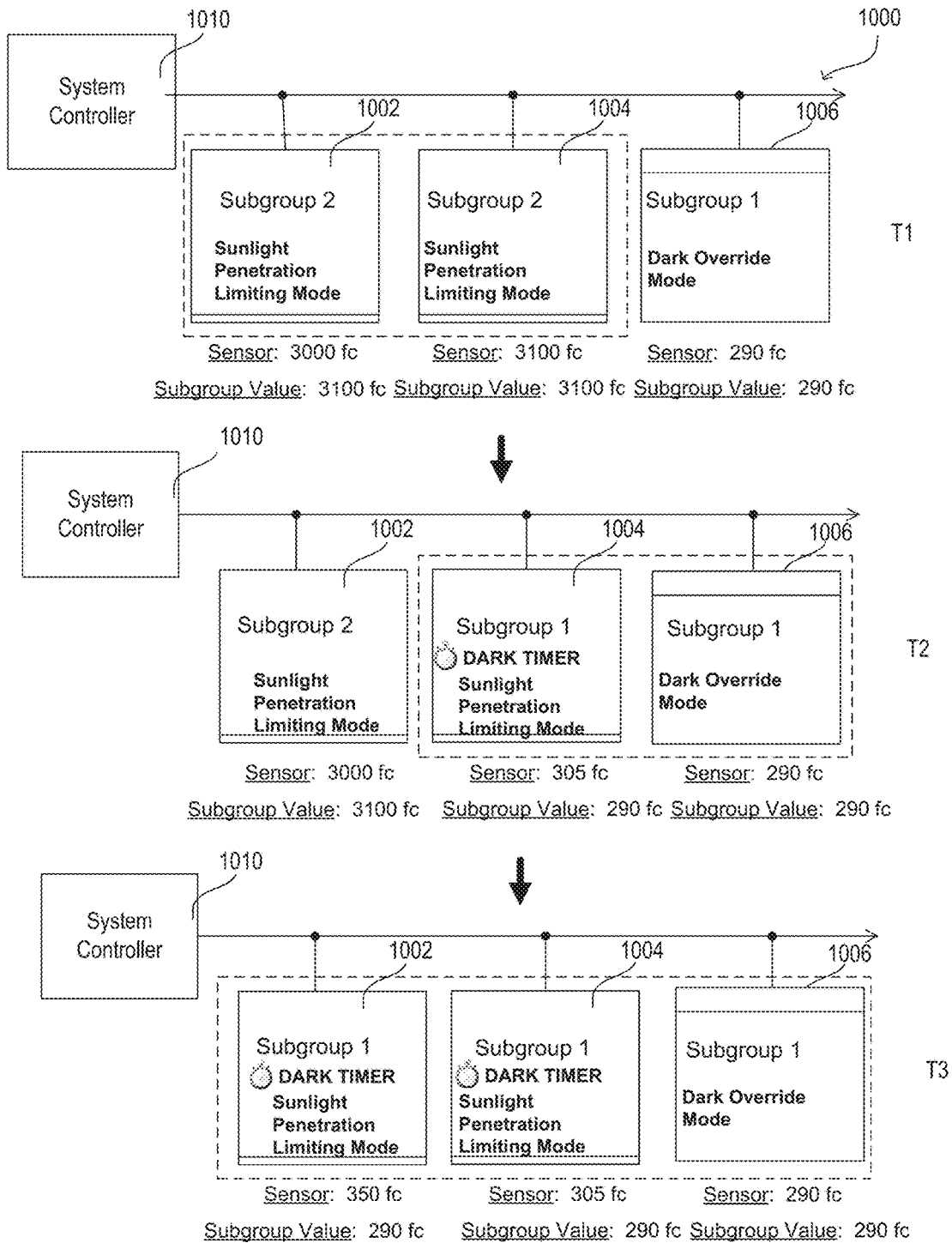

FIGS. 12A and 12B showing an additional example system 1000 illustrating the operation of a motorized window treatment system (e.g., the load control system 100) at different instances in time for controlling a plurality of motorized window treatments (e.g., the motorized window treatments 440, 442, 444 arranged along the single façade 400 as shown in FIG. 6) in order to maintain the hembars of the motorized window treatments horizontally aligned unless sensor readings differ by a predetermined amount.

As shown in FIG. 12A, the motorized window treatment system 1000 may include shade groups 1002, 1004, 1006, 1008. The shade groups 1002, 1004, 1006, 1008 may each include one or more motorized window treatments for controlling one or more respective shades. The motorized window treatments of the shade groups 1002, 1004, 1006, 1008 may be controlled by one or more system controllers, such as system controller 1010. The system controller 1010 may receive sensor readings from respective window sensors for each of the shade groups 1002, 1004, 1006, 1008 that indicate a sensed light level for controlling each of the shade groups 1002, 1004, 1006, 1008. The respective window sensors for each of the shade groups 1002, 1004, 1006, 1008 may include one or more window sensors.

As shown in FIG. 12A, the system controller 1010 may receive a sensor reading for shade groups 1002, 1004, 1006, 1008 at a time T1 that may identify a sensed light level of 550 FC, 475 FC, 290FC, and 240 FC for the respective shade groups 1002, 1004, 1006, and 1008. The system controller 810 may group shade groups 1002 and 1004 into the same subgroup, as the shade groups 1002 and 1004 may transmit a sensor reading that is within a predefined range of one another, such as forty percent. The system controller may group shade groups 1006 and 1008 into the same subgroup, as the shade groups 1006 and 1008 may be within the predefined range of one another. The system controller 1010 may control the shade groups 1002, 1004, 1006, 1008 according to a dark override threshold $L_{TH-DK}$ of 300 FC.

The system controller 1010 may control the shade groups 1002 and 1004 according to the same subgroup sensor value. The subgroup sensor value may be the sensor light level of shade group 1002, which may be the sensor light level of 550 FC. As the subgroup sensor value is above the dark override threshold $L_{TH-DK}$ of 300 FC and a dark override hysteresis, each of the shade groups 1002 and 1004 in the subgroup may be controlled according to the sunlight penetration limiting mode. The system controller 1010 may control the shade groups 1006 and 1008 according to the same subgroup sensor value. The subgroup sensor value for the subgroup of shade groups 1006 and 1008 may be the sensor light level of shade group 1006, which may be the sensor light level of 290 FC. As the subgroup sensor value for the shade groups 1006 and 1008 is below the dark override threshold $L_{TH-DK}$ of 300 FC, each of the shade groups 1006 and 1008 may be controlled according to the dark override mode.

The system controller 810 may receive an updated sensor reading for shade group 1002 at time T2. The updated sensor reading for shade group 1002 may be 2000 FC. As the updated sensor reading for shade group 1002 may be outside of the predefined range of the sensor readings for the other shade groups 1004, 1006, 1008 (e.g., forty percent), the shade group 1002 may be included in a separate subgroup and may be controlled according to the defined subgroup. Though the shade group 1002 may exit the subgroup of shade group 1004, the sensor reading of shade group 1002 at time T1 (e.g., 550 FC) may continue to be the subgroup sensor value according to which the shade group 1004 is controlled.

The system controller may re-group the shade groups 1004 and 1006 in the same subgroup. As the shade group 1002 has now increased to a light level above the predefined range shade group 1004, the sensor reading for shade group 1004 may be set as the upper limit for creating another subgroup. Though the shade group 1006 was not grouped with shade group 1004 at time T1 because the sensor reading for shade group 1006 was not within the predefined range of the sensor reading for shade group 1002, the shade group 1006 is within the predefined range of the sensor reading for shade group 1004 and is grouped with shade group 1004 at time T2. Shade group 1008 is not within the predefined range of the sensor reading for shade group 1004, so shade group 1008 is in another subgroup.

Though shade group 1004 and 1006 may be within the same subgroup at time T2, the subgroup sensor value for controlling each of the shade groups 1004 and 1006 may be different. Shade groups 1004 and 1006 may each be controlled at time T2 according to the subgroup sensor value assigned to each shade group 1004, 1006 at time T1, since the shade groups 1004 and 1006 are not the shade groups from which the sensor reading was transmitted at time T2. Since the updated sensor reading was transmitted by a sensor of a shade group 1002 that is not in the subgroup of the shade groups 1004 and 1006, the subgroup sensor value assigned to each shade group 1004, 1006 may not be re-calculated. The operational mode for each of the shade groups 1004, 1006, and 1008 may also be unaffected at time T2.

FIG. 12B shows an example of how the system controller 1010 may control a subgroup when the shade groups 1002 and 1004 enter the subgroup. As shown in FIG. 10B, the shade groups 1002 and 1004 may be included in a different subgroup than shade groups 1006 at time T1. The shade groups 1002 and 1004 may be in a different subgroup than shade group 1006 because the sensor reading for shade groups 1002 and 1004 may indicate a light level (e.g., 3000 FC) that is outside of the predefined range (e.g., forty percent) of the light levels for the subgroup in which the shade group 1006 are controlled. The shade groups 1002 and 1004 may be controlled according to a sunlight penetration limiting mode, as the current sensor reading for shade groups 1002 and 1004 may be above the dark override threshold $L_{TH-DK}$ of 300 FC and a dark override hysteresis (e.g., 3000 FC for shade group 1002 and 3100 FC for shade group 1004). The shade group 1006 may be controlled according to a subgroup sensor value that is below the dark override threshold (e.g., 290 FC) at time T1.

The sensor reading for shade group 1004 may be updated at time T2 to a light level (e.g., 305 FC) within the predefined range (e.g., forty percent) of the light level for the shade group 1006 and the system controller may include the shade groups 1004 and 1006 in the same subgroup. The updated sensor reading for shade group 1004 may be ignored at time T2 for re-calculating the subgroup sensor value, since the light level for shade group 1004 is decreasing at time T2. Because the shade group 1004 is being controlled at time T2 using the subgroup sensor value of the subgroup at time T1, the system controller may start the dark override timer for shade group 1004 at time T2 even though the updated sensor reading for shade group 1004 may be above the dark override threshold $L_{TH-DK}$ of 300 FC and a dark override hysteresis.

The sensor reading for shade group 1002 may be updated at time T3 to a light level (e.g., 350 FC) within the predefined range (e.g., forty percent) of the light level for the shade groups 1004, 1006 and the system controller may include the shade groups 1002, 1004, and 1006 in the same subgroup. The updated sensor reading for shade group 1002 may be ignored at time T3 for re-calculating the subgroup sensor value, since the light level for shade group 1002 is decreasing at time T3. Because the shade group 1002 is being controlled at time T3 using the subgroup sensor value of the subgroup at time T1, the system controller may start the dark override timer for shade group 1002 at time T3 even though the updated sensor reading for shade group 1006 may be above the dark override threshold $L_{TH-DK}$ of 300 FC and a dark override hysteresis.

The examples shown in FIGS. 12A and 12B may be performed by the system controller 1010 (e.g., the system controller 110 shown in FIG. 1). A network device, such as the personal computer 164 shown in FIG. 1, may be used to display subgroups, shade groups, sensor reading values for each shade group, and/or the subgroup sensor values for each subgroup. Though the examples shown in FIGS. 12A and 12B show the system controller may adjust shade groups between different modes of operation, such as the dark override mode (e.g., a lowest mode) and the sunlight penetration limiting mode (e.g., a middle mode), the system controller may similarly adjust the shade groups to be controlled according to other modes of operation, such as the bright override mode (e.g., a highest mode). The sensor reading values may represent the last transmitted sensor readings by the window sensors at the indicated instant in time.

Figure 13:
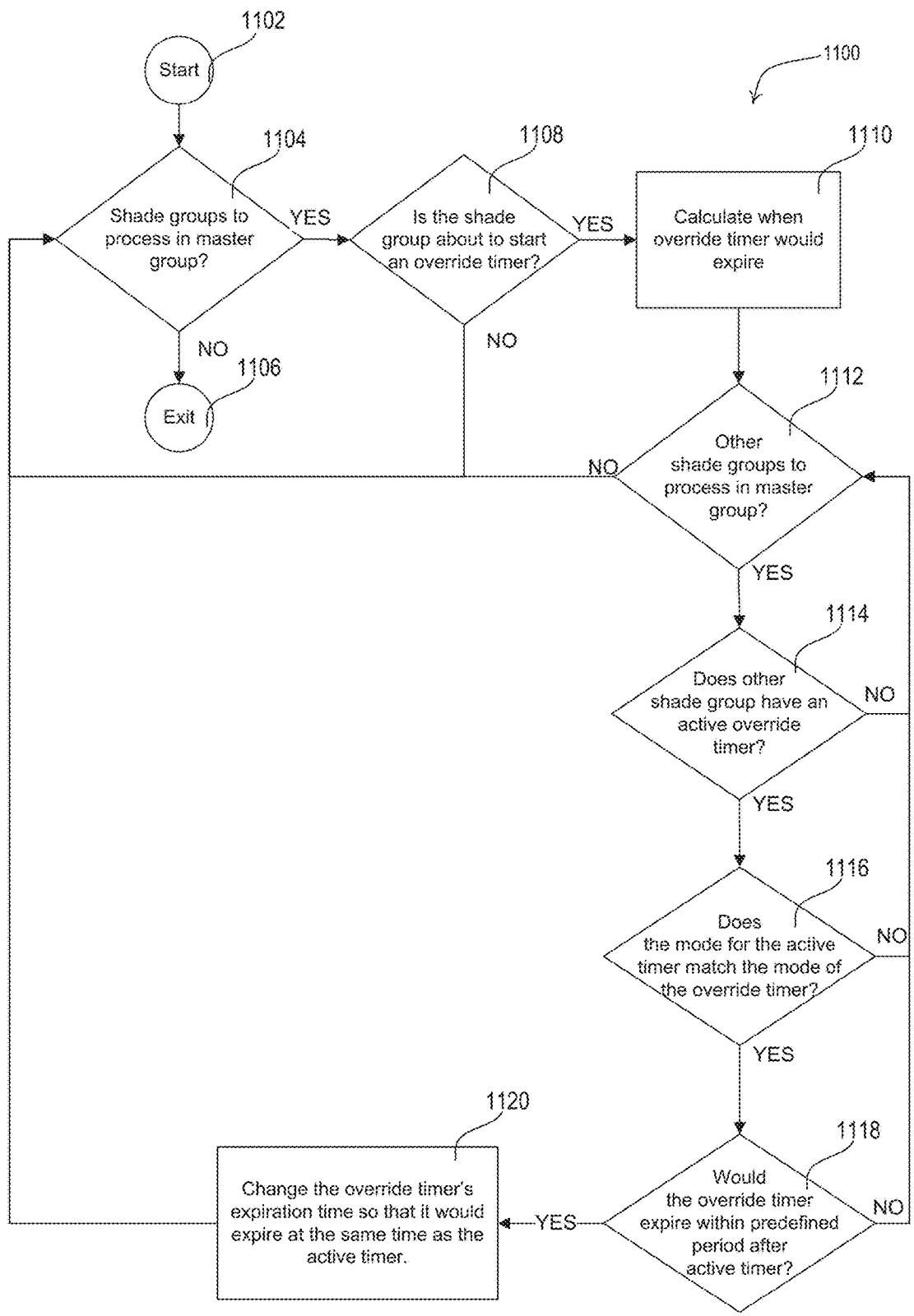
FIG. 13 is a simplified flowchart of an example start dark override timer procedure.

FIG. 13 is a simplified flowchart of an example start dark override timer procedure 1100, which may be executed by the system controller when the system controller starts the dark override timer for one of the shade groups (e.g., the shade groups 410, 412, 414 shown in FIG. 6). The start dark override timer procedure 1100 may allow for the alignment of the movements of the motorized window treatments into a fewer movements (e.g., to prevent distractions to occupants). For example, if the system controller is about to start the dark override time for a specific shade group, the system controller may use the procedure 1100 to scan the other shade groups in a master group to determine if the system controller has started the dark override timer for any of the other shade groups within a predefined period of time (e.g., within the last minute). If the system controller has started the dark override timer for other shade groups within a predefined period of time, the system controller may set the dark override timer for this specific shade group to the same time as the dark override timer of the shade group(s) that started within the predefined period of time, such that the motorized window treatments of both of the shade groups may open in unison when the shade groups go into dark override mode.

As shown in FIG. 13, the procedure 1100 may begin at 1102. The system controller may determine, at 1104, whether there are shade groups to process in the master group. For example, the system controller may determine whether there are shade groups for which that the system controller has started a dark override timer at 1104. If there are no shade groups to process at 1104, they procedure 1100 may end at 1106. If there are shade groups to process at 1104, the system controller may determine if there is a shade group for which the system controller has determined to start an override timer at 1108. If not, the procedure 1100 may return to 1104. If there is a shade group for which the system controller has determined to start an override timer at 1108, the system controller may calculate when the override timer for the shade group would expire at 1110. At 1112, the system controller may determine whether there are other shade groups to process in the master group that have an override timer. If not, the procedure may return to 1104.

If the system controller determines, at 1112, that there are other shade groups that have an override timer in the master list, the system controller may determine, at 1114, whether the other shade group's override timer is active (e.g., already started). If the other shade group's override timer is not active, the procedure 1100 may return to 1112. If the other shade group's override timer is active, the system controller may determine whether the operation mode for the active timer is the same as an operation mode of the override timer to be started. For example, the system controller may determine whether the active override timer is a dark override timer. If not, the procedure 1100 may return to 1112. If the other shade group's override timer is active and in the same operation mode of the override timer to be started, the system controller may determine if the override timer to be started would expire within a predefined time period (e.g., one minute) after the active override timer of the other shade group at 1118. If not, the procedure 1100 would return to 1112. If the override timer to be started would expire within a predefined time period (e.g., one minute) after the active override timer of the other shade group, the system controller may sync the timer expiration times for the timers at 1120. For example, the system controller may change the time period for the expiration of the override timer to be started such that it will expire at the same time as the active override timer. The procedure 1100 may return to 1104 to evaluate other shade groups, if any.

Though examples are provided herein for grouping motorized window treatments according to sensor readings that include daylight levels, other types of sensors may also be used to group and/or control motorized window treatments or other electrical loads. For example, other types of sensors may sense parameters in the vicinity of electrical loads. The system controller may use the sensed parameters to dynamically group the sensors together into groups, or subgroups of a master group, as described herein. The system controller may group the sensors that are within a predetermined parameter value of one another, as described herein. As the sensed parameters change for one or more sensors in a group, the sensor groups may be dynamically reconfigured, as described herein.

The groups (e.g., subgroups) of sensors may be used to control respective electrical loads according to a group sensor value that may be a representative value on which the electrical loads may be controlled, as described with regard to the control of the groups of the motorized window treatments herein. The sensed parameter for the group sensor value may be the highest valued parameter of the sensed parameters in the group. Each sensor group may include one or more sensors within the group that correspond to an electrical load for being controlled by the sensor.

In an example embodiment, the group of sensors may include temperature sensors in a space of a building that may be used to control the temperature. The temperature sensors may be grouped that are within a predefined threshold of one another for performing similar control of HVAC systems within a building. Other types of sensors may be similarly grouped for different types of electrical loads in a load control system. For example, the sensors may include occupancy sensors, vacancy sensors, daylight sensors, humidity sensors, pressure sensors, security sensors, proximity sensors, and/or other types of sensors that may be used to control an electrical load.

Figure 14:
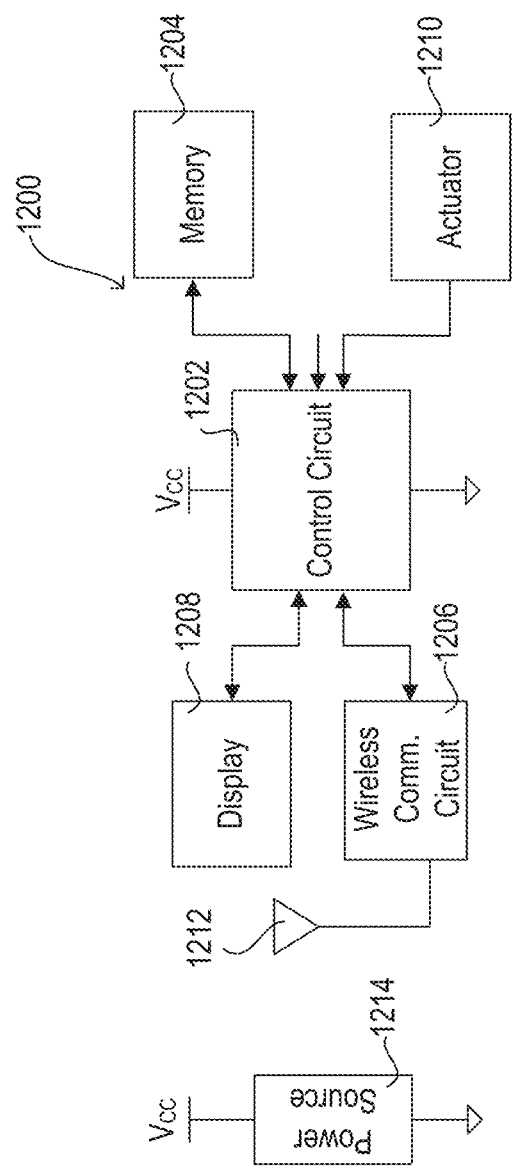
FIG. 14 is a block diagram illustrating an example network device.

FIG. 14 is a block diagram illustrating an example network device 400 (e.g., the personal computer 164 of FIG. 1) as described herein. The network device 1200 may include a control circuit 1202 for controlling the functionality of the network device 1200. The control circuit 1202 may include one or more general purpose processors, special purpose processors, conventional processors, digital signal processors (DSPs), microprocessors, integrated circuits, a programmable logic device (PLD), application specific integrated circuits (ASICs), and/or the like. The control circuit 1202 may perform signal coding, data processing, power control, image processing, input/output processing, and/or any other functionality that enables the network device 1200 to perform as described herein.

The control circuit 1202 may store information in and/or retrieve information from the memory 1204. The memory 1204 may include a non-removable memory and/or a removable memory. The non-removable memory may include random-access memory (RAM), read-only memory (ROM), a hard disk, and/or any other type of non-removable memory storage. The removable memory may include a subscriber identity module (SIM) card, a memory stick, a memory card (e.g., a digital camera memory card), and/or any other type of removable memory. The control circuit 1202 may access the memory 1204 for executable instructions and/or other information that may be used by the network device 1200.

The network device 1200 may include a wireless communication circuit 1206 for wirelessly transmitting and/or receiving information. For example, the wireless communications circuit 1206 may include an RF transceiver for transmitting and receiving RF communication signals (e.g., network communication signals) via an antenna 1212, or other communications module capable of performing wireless communications. Wireless communications circuit 1206 may be in communication with the control circuit 1202 for communicating information to and/or from the control circuit 1202. For example, the wireless communication circuit 1206 may send information from the control circuit 1202 via network communication signals (e.g., WI-FI® signals, WI-MAX® signals, etc.). The wireless communication circuit 1206 may send information to the control circuit 1202 that is received via network communication signals.

The control circuit 1202 may also be in communication with a display 1208. The display may provide information to a user in the form of a graphical and/or textual display. The communication between the display 1208 and the control circuit 1202 may be a two way communication, as the display 1208 may include a touch screen module capable of receiving information from a user and providing such information to the control circuit 1202.

The network device 1200 may include an actuator 1210. The control circuit 1202 may be responsive to the actuator 1210 for receiving a user input. For example, the control circuit 1202 may be operable to receive a button press from a user on the network device 1200 for making a selection or performing other functionality on the network device 1200.

Each of the modules within the network device 1200 may be powered by a power source 1214. The power source 1214 may include an AC power supply or DC power supply, for example. The power source 1214 may generate a DC supply voltage $V_{CC}$ for powering the modules within the network device 1200.

Figure 15:
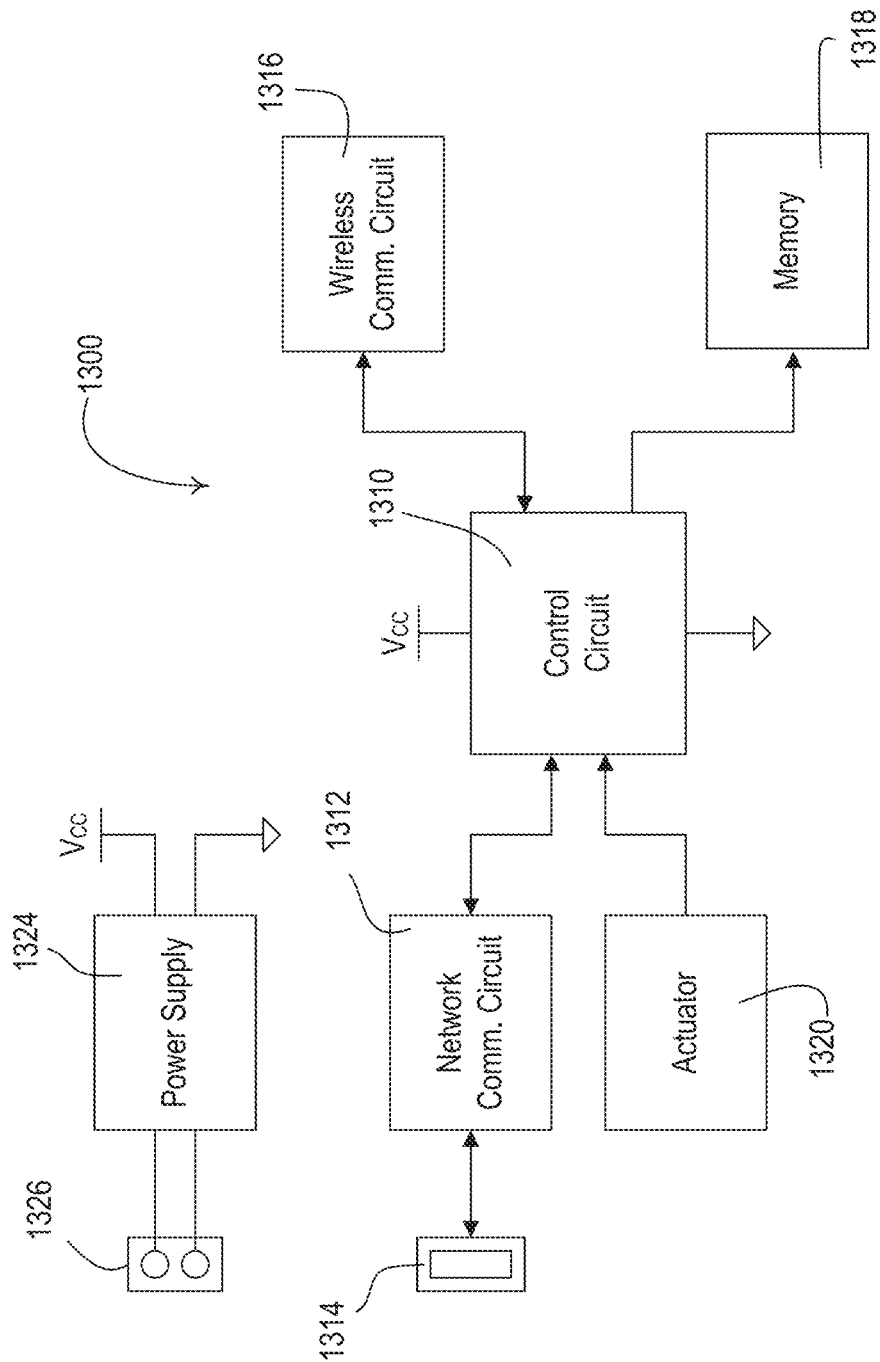
FIG. 15 is a block diagram of an example system controller.

FIG. 15 is a block diagram of an example system controller 1300 (e.g., the system controller 110 of FIG. 1). The system controller 1300 may comprise a control circuit 1310, which may include one or more of a processor (e.g., a microprocessor), a microcontroller, a programmable logic device (PLD), a field programmable gate array (FPGA), an application specific integrated circuit (ASIC), or any suitable processing device. The control circuit 1310 may perform signal coding, data processing, image processing, power control, input/output processing, and/or any other functionality that enables the system controller 1300 to perform as described herein. The system controller 1300 may comprise a network communication circuit 1312 that may be coupled to a network connector 1314 (e.g., an Ethernet jack), which may be adapted to be connected to a wired digital communication link (e.g., an Ethernet communication link) for allowing the control circuit 1310 to communicate on a network. In an example, the network connector 1314 may be connected to a network communication device (e.g., access point, router, modem, bridge, etc.). The network communication circuit 1312 may be configured to be wirelessly connected to the network, e.g., using Wi-Fi technology to transmit and/or receive network communication signals. For example, the network communication circuit 1312 may be configured to wirelessly communicate via network communication signals (e.g., WI-FI® signals, WI-MAX® signals, etc.). The control circuit 1310 may be coupled to the network communication circuit 1312 for transmitting digital messages via the network communication signals.

The system controller 1300 may comprise a wireless communication circuit 1316, for example, including an RF transceiver coupled to an antenna for transmitting and/or receiving RF communication signals. The wireless communication circuit 1316 may communicate using a proprietary protocol (e.g., the ClearConnect® protocol). The control circuit 1310 may be coupled to the wireless communication circuit 1316 for transmitting and/or receiving digital messages via the RF communication signals. The control circuit 1310 may be configured to send digital message to and/or receive digital messages from control devices (e.g., control-target devices and/or control-source devices).

The control circuit 1310 may be responsive to an actuator 1320 for receiving a user input. For example, the control circuit 1310 may be operable to associate the system controller 1300 with one or more devices of a load control system in response to actuations of the actuator 1320. The system controller 1300 may comprise additional actuators to which the control circuit 1310 may be responsive.

The control circuit 1310 may store information in and/or retrieve information from the memory 1318. The memory 1318 may include a non-removable memory and/or a removable memory for storing computer-readable media. The non-removable memory may include random-access memory (RAM), read-only memory (ROM), a hard disk, and/or any other type of non-removable memory storage. The removable memory may include a subscriber identity module (SIM) card, a memory stick, a memory card (e.g., a digital camera memory card), and/or any other type of removable memory. The control circuit 1310 may access the memory 1318 for executable instructions and/or other information that may be used by the system controller 1300. The control circuit 1310 may store the device identifiers in the memory 1318. The control circuit 1310 may access instructions in the memory 1318 for transmitting instructions and/or performing other functions described herein.

The system controller 1300 may comprise a power supply 1324 for generating a DC supply voltage $V_{CC}$ for powering the control circuit 1310, the network communication circuit 1312, the wireless communication circuit 1316, the memory 1318, and/or other circuitry of the system controller 1300. The power supply 1324 may be coupled to a power supply connector 1326 (e.g., a USB port) for receiving a supply voltage (e.g., a DC voltage) and/or for drawing current from an external power source.

Figure 16:
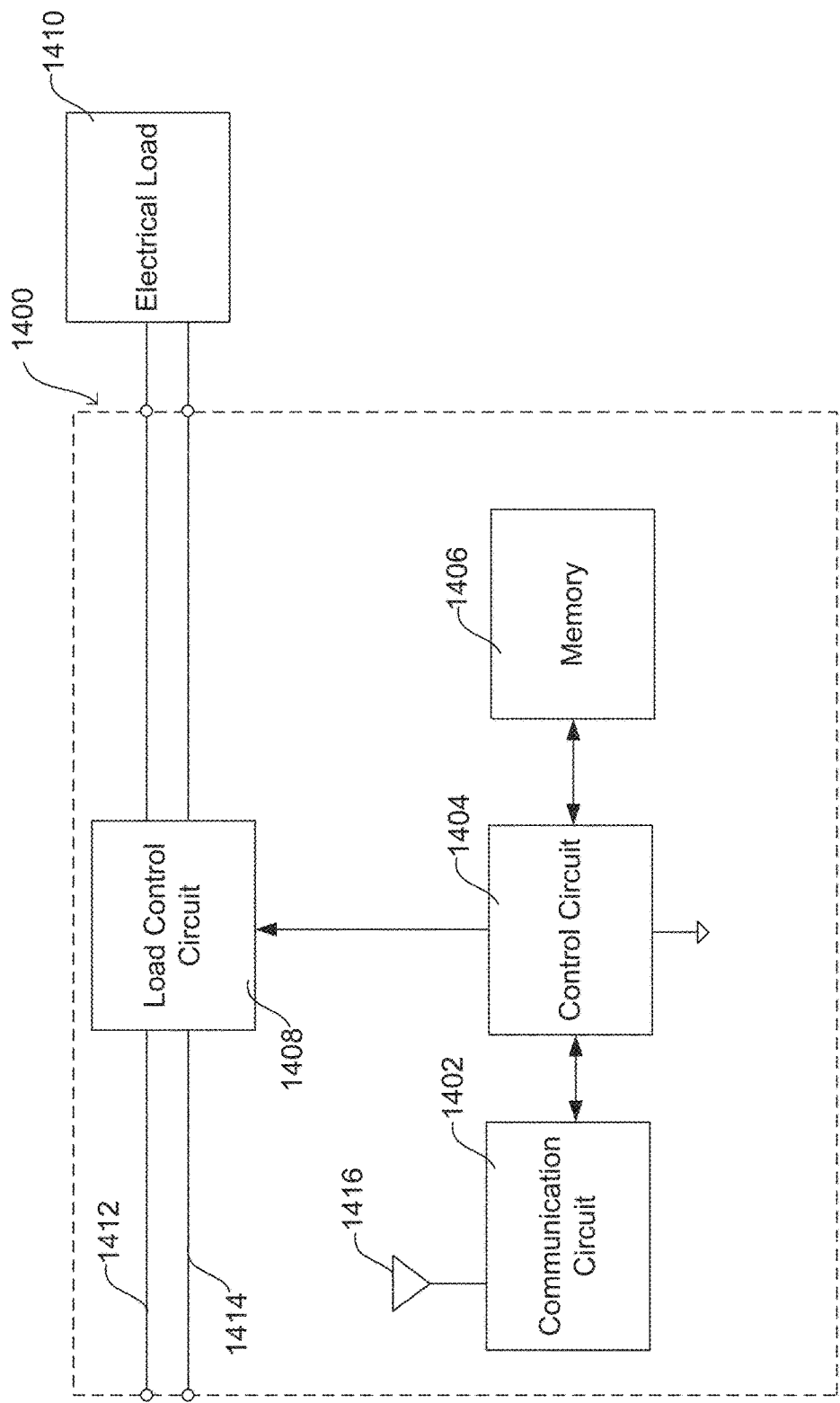
FIG. 16 is a block diagram illustrating an example load control device.

FIG. 16 is a block diagram illustrating an example load control device 1400. The load control device 1400 may be a control-target device, such as a lighting control device, for example. The load control device 1400 may be a dimmer switch, an electronic switch, an electronic ballast for lamps, an LED driver for LED light sources, a plug-in load control device, a temperature control device (e.g., a thermostat), a motor drive unit for a motorized window treatment, or other load control device. The load control device 1400 may include a communication circuit 1402. The communication circuit 1402 may include a receiver, an RF transceiver, or other communication module capable of performing wired and/or wireless communications. The wireless communications may be performed via an antenna 1416.

The communication circuit 1402 may be in communication with a control circuit 1404. The control circuit 1404 may include one or more general purpose processors, special purpose processors, conventional processors, digital signal processors (DSPs), microprocessors, integrated circuits, a programmable logic device (PLD), application specific integrated circuits (ASICs), or the like. The control circuit 1404 may perform signal coding, data processing, power control, input/output processing, or any other functionality that enables the load control device 1400 to perform as described herein.

The control circuit 1404 may store information in and/or retrieve information from a memory 1406. For example, the memory 1406 may maintain a device database of associated device identifiers and/or other executable instructions for performing as described herein. The memory 1406 may include a non-removable memory and/or a removable memory. The load control circuit 1408 may receive instructions from the control circuit 1404 and may control the electrical load 1410 based on the received instructions. The load control circuit 1408 may receive power via the hot connection 1412 and the neutral connection 1414 and may provide an amount of power to the electrical load 1410. The electrical load 1410 may include a lighting load, an electrical motor for controlling a motorized window treatment, or any other type of electrical load.

Although features and elements are described above in particular combinations, each feature or element can be used alone or in any combination with the other features and elements. The methods described herein may be implemented in a computer program, software, or firmware incorporated in a computer-readable medium for execution by a computer or processor. Examples of computer-readable media include electronic signals (transmitted over wired or wireless connections) and computer-readable storage media. Examples of computer-readable storage media include, but are not limited to, a read only memory (ROM), a random access memory (RAM), removable disks, and optical media such as CD-ROM disks, and digital versatile disks (DVDs).

What is claimed is:

1. A motorized window treatment system for controlling an amount of light entering a space, the system comprising:

a plurality of motorized window treatments, each motorized window treatment operable to adjust a respective covering material to control the amount of light entering the space;
a plurality of window sensors, each window sensor mounted adjacent at least one of the plurality of motorized window treatments, each window sensor configured to measure an amount of daylight shining on the respective window sensor and to transmit a sensor reading based on the measured amount of daylight; and
a system controller configured to:
receive the sensor readings from the window sensors;
maintain the covering materials in alignment by controlling the plurality of motorized window treatments in response to the sensor readings while a difference between each sensor reading is within a predetermined amount of each other; and
adjust the respective covering material for at least one of the motorized window treatments to a different position than at least one other motorized window treatment of the plurality of motorized window treatments while the difference between each sensor reading is outside of the predetermined amount of each other; wherein the system controller is configured to dynamically group the window sensors together into sensor groups and control the motorized window treatments based upon the sensor groups.

2. The system of claim 1, wherein the system controller is configured to dynamically group the window sensors together into the sensor groups based upon the sensor readings.

3. The system of claim 2, wherein the system controller is configured to determine a group sensor value representative of current sensor readings of the window sensors in each sensor group.

4. The system of claim 3, wherein the system controller is configured to control the motorized window treatments based upon the group sensor value from the sensor group.

5. The system of claim 3, wherein the system controller is configured to control the motorized window treatments when one of the sensor readings from the window sensors in one of the sensor groups changed.

6. The system of claim 3, wherein the group sensor value is a highest sensor reading from each sensor group.

7. The system of claim 3, wherein the system controller is configured to disregard a current reading from a window sensor that joined a sensor group, where the current sensor reading decreased from a previous sensor reading.

8. The system of claim 3, wherein the system controller is configured to disregard a current sensor reading from a window sensor that joined a sensor group, where the current sensor reading decreased from a previous sensor reading and resulting movements of the motorized window treatments would cause the motorized window treatments to move to more closed positions.

9. The system of claim 2, wherein the motorized window treatments are grouped into shade groups, where each shade group comprises at least one window sensor, the system controller configured to control each of the motorized window treatments in one of the shade groups to a same position.

10. The system of claim 9, wherein the system controller is configured to start a timer for each shade group in response to receiving a sensor reading that will cause one or more motorized window treatments to open, and to open the window treatments in that shade group after the timer reaches a predetermined limit.

11. The system of claim 10, wherein the system controller is configured to stop the timer if a sensor reading from one of the window sensors in the sensor group of which the shade group is a part rises above a threshold.

12. The system of claim 10, wherein the system controller is configured to stop the timer of shade groups in a sensor group in response to a sensor reading from one of the window sensors in a shade group that joined the sensor group.

13. The system of claim 9, wherein each shade group comprises multiple window sensors.

14. The system of claim 13, wherein the system controller is configured to control the motorized window treatments based upon a highest sensor reading from the shade group.

15. The system of claim 9, wherein each shade group comprises a single window sensor.

16. The system of claim 9, wherein each shade group is in a single sensor group.

17. The system of claim 1, wherein the motorized window treatments comprise motorized roller shades having shade fabrics, and the system controller is configured to control the motorized roller shades to keep bottom ends of the shade fabrics aligned while the sensor readings are within the predetermined amount.

18. The system of claim 1, wherein the system controller is configured to operate in one of a plurality of modes in response to the sensor readings from the window sensors.

19. The system of claim 18, wherein the system controller is configured to control the motorized window treatments to limit a sunlight penetration distance in the space in a first mode.

20. The system of claim 19, wherein the system controller is configured to control the motorized window treatments to a constant position in a second mode.

21. The system of claim 19, wherein the system controller is configured to determine a position of the sun in relation to the space and to control the motorized window treatments to limit the sunlight penetration distance in the space in response to the position of the sun.

22. The system of claim 1, wherein the predetermined amount is in the range of approximately 20% to approximately 50%.

23. The system of claim 22, wherein the predetermined amount is approximately 40%.

24. A motorized window treatment system for controlling an amount of light entering a space, the system comprising:
a plurality of motorized window treatments, each motorized window treatment operable to adjust a respective covering material to control the amount of light entering the space;
a plurality of window sensors, each window sensor mounted adjacent at least one of the plurality of motorized window treatments, each window sensor configured to measure an amount of daylight shining on the respective window sensor; and
a system controller configured to:
receive sensor readings based on the measured amount of daylight from the window sensors;
compare the sensor readings to each other;
determine whether a difference between the sensor readings is within a predetermined threshold;
dynamically group the window sensors together into sensor groups based upon the determination; and
control the motorized window treatments based upon the sensor groups to maintain alignment of the motorized window treatments while the difference between corresponding sensor readings is within the predetermined threshold.

25. A system controller for controlling an amount of light entering a space, the system controller comprising:
a control circuit configured to:
receive sensor readings indicative of a light intensity from window sensors;
determine whether a difference between the sensor readings is within a predetermined amount;
control a plurality of motorized window treatments each comprising a covering material;
maintain the covering materials in alignment by controlling the plurality of motorized window treatments while the difference between each sensor reading is within the predetermined amount; and
adjust the respective covering material for at least one of the motorized window treatments to a different position than at least one other motorized window treatment of the plurality of motorized window treatments while the difference between each sensor reading is outside of the predetermined amount of each other; wherein the control circuit is configured to dynamically group the window sensors together into sensor groups and control the plurality of motorized window treatments based upon the sensor groups.

26. The system controller of claim 25, wherein the control circuit is configured to dynamically group the window sensors together into the sensor groups based upon the sensor readings.

27. The system controller of claim 26, wherein the control circuit is configured to determine a group sensor value representative of current sensor readings of the window sensors in each sensor group.

28. The system controller of claim 27, wherein the control circuit is configured to control the motorized window treatments based upon the group sensor value from the sensor group.

29. The system controller of claim 27, wherein the control circuit is configured to control the motorized window treatments when one of the sensor readings from the window sensors in one of the sensor groups changed.

30. The system controller of claim 27, wherein the group sensor value is a highest sensor reading from each sensor group.

31. The system controller of claim 27, wherein the control circuit is configured to disregard a current sensor reading from a window sensor that joined a sensor group, where the current sensor reading decreased from a previous sensor reading.

32. The system controller of claim 27, wherein the control circuit is configured to disregard a current sensor reading from a window sensor that joined a sensor group, where the current sensor reading decreased from a previous sensor reading and resulting movements of the motorized window treatments would cause the motorized window treatments to move to more closed positions.

33. The system controller of claim 26, wherein the control circuit is configured to group the motorized window treatments into shade groups, where each shade group comprises at least one window sensor, and where the control circuit is configured to control each of the motorized window treatments in one of the shade groups to a same position.

34. The system controller of claim 33, wherein the control circuit is configured to start a timer for each shade group in response to receiving a sensor reading that will cause one or more motorized window treatments to open, and to open the window treatments in that shade group after the timer reaches a predetermined limit.

35. The system controller of claim 34, wherein the control circuit is configured to stop the timer if a sensor reading from one of the window sensors in the sensor group of which the shade group is a part rises above a threshold.

36. The system controller of claim 34, wherein the control circuit is configured to stop the timer of shade groups in a sensor group in response to a sensor reading from one of the window sensors that joined the sensor group.

37. The system controller of claim 33, wherein each shade group comprises multiple window sensors.

38. The system controller of claim 37, wherein the control circuit is configured to control the motorized window treatments based upon a highest sensor reading from the shade group.

39. The system controller of claim 33, wherein each shade group comprises a single window sensor.

40. The system controller of claim 33, wherein each shade group is in a single sensor group.

41. The system controller of claim 25, wherein the motorized window treatments comprise motorized roller shades having shade fabrics, and the control circuit is configured to control the motorized roller shades to keep bottom ends of the shade fabrics aligned while the sensor readings are within the predetermined amount.

42. The system controller of claim 25, wherein the control circuit is configured to operate in one of a plurality of modes in response to the sensor readings from the window sensors.

43. The system controller of claim 42, wherein the control circuit is configured to control the motorized window treatments to limit a sunlight penetration distance in the space in a first mode.

44. The system controller of claim 43, wherein the control circuit is configured to control the motorized window treatments to a constant position in a second mode.

45. The system controller of claim 43, wherein the control circuit is configured to determine a position of the sun in relation to the space and to control the motorized window treatments to limit the sunlight penetration distance in the space in response to the position of the sun.

46. The system controller of claim 25, wherein the predetermined amount is in the range of approximately 20% to approximately 50%.

47. The system controller of claim 46, wherein the predetermined amount is approximately 40%.

* * * * *